US012801914B2

(12) United States Patent
Duong et al.

(10) Patent No.: US 12,801,914 B2
(45) Date of Patent: Nov. 17, 2026

(54) DYNAMIC NEURAL DISTRIBUTION FUNCTION MACHINE LEARNING ARCHITECTURE

(71) Applicant: Adaptive Computation LLC, LaVerne, CA (US)

(72) Inventors: Tuan A. Duong, LaVerne, CA (US); Quang Nhan Duong, LaVerne, CA (US)

(73) Assignee: ADAPTIVE COMPUTATION LLC, Glendora, CA (US)

( * ) Notice: Subject to any disclaimer, the term of this patent is extended or adjusted under 35 U.S.C. 154(b) by 921 days.

(21) Appl. No.: 18/091,081

(22) Filed: Dec. 29, 2022

(65) Prior Publication Data

US 2024/0220788 A1 Jul. 4, 2024

(51) Int. Cl.

*G06N 3/08* (2023.01)
*G06N 3/045* (2023.01)
*G06N 3/084* (2023.01)

(52) U.S. Cl.

CPC ............... *G06N 3/08* (2013.01); *G06N 3/045* (2023.01); *G06N 3/084* (2013.01)

(58) Field of Classification Search

CPC ........... G06N 3/08; G06N 3/045; G06N 3/084
See application file for complete search history.

(56) References Cited

U.S. PATENT DOCUMENTS

| | | | | |
|---|---|---|---|---|
| 11,373,086 | B2 * | 6/2022 | Strope | G06N 3/09 |
| 12,099,571 | B2 * | 9/2024 | Yan | G05B 13/027 |
| 2003/0018592 | A1 * | 1/2003 | Srinivasa | G06V 40/10 706/8 |
| 2020/0380364 | A1 * | 12/2020 | Sun | G06N 3/045 |
| 2021/0304524 | A1 | 9/2021 | Mcgill et al. | |
| 2022/0058466 | A1 * | 2/2022 | Yang | G06N 3/0442 |
| 2022/0092414 | A1 | 3/2022 | Zheng et al. | |
| 2022/0101054 | A1 | 3/2022 | Abouzeid et al. | |
| 2022/0114435 | A1 | 4/2022 | Ross | |
| 2022/0138554 | A1 | 5/2022 | Walters et al. | |
| 2022/0308242 | A1 * | 9/2022 | Wang | G06N 3/094 |
| 2022/0309295 | A1 * | 9/2022 | Wang | G06T 7/0012 |
| 2023/0177388 | A1 * | 6/2023 | Cornec | G06N 20/00 706/11 |
| 2023/0289611 | A1 * | 9/2023 | Baker | G06N 3/0455 |

OTHER PUBLICATIONS

Korean Intellectual Property Office, International Search Report and Written Opinion, PCT App. No. PCT/US2023/084846; Apr. 24, 2024, pp. 1-11.

* cited by examiner

*Primary Examiner* — Jordany Nunez
(74) *Attorney, Agent, or Firm* — Ming Jiang; MM IP SERVICES LLC

(57) ABSTRACT

The present disclosure discusses dynamic supervised learning (DSL) and dynamic neural distribution function (DNDF) machine learning architectures and platforms. In contrast to existing ML approaches, DNDF accommodates a whole data structure via a neural network distribution function from which a decision boundary is born out. In particular, a neural network learning algorithm is used to extract a decision boundary while a neural distribution function is a neural data distribution approach wherein one or more decision boundaries are extracted among various distributions. Other aspects may be described and/or claimed.

12 Claims, 14 Drawing Sheets

DYNAMIC NEURAL DISTRIBUTION FUNCTION MACHINE LEARNING ARCHITECTURE

TECHNICAL FIELD

The present disclosure is generally related to computing arrangements based on biological models, computing arrangements based on specific mathematical models, hardware and software implementations of artificial intelligence (AI), machine learning (ML), and neural networks, and in particular, to dynamic supervised learning (DSL) and dynamic neural distribution function (DNDF) machine learning architectures and platforms.

BACKGROUND

Machine learning (ML) is the study of computer algorithms that improve automatically through experience and by the use of data. In general, machine learning involves creating a statistical model (or simply a "model"), which is configured to process data to make predictions and/or inferences. ML algorithms build models using sample data (referred to as "training data") and/or based on past experience in order to make predictions or decisions without being explicitly programmed to do so.

The concepts of decision boundary's (DB) has been the subject of much research in ML, and almost every class in ML and neural networks (NNs) discusses this concept (see e.g., Duda et al., Pattern Classification and Scene Analysis, New York, Wisley (1973)). DB is a well-set mathematical foundation to establish a hyperplane or non-linear hyperplane to separate between classes. In ML, a classifier may partition an underlying vector space into two sets, one for each class. The classifier will classify all the points on one side of the decision boundary as belonging to one class and all those on the other side as belonging to the other class. Due to this establishment, data samples of each class where they are in the neighbor of another can play a key role where the rest of data are irrelevant. From a data science perspective, every data item must play some role in this decision, regardless data that are mingling with noise.

The support vector machine (SVM) is a well-known technique to separate between two classes (see e.g., Cortes et al., "Support-Vector Networks", Machine Learning 20, no. 3, pp. 273-297 (1995)). From a mathematical perspective, the DB of an SVM approach can be considered as an optimal DB, but not representable due to concentrating into relatively small data samples into respective data sets for each class that are interfacing between classes. In other words, there are several data points for each class, but the DB produced by SVM only uses a few data points to represent them, and therefore, the SVM DB cannot capture the whole set of data points forming the data structure of each class. This may be referred to as a "missing data structure." For example, SVM indicates only a few data points in interfacing between two classes that are decided for the DB and the rest of the data samples play no role in the DB. This can lead to the misinterpretation of a few samples data, which is equivalent to more data behind its interface. This suggests that it can be an insufficient approach and provides ineffective generalization feature where whole data sets are not representable. In a sample space, DB can be sub-optimal and may introduce errors when more data and/or new types of samples arrive at some time later.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

1. Dynamic Neural Distribution Function Aspects

Figure 1:
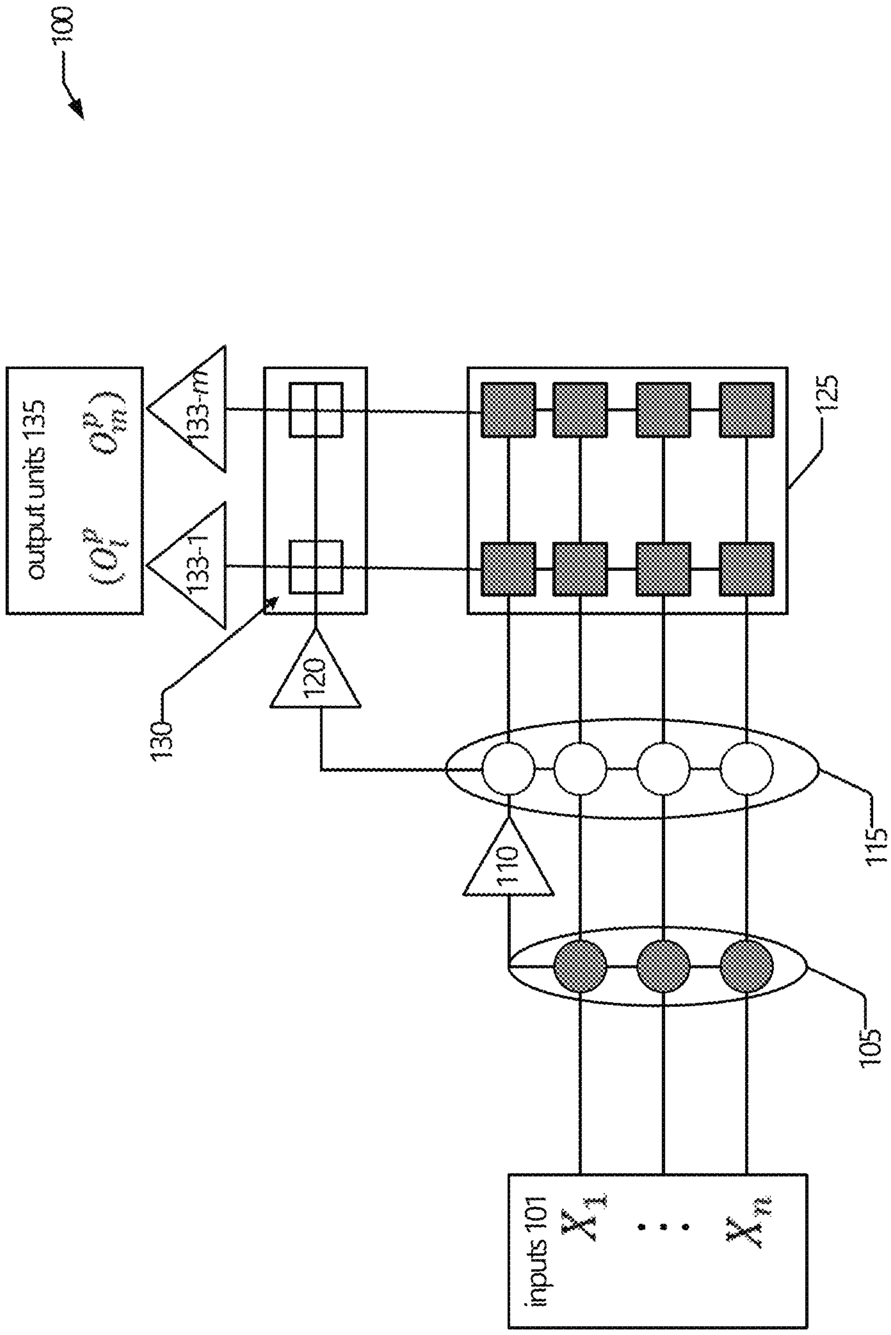
FIG. 1 depicts an example CEP architecture.

The concept of decision boundaries (DBs) has been used for many AI/ML tasks, such as classification, detection, recognition, and identification. The DB can be difficult to adapt to new classes of objects or events unless the DB is dismantled and restarted over again. From a data analysis perspective, one does not need all data sets of the same class to determine a DB; rather, a DB can be determined using a few samples at the border with another class. Therefore, a DB may not optimally represent the whole data set. Conventional SVM techniques provide a good example for this concern where only a few data samples are used to determine a DB.

For example, the type of DBs that a backpropagation (backprop) based NN or perceptron can learn is determined by the number of hidden layers the NN has. If there are no hidden layers, then such NNs can only learn linear problems. If there is one hidden layer, then such NNs can learn any continuous function and can have an arbitrary DB. SVMs find a hyperplane that separates the feature space into two classes with the maximum margin. If the problem is not originally linearly separable, the SVM requires a kernel method to be used to provide linearly separablility by increasing the number of dimensions. Thus, a general hypersurface in a small dimension space is turned into a hyperplane in a space with much larger dimensions, which may require a relatively large amount of computational resources.

By contrast, neural distribution functions (NDFs), such as the Dynamic Neural Distribution Function (DNDF) aspects discussed herein, can be used to solve the aforementioned DB-related issues. The DNDF aspects discussed herein inherit and accumulate every sample of individual classes to attempt containing it/them within its own distribution. Each NDF is obtained independently and sequentially at a time, without competing with others NDFs and/or without relying on learned previously classes (or classifications). The NDFs are learned using sample data structures and are extracted via an NN learning algorithm to establish their own distributions. The competition between their own distributions is derived to provide a DB as a passive action for a sufficient solution. When the learning landscape becomes dense and crowded (e.g., when the classes outnumber the input dimensions), the new arriving classes will self-adjust their learning gains to meet the learning desires or goals.

The DNDF aspects discussed herein have been shown to successful validate the benchmark-XOR problem, sequential adding learning (SAL) where DNDF learns or updates of one class samples to others without being aware of any learned previously, and non-linear class learning (NCL) basic where SVM faces its difficulty in autonomous learning. The DNDF aspects discussed herein enable cognitive mechanisms for intelligent systems where autonomy, adaptation, and feedback processes play a key role in artificial intelligence.

In particular, the NDF is new concept that can represent a data set of individual classes of a set of classes in non-linear distribution via machine learning. Competitive decisions are determined among the NDFs of each class. Additionally, the DNDF learns its own data set and does not need to know other data sets, which better emulates the biology of learning. Furthermore, self-adjusting neural gain is used for activation functions, which is used for proper learning from new classes (arriving later) via feedback results. Hence, the DNDF aspects discussed herein enable an autonomous learning system for cognitive capabilities to obtain self-learning goals.

The present disclosure also provides a DNDF architecture that handles data more effectively than existing ML techniques, and provides several advantages over existing ML techniques including, for example, the DNDF architecture is faster at learning and uses a less a complex ML architecture than existing approaches since there is no competition between classes; the DNDF architecture allows for unsupervision and self-learning due to being equipped with a dynamic learning architecture; the DNDF architecture enables autonomous learning via a feedback mechanism by changing the neural gain; and the DNDF architecture can accommodate new classes in a way that emulates biological learning capabilities better than existing techniques, and therefore, the DNDF architecture does not need to restart the learning process (which is not the case with existing ML approaches).

One benefit of the DNDF approaches discussed herein is that it reduces the learning time due to not learning against other NDFs. For example, a DNDF architecture is capable of learning class A, class B, and class C separately and independently from one another, while traditional techniques such as backpropagation (backprop), learns in sequences (e.g., Class A, NOT Class B, NOT Class C), (NOT Class A, Class B, NOT Class C), and (NOT Class A, NOT Class B, Class C). In addition, backprop learning competition among classes requires substantial time to iterate them to settle down. DNDF reduces n times of learning time with n classes. In this way, DNDF uses less computational resources and less computational time than existing machine learning approaches. DNDF also has no conversion problem where the challenges for learning like backprop are often faced. Another benefit of the DNDF approaches discussed herein is that there is no architecture crisis where it is started with a simple perceptron and then more neurons are added until the goal is met. By contrast, backprop techniques require a predetermined architecture, which can be done with simple data set and an experienced user. If no conversion, the system is dismantled and starts all over again. DNDF also provides autonomy which incorporates the feedback loop to adjust the neuron gain to meet the learning goals. This enables autonomous learning with a high level of confidence and/or provides robust learning.

1.1. Learning Approaches 1.1.1. Cascade Error Projection Learning

In various implementations, the DNDF uses a Cascade Error Projection (CEP) neural network (NN) learning algorithm (see e.g., Tuan A. Duong, Cascade Error Projection—An Efficient Hardware Learning Algorithm, Proceedings of Int'l Conference on Neural Networks (ICNN'95), vol. 1, pp. 175-178 (27 Oct. 1995), Duong et al., Cascade Error Projection Learning Algorithm, NASA Jet Propulsion Laboratory (JPL), JPL clearance no. 95-0760 (May 1995), http://hdl.handle.net/2014/30893, Tuan A. Duong, Convergence Analysis of Cascade Error Projection—An Efficient Learning Algorithm for Hardware Implementation, Int'l J. of Neural Systems, vol. 10, no. 03, pp. 199-210 (June 2000), Tuan A. Duong, Cascade Error Projection Learning Theory, NASA Jet Propulsion Laboratory (JPL), JPL clearance no. 95-0749 (May 1995), and Duong et al., Shape and Color Features for Object Recognition Search, Handbook of Pattern Recognition and Computer Vision, Chap. 1.5, Ed. C. H. Chen, 4th Edition by World Scientific Publishing Co. Pte. Ltd., (January 2010), the contents of each of which are hereby incorporated by reference in their entireties). The CEP algorithm was developed by the PI for NASA-specific missions. The CEP NN algorithm has been shown to be successful for applications, such as quality food detection, landing site identification, and life detection (see e.g., Fiesler et al., Color Sensor and Neural Processor on One Chip, Proc. SPIE 3455, Applications and Science of Neural Networks, Fuzzy Systems, and Evolutionary Computation, pp. 214-221 (13 Oct. 1998); https://doi.org/10.1117/12.326715, Tuan A. Duong, Real Time Adaptive Color Segmentation for Mars Landing Site Identification, J. of Advanced Computational Intelligence and Intelligent Informatics, Japan, vol. 7, no. 3, 200, pp. 289-293, Duong et al., Neural Network Learning for Reduced Ion Mobility of Amino Acid Based on Molecular Structure, 37th Annual Lunar and Planetary Science Conference, p. 1474-1475 (March 2006); WCCI'06, Canada, pp. 1078-1084 (16-21 Jul. 2006).

FIG. 1 depicts an example CEP NN architecture 100 that includes a set of inputs 101 (e.g., including $X_1$ to $X_n$ belonging to an input pattern $X^p$), a set of learned frozen weights 102 (also referred to as "learned frozen weight set 105" or the like), a previous hidden unit 110, a learned weight block 115, a current hidden unit 120, a set of calculated frozen weights 125 (also referred to as "calculated frozen weight set 125" or the like), a set of calculated weights 130, a set of neuron activation functions 133-1 to **133-*m* (where m is a number), and a set of output units 135. In the following discussion, the set of learned frozen weights 102 is denoted as $W_{ih(n)}$, the learned weight block 115 is denoted as $W_{ih(n+1)}$, the set of calculated frozen weights 125 is denoted as $W_{in}$ or $W_{io}$, the set of calculated weights 130 is denoted as $W_{ho(n+1)}$ or $W_{ho(n+1)}$, and the set of output units 135** is denoted as $$(O_l^p, \ldots, O_m^p)$$

In FIG. 1, the shaded circles are a learned weights that is/are frozen ($W_{ih(n)}$), the unshaded (open) circles are learned weights ($W_{ih(n+1)}$), the shaded squares are calculated weights that are computed and frozen ($W_{in}$), and the unshaded (open) squares are calculated weights ($W_{ho(n+1)}$). In particular, the circles indicate that learning is applied to obtain the weight set using perceptron learning, and squares indicate that the weight set is deterministically calculated Additionally, the unshaded (open) circles and squares are weight components that determine the weight values by learning or calculation.

In some examples, the weights $W_{ih(n)}$ are learned from a frozen NN and/or the weights $W_{ih(n)}$ are frozen during a training process. Here, the weights $W_{ih(n)}$ are learned from previous frozen hidden units and it inputs, and then the weights $W_{ih(n)}$ are frozen at the end of that training process. A frozen NN is one in which only portion of the NN's parameters are trained and the remaining parameters are frozen at their initial (pre-trained) values, leading to faster convergence and a reduction in the resources consumed during the training process. By freezing the weights, the number of trainable parameters is shrunken which reduces gradient computations and the dimensionality of the model's optimization space. As examples, weight set $W_{ih(n)}$ can be frozen and/or learned according to any suitable freezing technique, such as any of those discussed in Wimmer et al., Dimensionality Reduced Training by Pruning and Freezing Parts of a Deep Neural Network, a Survey, arXiv: 2205.08099v1 [cs.LG] (17 May 2022), the contents of which is hereby incorporated by reference in its entirety.

The CEP NN architecture 100 includes two sub-networks, including a first sub-network that uses perception (perceptron) learning (e.g., a primary network) and a second sub-network that uses deterministic calculations (e.g., a secondary network). In this example, the first sub-network corresponds to the calculated frozen weight set 125, and the second sub-network corresponds to the current hidden unit 120. The architecture 100 starts out as a single layer perception and adds hidden units when needed, one after another. The network contains n hidden units and the learning cannot be improved any further in the energy level. At this point, a new hidden unit (e.g., n+1) is added to the network. Additionally, N is the dimension of the input space, n+1 is the dimension of the expanded input space (e.g., n+1 is dynamically changed and is based on the learning requirement), m is the dimension of the output space, P is the number of training patterns, and f is a sigmoidal transfer function which is defined by equation (5). Additionally or alternatively, each of the neuron activation functions 133-1 to **133-*m* (collectively referred to as "neuron activation functions 133" or "neuron activation function 133**") may be logistic and/or sigmoidal activation functions (e.g., which may be the same or similar as the sigmoidal transfer function *f*), or some other type of activation function, such as any of those discussed herein). Additionally or alternatively, the neuron activation functions 133 may have the same or similar activation functions as the hidden units. Other notions are summarized in Table 1, infra.

An energy function for the CEP NN architecture 100 is defined by equation (1), and equation (2) denotes the error for output index o and training pattern p between target t and the actual output o(n), wherein n indicates the output with n hidden units in the network.

$$E(n+1) = \sum_{p=1}^{P}\left\{f_h^P(n+1) - \frac{1}{m}\sum_{o=1}^{m}\left(t_o^P - O_o^P\right)\right\}^2 \quad (1)$$

$$\varepsilon_o^P = t_o^P - O_o^P(n) \quad (2)$$

The weight update between the inputs (including previously added or expanded hidden units) and the newly added hidden unit is calculated as shown by equation (3).

$$\Delta w_{ih}^P(n+1) = -\eta\frac{\partial E(n+1)}{\partial w_{ih}^P(n+1)} \quad (3)$$

Additionally, the weight updates between hidden unit n+1 (or hidden unit h) and the output unit o is shown by equation (4) with the sigmoidal transfer function which is defined by equation (5).

$$w_{ho}(n+1) = \frac{\sum_{p=1}^{P}\varepsilon_o^P f_o'^P f_h^P(n+1)}{\sum_{p=1}^{P}[f_o'^P f_h^P(n+1)]^2} \quad (4)$$

$$f(x) = \frac{1-e^{-x}}{1+e^{-x}} \quad (5)$$

Notations used in equations (1), (2), (3), (4), (5), (6), (7), (8) are summarized by Table 1.

TABLE 1

| Parameter | Description |
|---|---|
| E | energy function |
| $\varepsilon_o^P$ | Error output index o and training pattern p between target t and the actual output o(n) (see equation (2), supra) |
| f | sigmoidal transfer function which is defined by equation (5), supra |
| $f_h^P$ | sigmoidal transfer function for training pattern p and hidden unit h |
| $f_o'^P(n) = f_o'^P$ | an output transfer function derivative with respect to its input index 0 and training pattern p |
| $f_h^P$ (n + 1) | a transfer function of hidden unit n + 1 for training pattern p |
| h | hidden unit |
| ih | denotes input hidden unit |
| m | the dimension of the output space and/or the number of outputs |
| n | the number of previously added hidden units |
| n + 1 | the dimension of the expanded input space |
| N | the dimension of the input space and/or the number of input units |
| η | a learning rate, which may be a predefined or configured value |
| α | neural gain (in some examples, α = η) |
| o | output unit |
| o(n) | output unit with n hidden units in the network |
| $O_o^P(n)$ | output element o of the actual output o(n) for training pattern p |
| p | a training pattern currently being processed (e.g., a "subject training pattern") |
| P | the number of training patterns |
| t | a target (also referred to as "target element") |
| $t_o^P$ | target element of output unit o for input training pattern p |
| $\Delta w_{ih}^P$ | The weight update between inputs including previously added hidden units n and the newly added hidden unit n + 1 |
| $W_{in}$ | calculated weights that are frozen |
| $W_{ih(n)}$ | learned weights that are frozen for hidden unit n |
| $W_{ih(n+1)}$ | learned weights that are frozen for hidden unit n + 1 |
| $W_{ho}$ | calculated weights |
| $W_{ho(n+1)}$ | calculated weights at n + 1 |
| $X_n$ | denotes the input of hidden unit n |
| $X^P$ | denotes the input pattern p or a p-dimensional vector |

In some implementations, the CEP learning algorithm is processed in two steps wherein a first step includes single perceptron learning, and a second step includes obtaining the weight set $W_{ho(n+1)}$. The single perceptron learning is governed by equation (3) to update the weight vector $W_{ih(n+1)}$ (step 1). When the single perceptron learning is completed, the weight set $W_{ho(n+1)}$ can be obtained by the calculation governed by equation (4) (step 2). An example CEP learning procedure is shown by FIG. 2.

Figure 2:
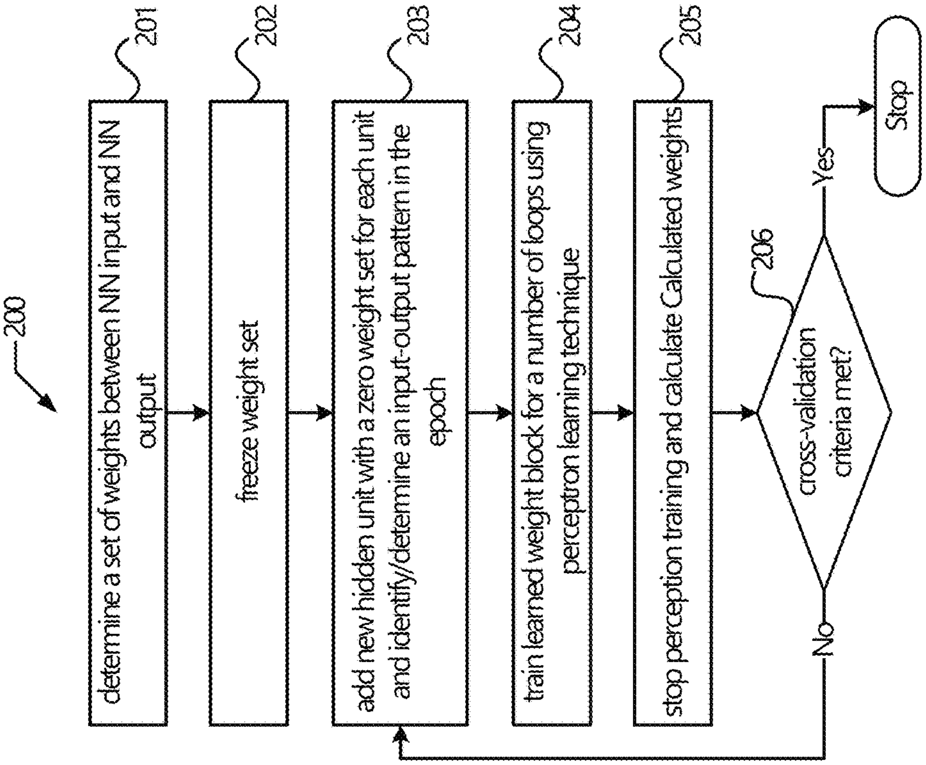
Figure 14:
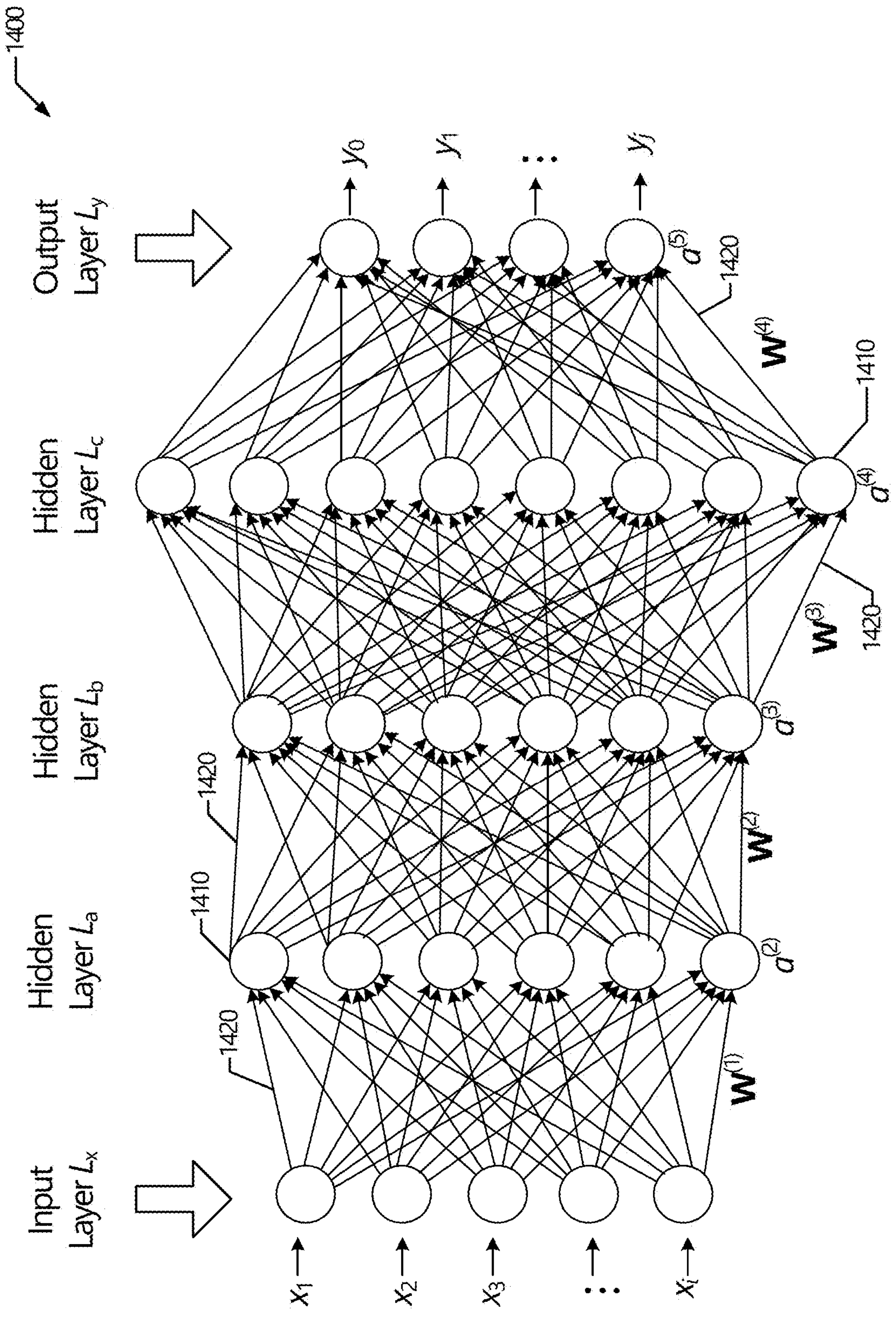
FIG. 14 depicts an example neural network (NN).
Figure 15:
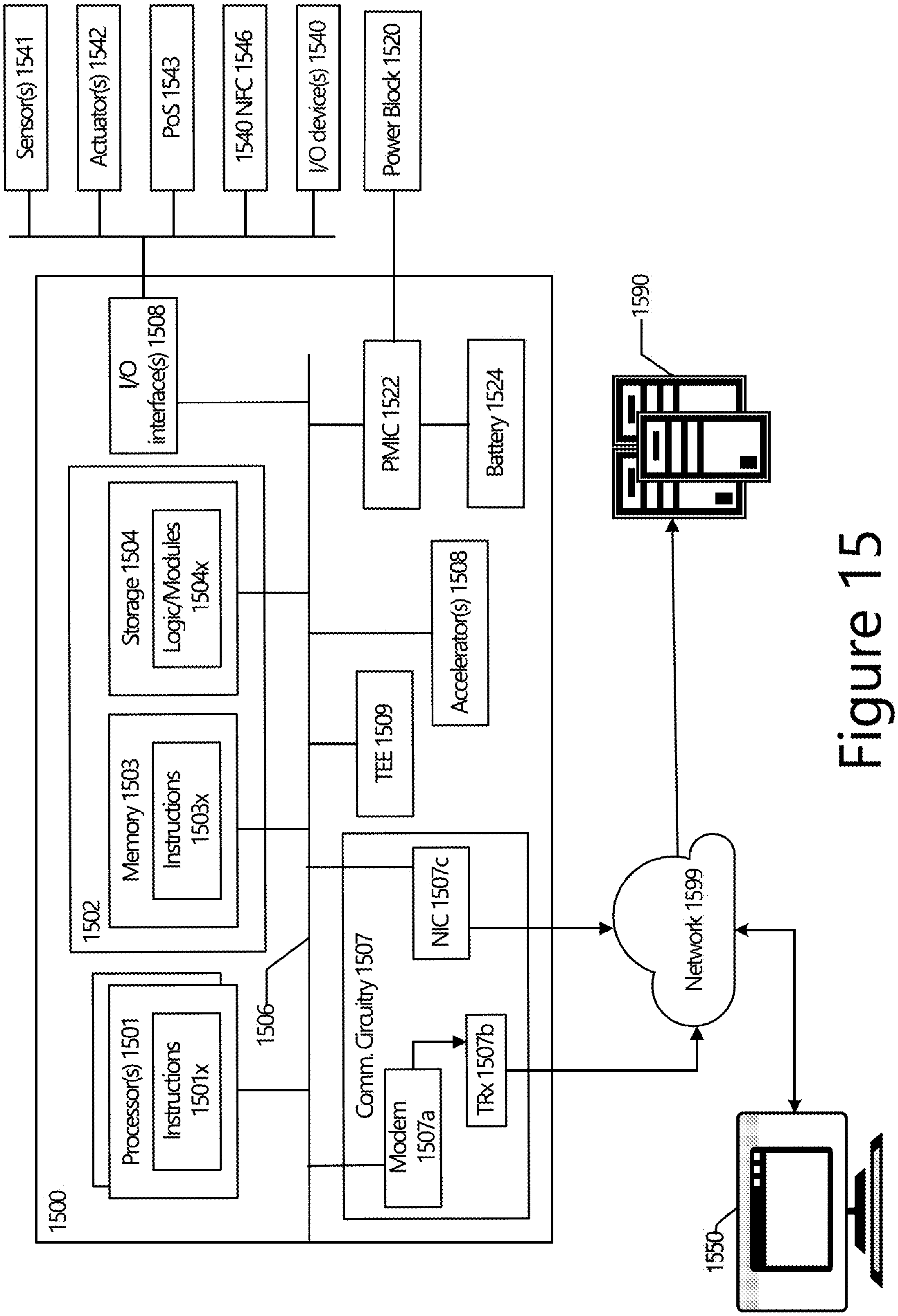
FIG. 15 illustrates an example computing system suitable for practicing various aspects of the present disclosure.

FIG. 2 shows an example CEP learning procedure 200, which may be performed by a suitable computer node 1500 (e.g., computer node 1500, client device 1550, and/or remote system 1590 of FIG. 15). The CEP learning procedure 200 starts with a neural network, which has input and output neurons (see e.g., FIG. 14). With the given input and output patterns and hyperbolic transfer function, at operation 201, the computer node 1500 determines a set of weights (e.g., weight set $W_{io}$) between the input and output using, for example, pseudo-inverse learning and/or perceptron learning. At operation 202, the computer node 1500 freezes the weight set $W_{io}$. At operation 203, the computer node 1500 adds a new hidden unit with a zero weight set for each unit. In each loop (contains an epoch) an input-output pattern is picked up randomly in the epoch (no pattern is repeated until every pattern in the epoch is pick). At operation 204, the computer node 1500 uses a perceptron learning technique of equation (3) to train the weight set $W_{ih(n+1)}$ for a predetermined or configured number of loops (e.g., 100 loops). At operation 205, the computer node 1500 stops the perception training and calculate the weight(s) $W_{ho(n+1)}$ between the current hidden unit n and the output units from equation (4). At operation 206, the computer node 1500 performs a cross-validation of the network, and determines if the criteria is satisfied. If so, the procedure 200 ends. Otherwise, the computer node 1500 proceeds back to operation 203. In some examples, the computer node 1500 loops back to operation 203 until the number of hidden units is more than a predefined or configured amount (e.g., 20) and then terminations the procedure 200.

Referring back to FIG. 1, the number of computations for a complete learning DNDF can be formulated as shown by equation (6).

$$NP = N_p\left[(n+n_o)n_i + \frac{n(n-1)}{2} + 6n_o + (n-1)n_o\right]N_{iter} \tag{6}$$

In equation (6), NP is the number of computations (e.g., iterations, epochs, or the like) that should be performed for complete DNDF learning, $N_{iter}$ is a number of learning iteration, $N_p$ is a number of training patterns, n is a number of hidden units, $n_i$ is a number of input units, and $n_o$ is a number of output units. Additionally, the computations (e.g., multiplication and addition) can be approximated as shown by equation (7), where O(•) refers to the "order of" or a measure of complexity in Big O notation, which is a mathematical notation that describes the limiting behavior of a function or algorithm when the argument tends towards a particular value or infinity. The Big O notation is often used to classify algorithms according to how their running time or space requirements grow in size as the input size grows. It should be noted that the specific time and/or size complexity of a specific implementation may vary based on the memory structures used when operating the algorithms.

$$O(N_p(n+n_o)n_iN_{iter}) \tag{7}$$

1.1.2. Neural Distribution Function Aspects

An NDF is a distribution of predictions or inferences produced by a learning algorithm (e.g., the CEP learning algorithm discussed previously and/or any other suitable NN/learning algorithm, such as any of those discussed herein). In some examples, an NDF can be viewed as similar to the concept of a Gaussian distribution and/or a probability density function in that each NDF can include a continuous probability distribution for predictions generated using a learning algorithm (e.g., CEP learning and/or some other ML algorithm/model, such as any of those discussed herein). In some examples, each NDF is an individual NN, which may be arranged or configured in any suitable NN topology and/or using any suitable ML technique, such as any of the NNs/ML techniques discussed herein. In some implementations, an NDF can be expressed as shown by equation (8), where $\psi_k$ is defined as an NDF of class k and is synthesized via CEP learning to obtain Ñ, where Ñ is a function of $w_k$ sets, $w_k$ is a set of weights for class k, $n_k$ is a number of hidden units of class k in the cascading architecture (e.g., CEP NN architecture 100 of FIG. 1), $\alpha_k$ is a neural gain (e.g., learning rate or adaptive control factor), and X is an input vector/tensor (which may be the same or similar as $X^p$ discussed previously). In some examples, the $\psi_i$ is the same as the output unit $O_i$ from FIG. 1 (e.g., output unit 135). In some examples, the neural gain $\alpha_k$ is the same as the learning rate parameter $\eta$ of equation (3) (supra). Additionally, the NDFs $\psi_k$ and $\psi_j$ are trained independently from one another, and have no correlation with each other and/or other distribution functions.

$$\psi_k = \hat{N}(w_k, n_k, \alpha_k, X) \tag{8}$$

1.1.2.1. Neural Distribution Architecture

Figure 3:
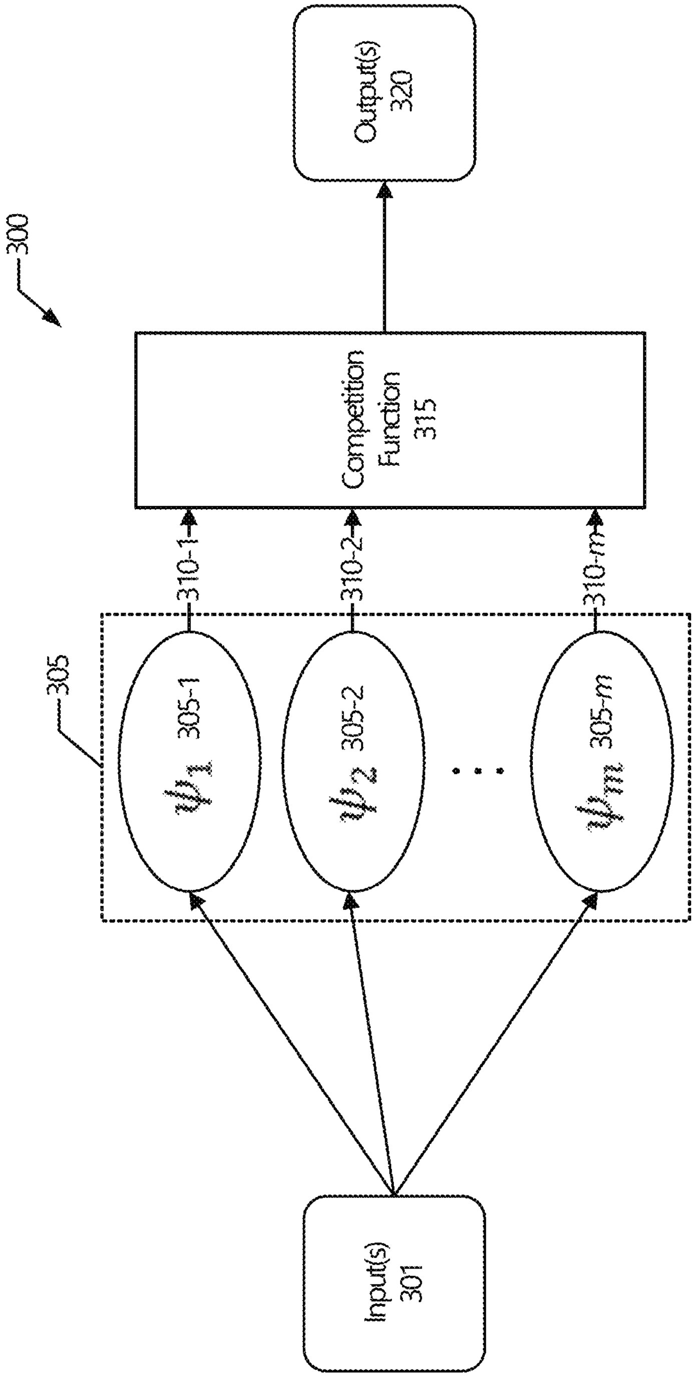
FIG. 3 depicts an example DNDF architecture.

FIG. 3 depicts an example DNDF architecture 300. The DNDF architecture 300 includes independent NDFs 305-1 to **305-*m* (collectively referred to as "NDFs 305" or "NDF 305") and a competition function 315 that is used to determine a winning output 310 as a classifier. In the DNDF architecture 300, each NDF 305 includes its own NDF $\psi_k$ (where k is a number between 1 and m) that is learned using its own class data, independently and sequentially (see e.g., equation (8)), and the data is not constrained by the number of samples (e.g., can be a few samples, or a single sample). For example, each NDF 305 may be learnt using the CEP learning procedure 200 and/or CEP NN architecture 100 discussed previously. Additionally or alternatively, each NDF 305 is an individual NN (see e.g., NN 1400 of FIG. 14), which may be arranged or configured in any suitable NN topology and/or using any suitable ML technique, such as any of the NNs/ML techniques discussed herein. Furthermore, some NDFs 305 may have different configurations, arrangements, and/or topologies than one or more other NDFs 305. For example, NDF 305-1 can have a first ML arrangement/topology, NDF 305-2 can have a second ML arrangement/topology, and NDF 305-*m* can have a m-th ML arrangement/topology, where the first ML arrangement/topology may be the same or different than the second ML arrangement/topology and/or the m-th ML arrangement/topology. Additionally or alternatively, each NDF 305 may have the same or different activation functions, and any suitable activation function can be used for an individual NDF 305, such as any of those discussed herein. Additionally or alternatively, each NDF 305 is a respective subnetwork (or "subnet") of a super-network (or "supernet"), wherein the super-network comprises the set of NDFs 305. Here, the supernet may be a relatively large and/or dense ML model that contains a set of smaller subnets, and each of the subnets may be training individually and/or in isolation from on another (and independent of training the supernet as a whole). Additionally or alternatively, the set of NDFs 305** can be arranged in a suitable ML pipeline and/or ensemble learning arrangement.

The NDFs 305 produce respective outputs 310-1 to **310-*m* (collectively referred to as "outputs 310" or "output 310"), which are provided to a competition function 315. In some examples, each output 310 may be, or include, a DB derived and established from its corresponding NDF 305 and/or a set of classification datasets assigned to different sides of the DB. In some examples, the output 310 is learned using the same learning algorithm used to generate or create the corresponding NDF 305. In some examples, the DB is learned using a passive learning mechanisms/technique. In any of the implementations discussed herein, the format/structure of each output 310 may be a single value, a vector or tensor in the range of [0-1], or some other suitable data structure. In some implementations, the outputs 310 are candidates (e.g., candidate DBs and/or classifications), and the competition function 315 performs a predefined, configured, or learned competition to select a "winning" candidate output 310 among the set of outputs 310-1 to 310-***m*, and then generates the output 320 to include the "winning" candidate output 310. As examples, the competition function 315 can be implemented or otherwise embodied as a maximum (max) function, minimum (min) function, folding (fold) function, radial function, ridge function, softmax function, maxout function, argument of the maximum (arg max) function, argument of the minimum (arg min) function, ramp function, identity function, step function, Gaussian function, a logistic function, a sigmoid function, a transfer function, and/or any other suitable function or algorithm, such as any of those discussed herein or any combination thereof. Additionally or alternatively, the competition function 315 is implemented or otherwise embodied as an ML model that is trained to select "winning" candidates 310 based on learnt parameters, configurations, conditions, and/or other criteria. In some examples, the competition ML model 315 can be implemented as a reinforcement learning (RL) model and/or any other ML model/algorithm, such as any of those discussed herein. Additionally or alternatively, the competition ML model 315 can be trained to select a "winning" candidate 310 based on, for example, ML configuration data (e.g., model parameters, hyperparameters, parameters/configuration of a hardware (HW) platform running the architecture 300, and the like), various measurements/metrics of ML model/algorithm performance (e.g., such as any of those discussed herein and/or as discussed in [Naser] and/or [Naser2]), measurements/metrics of the HW platform on which the ML model/algorithm is running and/or is designed to run on (e.g., such as any of those discussed herein and/or as discussed in [VTune]), and/or any other parameters, conditions, and/or criteria, such as any of those discussed herein.

To validate its performance, a test vector (e.g., an input vector X as described previously) is served as an input 301 to each NDF 305, and each NDF 305 produces or otherwise generates a corresponding (candidate) output 310 that is provided to the competition function 315. The outputs 310 are compared through the competition function 315 to obtain an index of a "winning" output (candidate) 310 to determine a class that the winner's index belongs to. Here, the output 320 is an index or other reference pointing to the "winning" one of the outputs 310, and the "winner" (or "winning class") is an output 310 having a highest or maximum value among the set of outputs 310-1 to outputs 310-*m*. For example, where the competition function 315 is a max function, the competition function 315 compares the outputs 310 and obtains an index of the maximum output 310 to determine what class it belongs to. In some examples, the DNDF architecture 300 is used to test exclusive OR (XOR) and additive class learning (ACL) where data is nonlinear, but not ambiguous, as is discussed infra.

1.1.2.2. Neural Distribution Architecture with Feedback Mechanism

Figure 4:
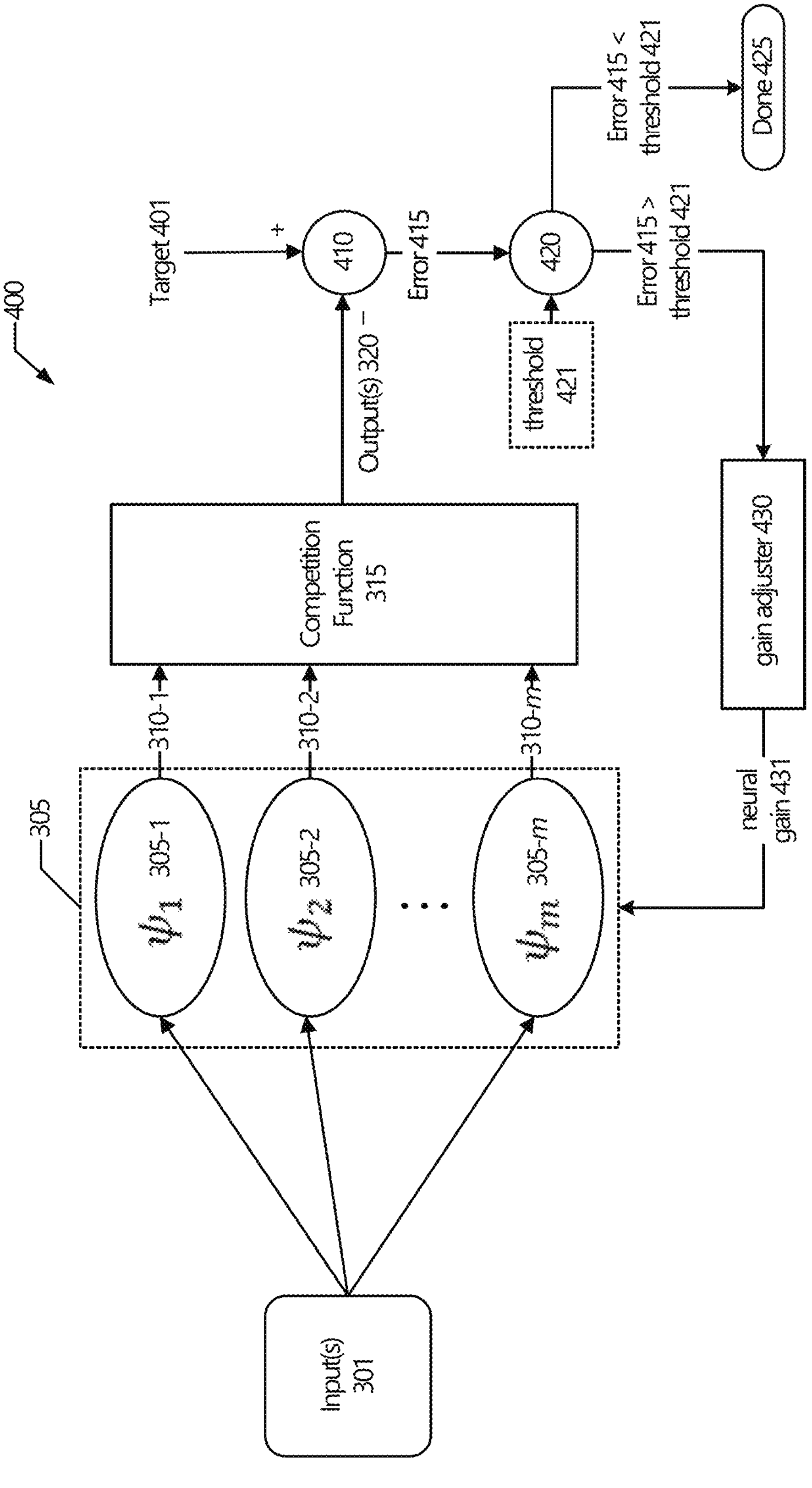
FIG. 4 depicts an example DNDF architecture with a feedback mechanism.

FIG. 4 depicts an example feedback DNDF architecture 400. The DNDF architecture 400 includes the DNDF architecture 300 with a feedback mechanism for enabling learning autonomy. Here, the output(s) 320 of the competition function 315 are provided to a comparison function (comparator) 410, which compares the output(s) 320 with a target 401 configuration or parameter set. The target 401 is a given new class of m. In some examples, the target 401 is the same as the target t and/or $$t_o^P$$

in Table 1. The comparator 410 produces an error value 415 (e.g., root mean square (RMS) error or some other quantification of error) based on the comparison of the output(s) 320 with the target 401. In one example, the comparison performed by the comparator 410 may be expressed as shown by equation (2) (supra). Additionally or alternatively, the comparison performed: by the comparator 410 may be expressed as shown by equation (9), where ε is the error value 415, comp(•) is the competition function 315, t is the target 401, D is the winning NDF 305, selected output 315 and/or output 320, and j=1: k.

$$\varepsilon = t - comp(D(j)) \tag{9}$$

In an example where the competition function 315 is a max function, the comp(•) in equation (9) may be replaced with max(•). The error value 415 is then provided to a comparator 420. The comparator 420 compares the error 415 with a predefined or configured error threshold 421. In some examples, the comparator 420 comprises one of the comparison mechanisms/functions discussed previously w.r.t comparator 410, or may include any of the competition mechanisms/functions discussed herein. Additionally or alternatively, the comparator 420 may be the same or similar as the comparator 410 or otherwise operates in a same or similar manner as the comparator 410. If the error 415 is less than the threshold 421, the learning is completed 425. If the error 415 is more than the threshold 421, a neuron/neural gain adjuster 430 adjusts a neural gain 431 (e.g., $\alpha_k$), which is then fed back to each of the NDFs 305.

The neural gain 431 output by the gain adjuster 430 may include the actual, updated/adjusted neural gains a to be used by corresponding NDFs 305, or the neural gain 431 output by the gain adjuster 430 may include respective update/adjustment factors and/or respective gain update/adjustment types that is/are to be used by the corresponding NDFs 305 to adjust their own neuron gain α, accordingly. Additionally, in some implementations, the neural gain α of each NDF 305 is independent of the neural gain α of other NDFs 305.

For example, a neural gain α-1 of NDF 305-1 is independent of a neural gain α-2 of NDF 305-2, such that neural gain α-1 may or may not be equal to neural gain α-2. In these implementations, the gain adjuster 430 may change different neural gains a differently for one or more of the NDF 305. For example, the neural gain α-1 of NDF 305-1 may be changed by a first amount, the neural gain α-2 of NDF 305-2 may be changed by a second amount, and the first amount may be greater than, less than, or equal to the second amount. The specific values, types, and/or adjustment/update factors of each neural gain α may be implementation-specific, based on use case and/or design choice (e.g., ML parameter selection), and may vary from embodiment to embodiment. In some examples, if the learning still contains more than the threshold amount 421 of errors 415, the neural gain 431 is reduced by the neuron/neural gain adjuster 430 iteratively until the learning process is completed (e.g., after a predefined or configured number of epochs/iterations, when the ML model 400 converges to a predefined, configured, or learned value, and/or based on some other conditions or criteria). In some examples, the feedback mechanism (e.g., 410, 420, 430) is only used for current new classes to ensure the training is completely correct. In these ways, the feedback mechanism of FIG. 4 enables the autonomy of the learning system. Additionally or alternatively, the DNDF architecture 400 may be useful for use cases where data becomes ambiguous and/or when unmanned learning operation is desired. In one example implementation, the NDFs 305 are subnets or components of an object recognition model (e.g., a supernet), and the DNDF architecture 400 is used to train the object recognition model. In an example, the object recognition model, when trained, is configured to perform object recognition in image and/or video data by emulating retina, fovea, and lateral geniculate nucleus (LGN) of a vertebrate based on simulated/emulated saccadic eye movements.

Figure 5:
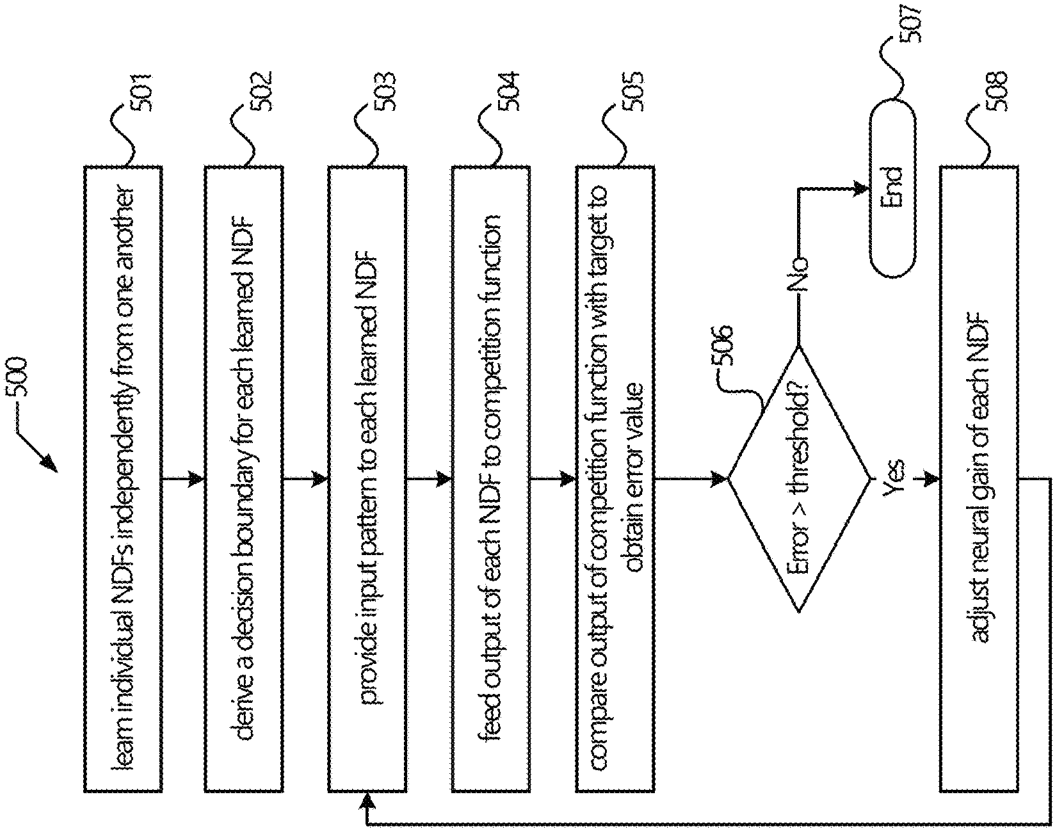
FIGS. 2 and 5 depict example procedures that may be used to practice the various aspects discussed herein.

FIG. 5 depicts an example DNDF process 500, which may be performed by a DNDF (e.g., DNDF architecture 300 and/or 400 discussed previously), or by a suitable computer node 1500 on which the DNDF operates (e.g., computer node 1500, client device 1550, and/or remote system 1590 of FIG. 15). The DNDF process 500 begins at operation 501 where the DNDF learns individual NDFs 305 independently from one another. For example, the individual NDFs 305 may be learned using the CEP learning procedure 200 and/or some other learning algorithm.

At operation 502, the DNDF derives or otherwise determines a DB for each learned NDF 305 independently from one another. In some examples, the DB of each class (or each NDF 305) is learned using the same learning algorithm as used in operation 501 (e.g., the CEP learning procedure 200 and/or the like). Additionally or alternatively, the DB of each class can be derived using the same competition mechanism/function of the competition function 315, or a different one or more of the competition mechanisms/functions discussed previously with respect to competition function 315.

At operation 503, the DNDF provides an input pattern $X^p$ (e.g., including a set of inputs $X_1$ to $X_n$) to each NDF 305. In some examples, the input pattern $X^p$ may be in the form of a feature vector or tensor comprising a set of data points to be classified or otherwise manipulated by each NDF 305. Each NDF 305 produces a respective output 310 based on the input pattern $X^p$, which is then fed to a competition function 315 at operation 504. In some examples, the output 310 produced by each NDF 305 is a new or updated DB for the NDF 305. Additionally or alternatively, each NDF's 305 output 310 can include classified data sets falling on different sides of the NDF's 305 DB. In some examples, an NDF's 305 DB is only counted when it is a winner of the competition function 315. At operation 505, the DNDF compares (e.g., comparator 410 of FIG. 4) the output 320 of the competition function 315 with a target 401 to obtain an error value 415. At operation 506, the DNDF determines whether the error value 415 is greater than a predefined or configured threshold 420 (e.g., comparator 420 of FIG. 4). If at operation 506 the error value 415 is not greater than the threshold 420, then the DNDF ends and/or outputs a result of the learning process at operation 507. If at operation 506 the error value 415 is not greater than the predefined/configured threshold, then the DNDF proceeds to operation 508 to adjust the neural gain 431 (e.g., learning rate) of each NDF 305, and then proceeds back to operation 503 to provide a next input pattern to each NDF 305.

1.1.2.3. Exclusive or (XOR) Problem

The exclusive OR (XOR) problem is a classic problem in artificial NN research that involves training an NN to predict the outputs of an XOR logical function given two binary inputs. The XOR problem is a classical nonlinear benchmark problem where two classes are diagonal to require a non-linear approach. A XOR function returns a value of true (or "1") if two inputs to the XOR function are not equal, and returns a value of false (or "0") if the two inputs to the XOR function are equal. However, the outputs of a XOR function are not linearly separable, which is a desirable capability for many NNs (including perceptrons) to have.

In this context, linear separability refers to the ability of an NN (e.g., an individual NDF 305) to classify data points to fall on one side of a DB on another side of the DB. In other words, linear separability of data points is the ability for an NN to classify data points in a hyperplane by avoiding the overlapping of classes in the planes such that data points belonging to individual classes should fall on one side of the DB or the other. The outputs generated by a XOR function are not linearly separable because the output data points will overlap with a linear DB line and/or different classes occur on a single side of the linear DB. Therefore, the XOR problem was used to test and/or ensure the non-linear separability of the DNDF architectures 300, 400. The data and computation requirements for the XOR problem are shown in Table 2, and its performance parameters are shown in Table 3.

TABLE 2

Sample data for XOR problem

| | | | | | | | | | |
|---|---|---|---|---|---|---|---|---|---|
| Class Red (−1) | 1.0 | 0.8 | 1.1 | 1.2 | 1.1 | 0.8 | 0.9 | 1.2 | 0.9 |
| X | 1.0 | 1.2 | 0.9 | 0.8 | 1.1 | 0.8 | 0.9 | 1.2 | 1.1 |
| Y | −1.0 | −1.2 | −0.8 | −0.8 | −0.9 | −1.1 | −1.1 | −0.9 | −1.2 |
| | −1.0 | −0.8 | −1.2 | −0.8 | −1.1 | −0.9 | −1.1 | −0.9 | −1.2 |
| Class Blue (1) | 1.0 | 1.1 | 1.1 | 0.9 | 0.8 | 1.2 | 0.8 | 0.9 | 1.2 |
| X | −1.0 | −0.9 | −1.1 | −1.1 | −1.2 | −0.8 | −0.8 | −0.9 | −1.2 |
| Y | −1.0 | −1.1 | −1.1 | −0.9 | −0.9 | −0.8 | −1.2 | −0.8 | −1.2 |
| | 1.0 | 0.9 | 1.1 | 0.9 | 1.1 | 1.2 | 0.8 | 0.8 | 1.2 |

TABLE 3

| Performance Parameters for XOR problem with RMS error = 0.001 | | | | | |
|---|---|---|---|---|---|
| | Correct Learning | RMS Error | Neuron Gain (α) | Number of Hidden Units | Number of Compu-tations |
| Class Red (1) | 100% | 0.000908 | 1.4 | 3 | 14400 |
| Class Blue (−1) | 100% | 0.000907 | 1.4 | 3 | 14400 |
| XOR learning | 100% | | | | 28800 |

Figure 6:
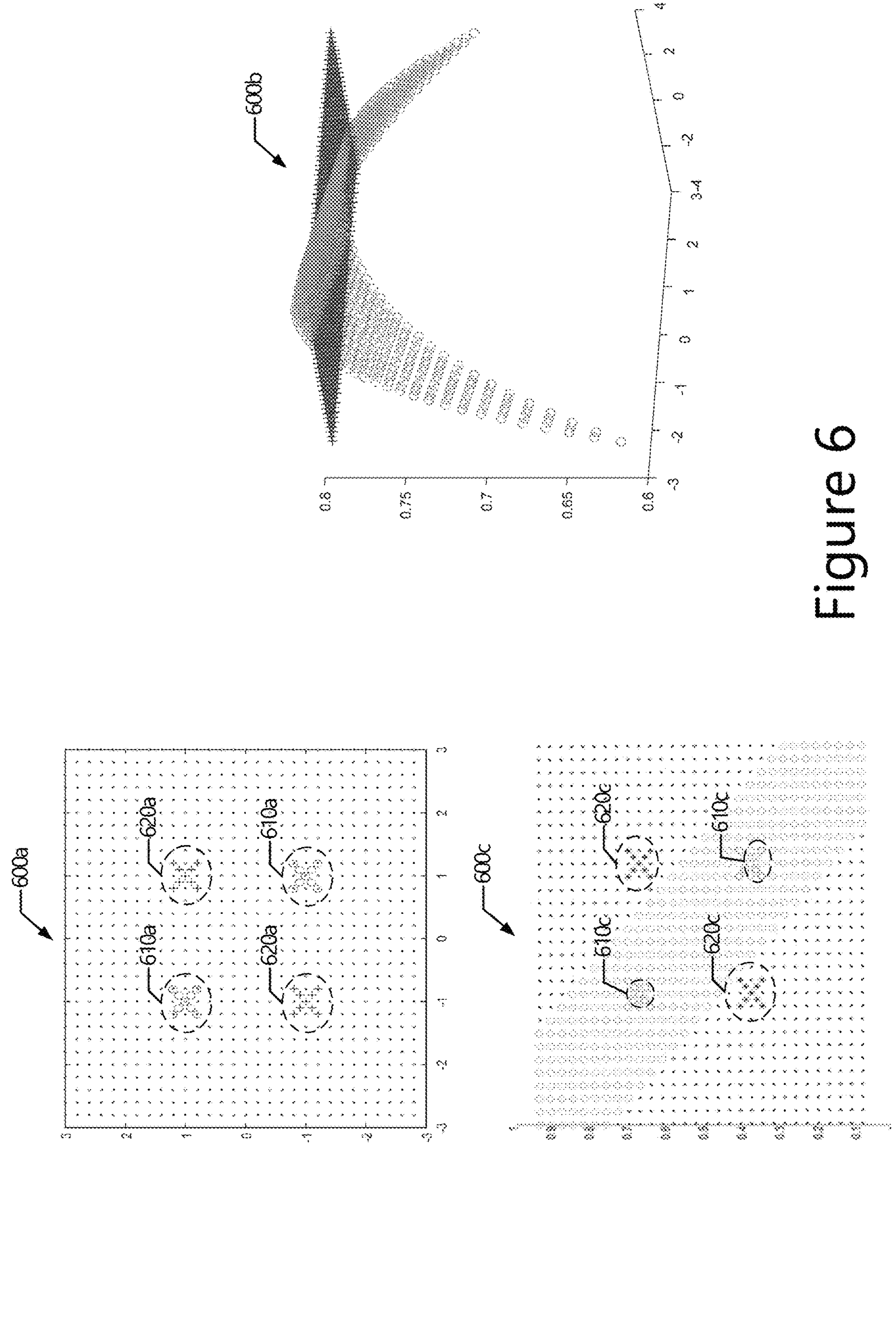
FIGS. 6, 7, 8, 9, 10, 11, 12, and 13 depict example data samples, neural distributions, and corresponding classifications based on various testing and/or validation processes.

FIG. 6 shows a data set 600*a* (including red class data points 610*a* and blue class data points 620*a*), a neural distribution 600*b*, and a corresponding classification results 600*c* (including red class data points 610*c* and blue class data points 620*c*). Based on the data set 600*a*, the neural distribution 600*b* has established on its own via CEP learning and has no knowledge of its counterparts, and the learning results in graph 600*c* are checked by a program to ensure their accuracy. Graph 600*c* shows the non-linear separability of the XOR outputs produced by the DNDF architectures 300, 400.

1.1.2.4. Additive Class Learning (ACL) Asynchronously

Additive class learning (ACL) was performed to demonstrate that the DNDF architectures 300, 400 can sequentially learn one class after another without any interference from the previous knowledge. This is resembling to our brain learning thing: non-competitive one with others in visual sense. The data and computation requirements are shown by Table 4 and Table 5.

TABLE 4

| Sample data for ACL problem | | | | | | | | | |
|---|---|---|---|---|---|---|---|---|---|
| Class Red (X, Y) | 1.0 | 1.1 | 1.1 | 0.9 | 0.9 | 0.8 | 1.2 | 1.2 | 0.8 |
| in step 1 | 1.0 | 0.9 | 1.1 | 0.9 | 1.1 | 1.2 | 0.8 | 1.2 | 0.8 |
| Class Green (X, Y) | −1.0 | −1.1 | −1.1 | −0.9 | −0.9 | −0.8 | −1.2 | −0.8 | −1.2 |
| in step 1 | −1.0 | −0.9 | −1.1 | −0.9 | −1.1 | −1.2 | −0.8 | −0.8 | −1.2 |
| Class Blue (X, Y) | −1.0 | −1.1 | −1.1 | −0.9 | −0.9 | −0.8 | −1.2 | −0.8 | −1.2 |
| in step 2 | 1.1 | 0.9 | 0.8 | 0.9 | 0.8 | 1.1 | 0.8 | 0.9 | 0.9 |
| Class Magenta (X, Y) | 1.0 | 1.1 | 1.1 | 0.9 | 0.9 | 0.8 | 1.2 | 0.8 | 1.2 |
| in step 3 | −1.0 | −0.9 | −1.1 | −0.9 | −1.1 | −1.2 | −0.8 | −0.8 | −1.2 |
| Class Back (X, Y) | 0.1 | −0.07 | −0.12 | −0.20 | −0.20 | 0.18 | 0.12− | 0.18 | 0.12 |
| in step 4 | −0.1 | 0.12 | 0.12 | −0.07 | −0.21 | −0.12 | 0.08 | −0.18 | 0.12 |
| Class Red - | 0.5 | 0.7 | 1.0 | 0.4 | | | | | |
| new Data updates | 1.0 | 0.7 | 0.5 | 0.4 | | | | | |

TABLE 5

| Performance Parameters for ACL problem with RMS error = 0.1 | | | | | | |
|---|---|---|---|---|---|---|
| Class | Correct Learning | RMS Error | Neuron Gain (α) | Number of Hidden Units | Number of Computations | Comments |
| Class Red | 100% | 0.046318 | 0.50 | 1 | 9000 | |
| Class Green | 100% | 0.046053 | 0.50 | 1 | 9000 | |
| Class Blue | 100% | 0.038563 | 0.50 | 1 | 9000 | |
| Class Magenta | 100% | 0.046138 | 0.50 | 1 | 9000 | |
| Class Yellow | 100% | 0.019144 | 1.35 | 2 | 42,300*15 | Adaptive gain |
| ACL Learning | 100% | | | | 634,500 | |

The ACL study starts with two classes, and sequentially adds additional classes into the network without any knowledge from each side. The steps of the ACL study discussed infra successfully demonstrate that the DNDF approaches discussed herein is able to learn one after another class in a similar manner as the human brain.

Figure 7:
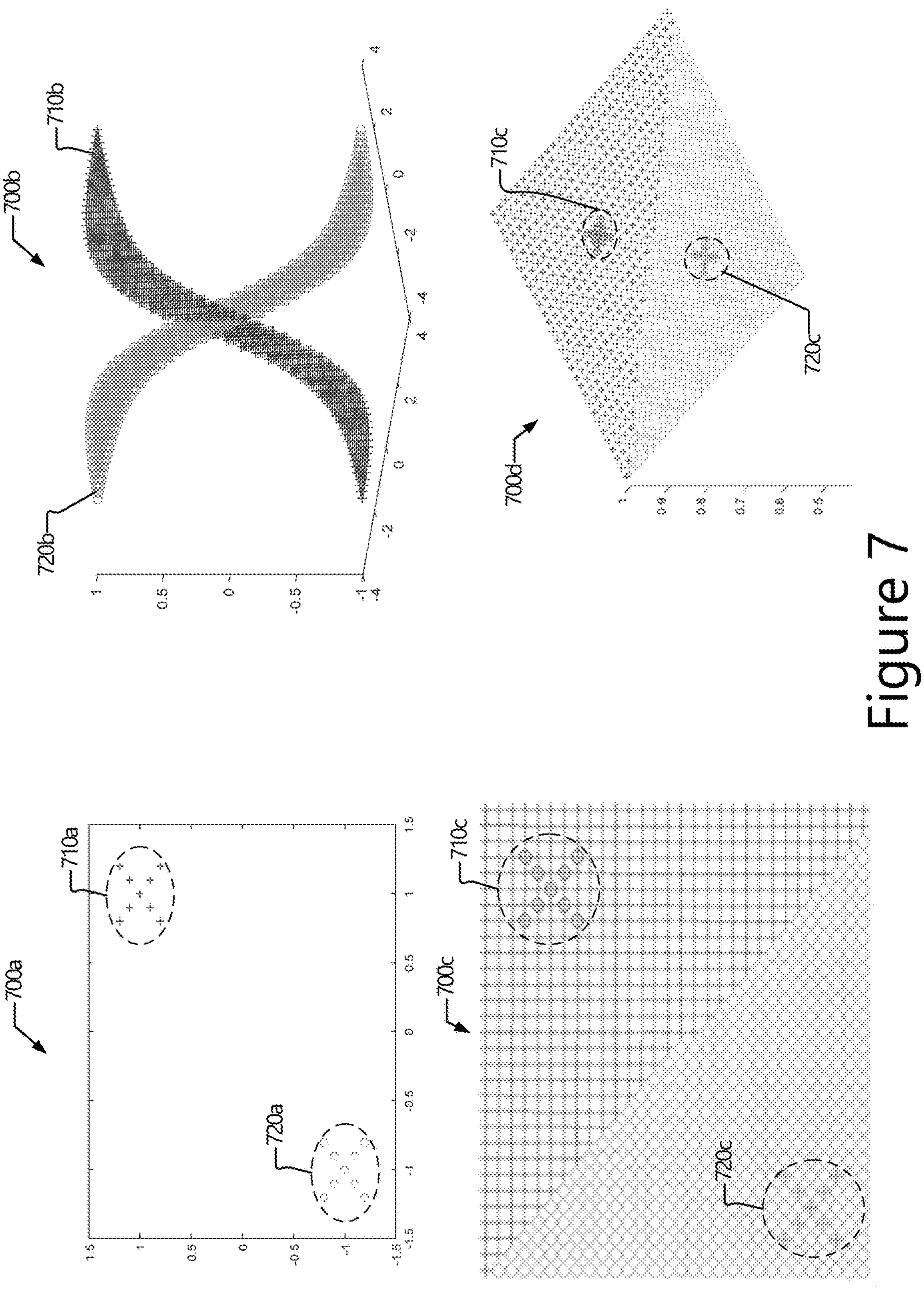

FIG. 7 shows step 1 of the ACL study, which involves learning two distributions. Here, two data sets are provided for a red class (e.g., red class data set 710*a*) and a green class (e.g., green class data set 720*a*), as shown in Table 4. This is also graphically shown by graph 700*a* in FIG. 7. After CEP learning, two DNDFs (e.g., NDFs 305) are obtained, including a red class DNDF 710*b* and a green class DNDF 720*b* as shown by graph 700*b* in FIG. 7 and the corresponding performance results have a learning accuracy being 100% correct as shown by graph 700*c* (including blue class data points 710*c* and magenta class data points 720*c*). Graph 700*d* shows another view of graph 700*c*. Graphs 700*c* and 700*d* show the linear separability of the outputs produced by the DNDF architectures 300, 400 for step 1 of the ACL study.

Figure 8:
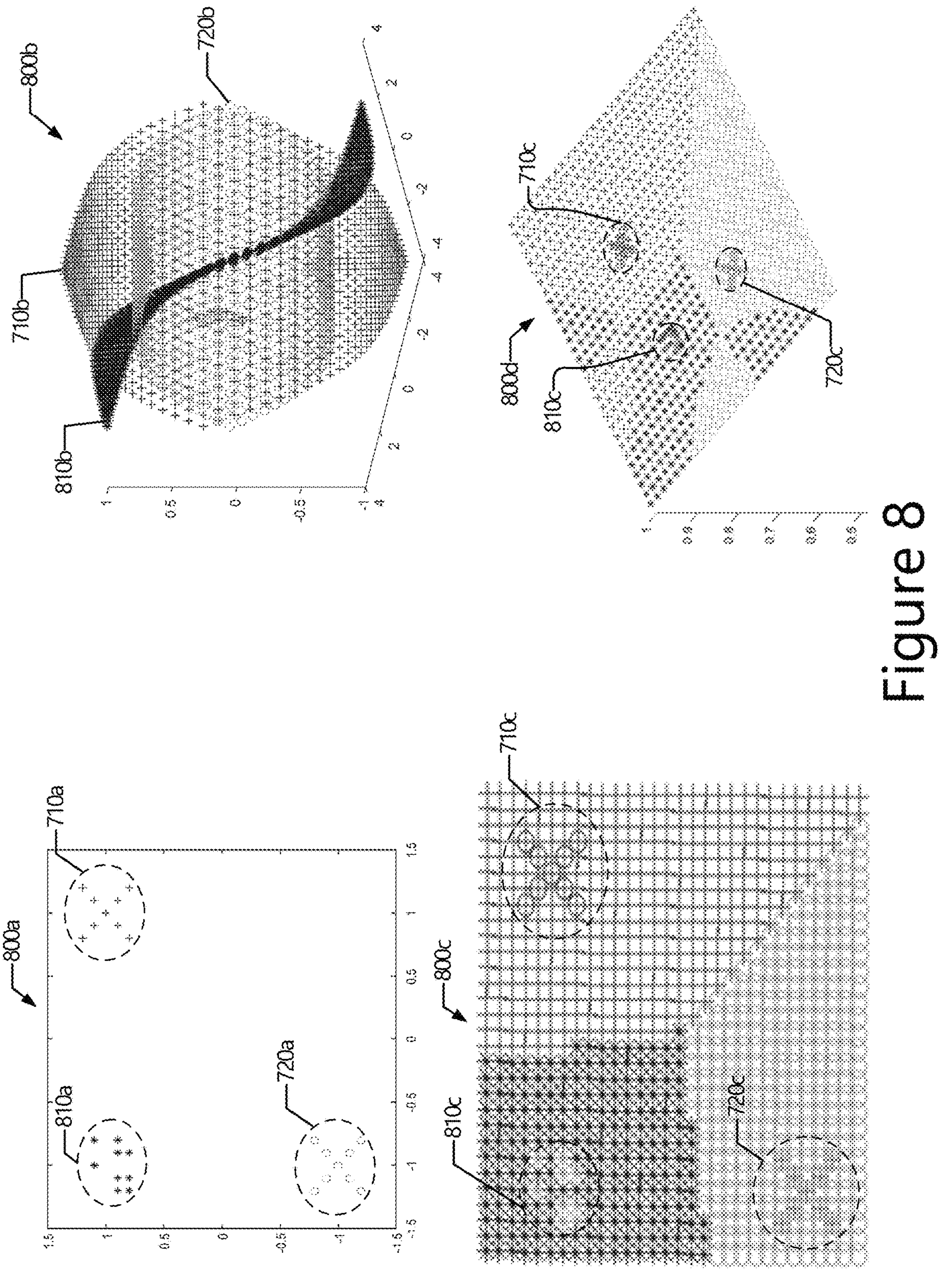

FIG. 8 shows step 2 of the ACL study, which involves adding a new class and learning its distribution. Here, a new blue class data set 810*a* is added to the network according to the data shown by the third row in Table 4, which is also shown by graph 800*a* in FIG. 8. The graph 800*a* includes the red class data set 710*a*, the green class data set 720*a*, and the newly added blue class data set 810*a*. Graph 800*b* shows DNDFs corresponding to the red, green, and blue classes, namely a blue class DNDF 810*b* that is shown along with the previous unchanged (frozen) red class DNDF 710*b* and green class DNDF 720*b*. The performance results are correct for all three classes via maximum value to define the identified class, as shown by graph 800*c* (including red class data points 710*c*, a green class data points 720*c*, and blue class data points 810*c*). Graph 800*d* shows another view of graph 800*c*. Graphs 800*c* and 800*d* show the non-linear separability of the outputs produced by the DNDF architectures 300, 400 for step 2 of the ACL study.

Figure 9:
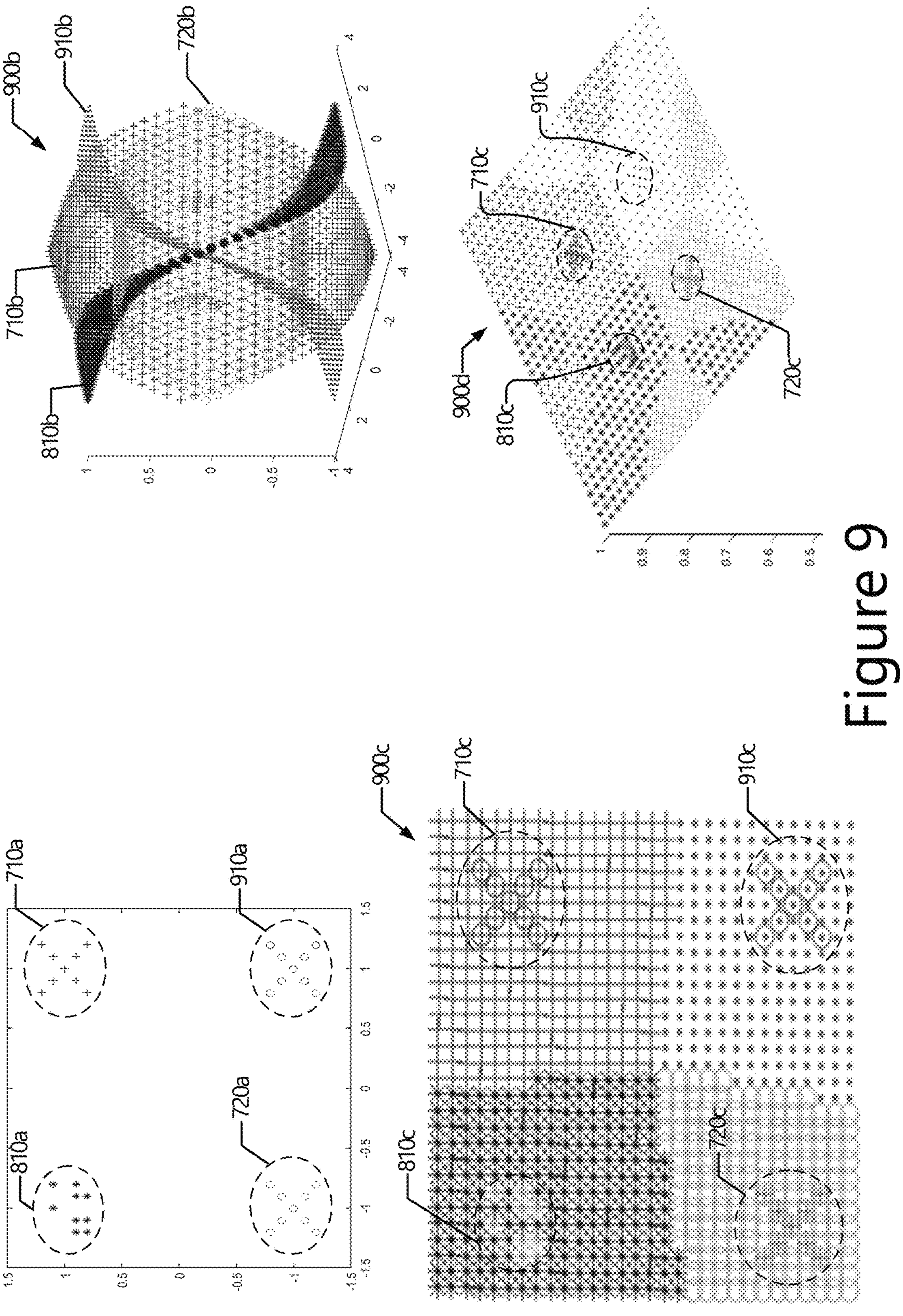

FIG. 9 shows step 3 of the ACL study, which involves adding another new class and learning its distribution. In the example of FIG. 9, data set 900*a* includes the red, green, and blue class data sets 710*a*, 720*a*, 810*a* discussed previously, as well as a newly added magenta class data set 910*a*. The magenta class data set 910*a* is the new class added into the network and is based on the data shown in fourth row of Table 4. A DNDF 910*b* of class magenta is shown by graph 900*b* along with the previous unchanged DNDF s 710*b*,

720*b*, 810*b* of the red, green, and blue classes. The performance results are correct for all four classes as shown by graph 900*c* (including red class data points 710*c*, a green class data points 720*c*, blue class data points 810*c*, and magenta class data points 910*c*). Graph 900*c* shows the non-linear separability of the outputs produced by the DDNDF architectures 300, 400 for step 3 of the ACL study.

Figure 10:
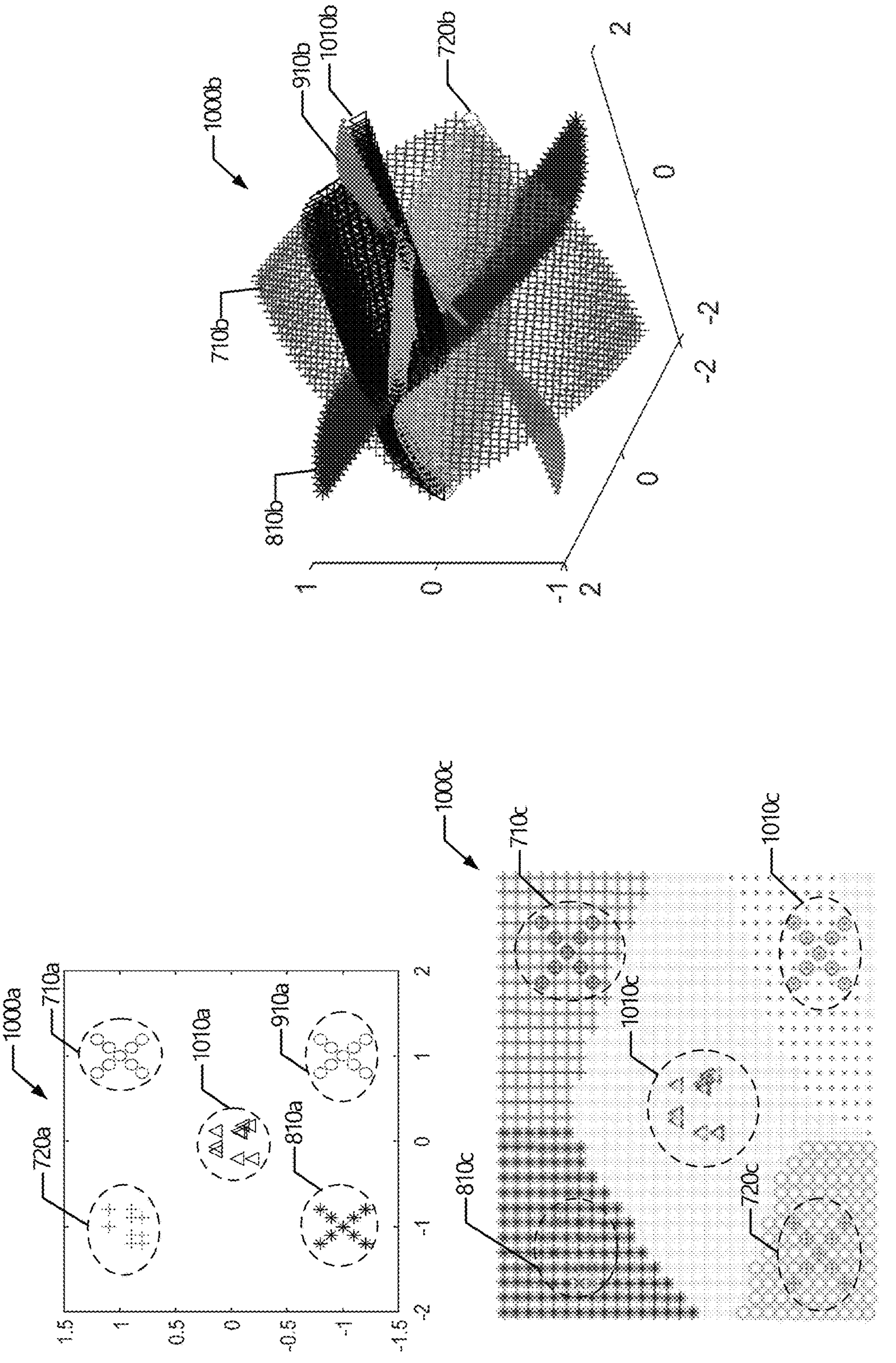

FIG. 10 shows step 4 of the ACL study, which involves adding another new class and learning its distribution. In this example, a new black class data set 1010*a* is added to the network along with the datasets 710*a*, 720*a*, 810*a*, 910*a* as shown by graph 1000*a*. The black class data set 1010*a* is based on the data shown in the fifth row of Table 4. A black class DNDF 1010*b* is shown by graph 900*b* along with the previous unchanged DNDFs 710*b*, 720*b*, 810*b*, 910*b* of the red, green, blue, and magenta classes. An output decision 1010*c* of the black class is shown by graph 1000*c* along with the outputs 710*c*, 720*c*, 810*c*, 910*c* of the previous red, green, blue, and magenta classes which are the closest learning target. The performance results are shown as being correct for all five classes as shown by graph 1000*c*. Graph 1000*c* shows the non-linear separability of the outputs produced by the DNDF architectures 300, 400 for step 4 of the ACL study.

1.1.3. Update Learning

Figure 11:
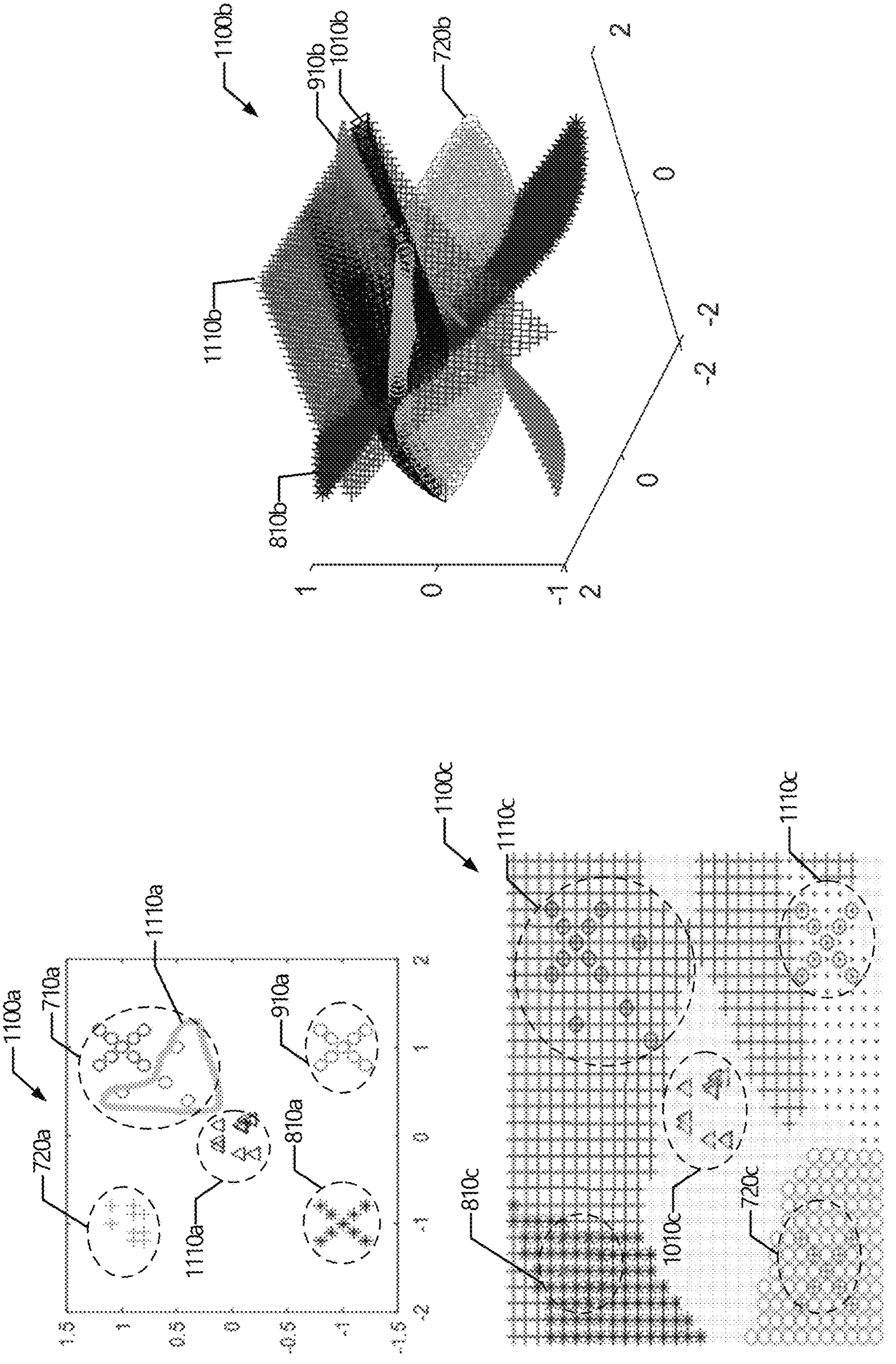

FIG. 11 shows an example of update learning, where a new dataset 1110*a* is added to the red class data set 710*a* as shown by graph 1100*a*. Update learning is performed where classes 720*a*, 810*a*, 910*a* are frozen. Graph 1100*b* shows a DNDF 1110*b* of the updated red class along with the DNDFs 710*b*, 720*b*, 810*b*, 910*b*, 1010*b*. Additionally, the output 1110*c* of DNDF 1110*b* is shown to be changed to meet the 100% training accuracy as shown by graph 1100*c*.

1.1.3.1. Non-Linear Sample Data (NSD)

Figure 12:
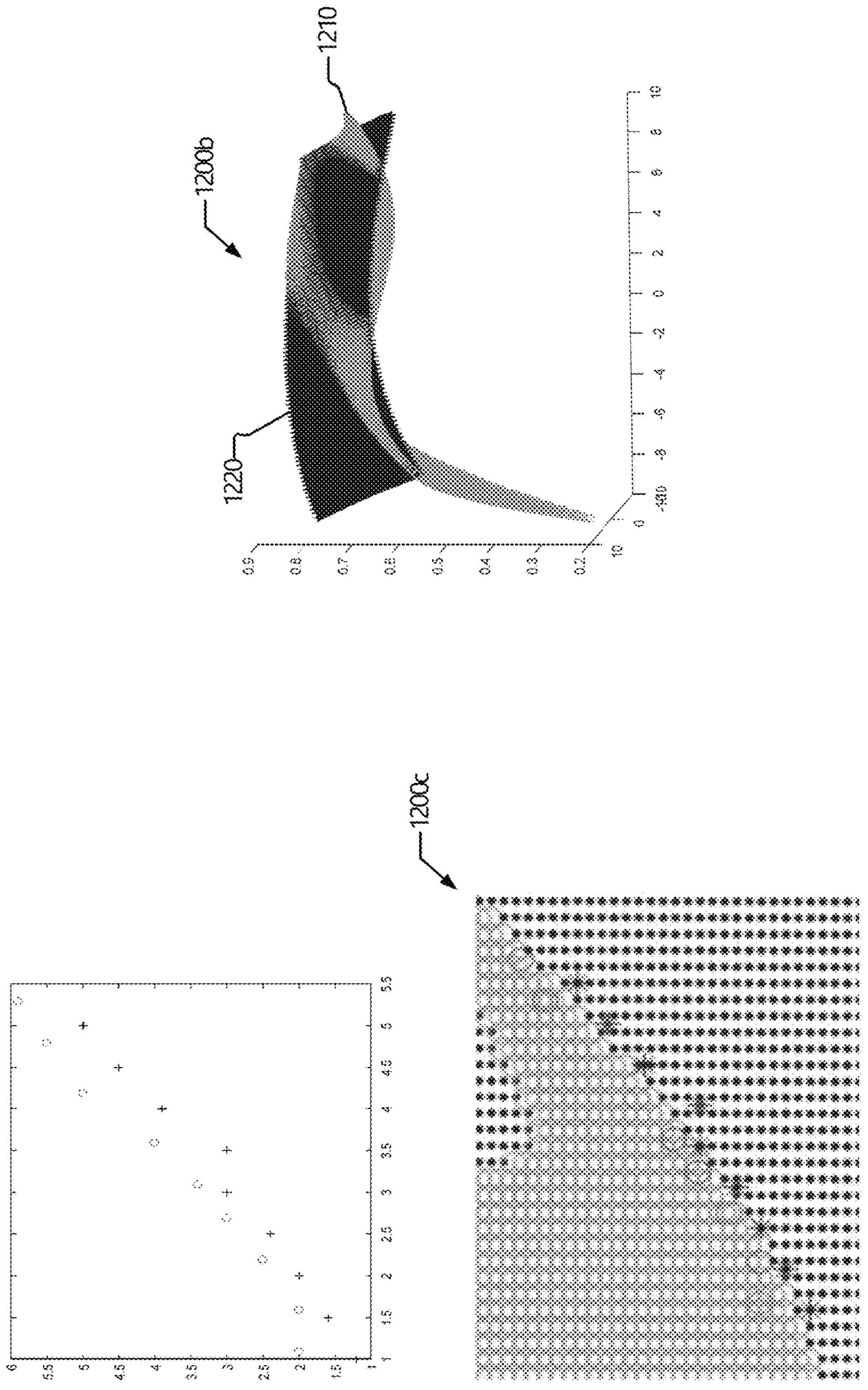

FIG. 12 shows aspects of a first non-linear sample data (NSD) study that was performed to show its superiority for autonomy over Support Vector Machine (SVM), which is well-established in a linear separable data set. A sample data set for the NSD problem is shown by Table 6. This data set may pose difficulties for SVM; however, it requires time for DNDF architecture to fine-tune the appropriate parameters. From this difficulty, a feedback network (see e.g., FIG. 4) is introduced to learn in a loop with the change of gain (e.g., neural gain at) from high to low until the learning performs 100% correct.

TABLE 6

Sample data for NSD problem

| | | | | | | | | | |
|---|---|---|---|---|---|---|---|---|---|
| Class Blue (X, Y) | 1.0 | 1.5 | 2.0 | 2.5 | 3.0 | 3.5 | 4.0 | 4.5 | 5.0 |
| | 1.2 | 1.6 | 2.2 | 2.4 | 3.0 | 3.0 | 3.9 | 4.6 | 5.0 |
| Class Green (X, Y) | 1.1 | 1.6 | 2.2 | 2.7 | 3.1 | 3.6 | 4.2 | 4.8 | 5.3 |
| | 2.0 | 2.0 | 2.5 | 3.0 | 3.4 | 4.0 | 5.0 | 5.5 | 5.9 |

The first NSD study involved iterating the gain starting from 0.5 with a step of 0.01, required 45 iterations of gain to reach to 0.065, and the total time for the feedback DNDF is 224100 computations.

TABLE 7

Performance Parameters for NSD problem with RMS error = 0.001

| | Correct Learning | RMS Error | Neuron Gain (α) | Number of Hidden Units | Number of Computations | Comments |
|---|---|---|---|---|---|---|
| Class Red | 100% | 0.000989 | 0.0650 | 12 | 98100 | * |
| Class Green | 100% | 0.000941 | 0.0650 | 14 | 126000 | |
| NSD Learning | 100% | | | | 224100 | |

* Assumed that the gain value is already known.

Table 6 shows two data sets for the red and green classes, and is shown by graph 1200*a* of FIG. 12. After CEP learning, two DNDFs 1210 and 1220 were obtained as shown by graph 1200*b*, and the corresponding performance results with 100% correct learning are shown by graph 1200*c*. Graph 1200*c* shows a DB that is correctly labelled after the learning process.

Figure 13:
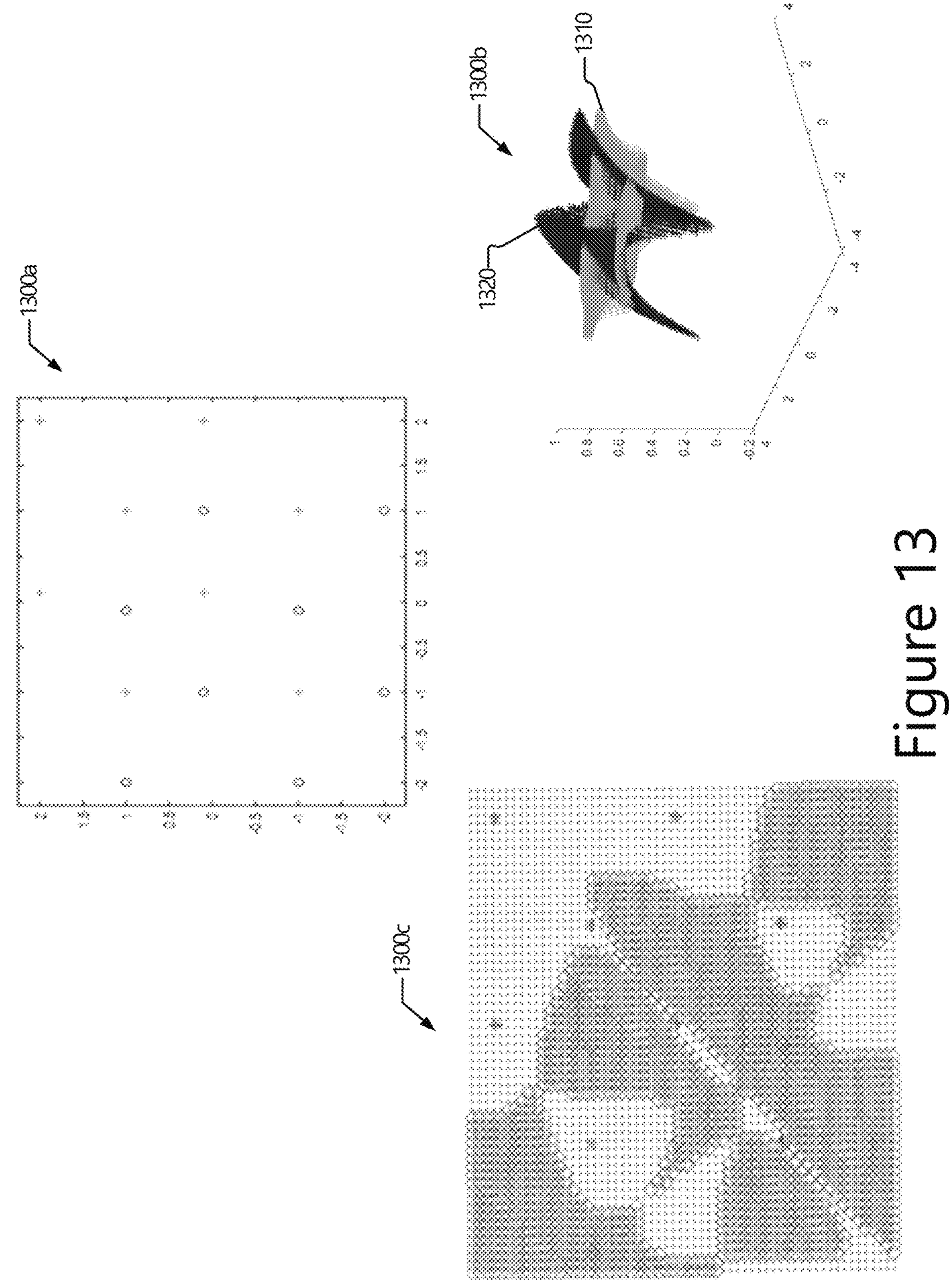

FIG. 13 shows aspects of a second NSD study that was performed to show that dynamic supervised learning (DSL) is well suited to autonomous learning when the training data sets are not well separable, as is shown by graph 1300*a*.

TABLE 8

Sample data for Non-Linear Sample Data

| | | | | | | | |
|---|---|---|---|---|---|---|---|
| Class Red (X, Y) | 0.10 | 1.00 | 2.00 | −1.00 | 0.10 | −1.00 | 2.00 |
| | 0.10 | 1.00 | 2.00 | −1.00 | 2.00 | 1.00 | 0.10 |
| Class Green (X, Y) | 1.00 | −2.00 | −2.00 | −0.10 | 1.00 | −0.10 | −1.00 |
| | 0.10 | −1.00 | 1.00 | −1.00 | −2.00 | 1.00 | 0.10 |

The second NSD study included a red class data set and a green class data set based on the sample data shown by Table 8 and the performance parameters of Table 9. The red and green classes are graphically shown by graph 1300*a*. After CEP learning, two output decisions 1310, 1320 (also referred to DNDFs 1310, 1320) are obtained and shown by graph 1300*b*, the corresponding output decision surface is shown by graph 1300*c* as having 100% correct learning.

TABLE 9

Performance Parameter for NSD problem with RMS error = 0.01

| | Correct Learning | RMS Error | Neuron Gain (α) | Number of Hidden Units | Number of computations (+ and *) |
|---|---|---|---|---|---|
| Class Red | 100% | 0.007550 | 1.997 | 10 | 325,600 |
| Class Green | 100% | 0.040712 | 1.997 | 10 | 325,600 |
| NSD Learning | 100% | | | | 651,200 |

In this example, the gain (e.g., neuron gain $\alpha_i$) was self-iterated starting from 2.0 with a step size of 0.001, which required four iterations of gain to reach to 1.997. Starting from a gain of 2.0, the DNDF architectures 300, 400 was able to find the solution at a gain of 1.997 with step size of 0.001. The total time for the feedback DSL is 2,604,800 (4*651,200) computations.

1.1.4. Example Simulations

A simulation of 100 trials was performed with different seeds and on average, and included two classes, namely class A and class B. In this simulation, class A required 9.12 hidden units and class B required 9.6 hidden units. The total time for the feedback DSL was 2,356,280 computations. This demonstrates that DSL with a feedback loop is able to classify non-separable datasets without manned intervention, indicating that the DSL is capable of autonomous learning. This simulation shows its superiority for autonomy of the DNDFs 300, 400 discussed herein over backprop and kernel SVM (KSVM), which are techniques in a nonlinear separable data set with manned interference. From the unknown environment, the feedback network (e.g., DNDF architecture 400 of FIG. 4) to learn in a loop with the change of learning activation from high to low until the learning performs 100% correct.

1.1.4.1. Fast Learning for Object Recognition

Another simulation was performed using 201 images of human faces and sampled 16 positions within each face. Each image had a 100×100 pixel resolution array from which each position image is a 96×96 pixel array. Three features were used for prediction including periphery, fovea, and LGN for each image (see e.g., U.S. application Ser. No. 14/986,572 filed on 31 Dec. 2015 now U.S. Pat. No. 9,846,808, and U.S. application Ser. No. 14/986,057 filed on 31 Dec. 2015 now U.S. Pat. No. 10,133,955, the contents of each of which are hereby incorporated by reference in their entireties). The total image features to be trained included a 9648-pixel array (96×96). The training phase of this simulation took two minutes to complete on a compute platform including an Intel® i7-6700 CPU @ 3.40 GHz processor system. Due to non-competitive training, crosstalk may affect the training results. Additionally, all training patterns were tested against each other, and appeared to perform 100% correctly. This simulation demonstrates that the DNDF architecture with feedback loop (e.g., DNDF architecture 400 of FIG. 4) is able to learn of non-linearly separable and/or linearly separable data set(s) without human intervention, which indicates the learning can be done in an autonomous fashion.

1.2. Additional DNDF Aspects

Unwanted Crosstalk: Since each DNDF is obtained independently with or without competing with the previous DNDFs, there is a possibility that the DNDF architecture 300, 400 may face unwanted (cross talk) intercept from other previous DNDFs, which could cause deviations in the accuracy of performance. However, the DNDF architecture 300, 400 can be equipped with a feature of NN learning which is fault tolerant. This fault tolerance eliminates cross talk by using multiple samples in the neighborhood of input sample data, such as saccadic eye movements (see e.g., Yarbus, Eye Movements and Vision, Institute for Problems of Information Transmission, Academy of Sciences of the USSR, Moscow, Plenum Press, New York (1967)). The multiple samples ensure that results will be in the neighborhood of the output while the cross talk in nature cannot hold it together; hence, the average of the result guarantee to get rid of the potential crosstalk. From a biological perspective, mini-saccadic samples are used in nature (see e.g., Hubel, Eye, Brain, and Vision, 2nd Ed., W H Freeman & Co., Scientific American Library (15 May 1995)), which is consistent with the DNDF aspects discussed herein.

Root Mean Square (RMS) Error: For less dense classes tasks, the RMS error (e.g., threshold 421 discussed previously) can be set loosely. However, with a relatively dense non-linear dataset, the RMS should be set to be a relatively small value to ensure it is close to function approximation in the neighborhood of that data set. This requirement may force the DNDF architecture to be close to the learning sample data to provide better performance.

Learning Rate: CEP itself has only one learned attractor as compared to backprop, which has multiple identical learned attractors. Therefore, the sensitivity of learning is not an issue for the DNDF architectures.

2. Artificial Intelligence and Machine Learning Aspects

Machine learning (ML) involves programming computing systems to optimize a performance criterion using example (training) data and/or past experience. ML refers to the use and development of computer systems that are able to learn and adapt without following explicit instructions, by using algorithms and/or statistical models to analyze and draw inferences from patterns in data. ML involves using algorithms to perform specific task(s) without using explicit instructions to perform the specific task(s), but instead relying on learnt patterns and/or inferences. ML uses statistics to build mathematical model(s) (also referred to as "ML models" or simply "models") in order to make predictions or decisions based on sample data (e.g., training data). The model is defined to have a set of parameters, and learning is the execution of a computer program to optimize the parameters of the model using the training data or past experience. The trained model may be a predictive model that makes predictions based on an input dataset, a descriptive model that gains knowledge from an input dataset, or both predictive and descriptive. Once the model is learned (trained), it can be used to make inferences (e.g., predictions).

ML algorithms perform a training process on a training dataset to estimate an underlying ML model. An ML algorithm is a computer program that learns from experience with respect to some task(s) and some performance measure(s)/metric(s), and an ML model is an object or data structure created after an ML algorithm is trained with training data. In other words, the term "ML model" or "model" may describe the output of an ML algorithm that is trained with training data. After training, an ML model may be used to make predictions on new datasets. Additionally, separately trained AI/ML models can be chained together in a AI/ML pipeline during inference or prediction generation. Although the term "ML algorithm" refers to different concepts than the term "ML model," these terms may be used interchangeably for the purposes of the present disclosure. Any of the ML techniques discussed herein may be utilized, in whole or in part, and variants and/or combinations thereof, for any of the example embodiments discussed herein.

ML may require, among other things, obtaining and cleaning a dataset, performing feature selection, selecting an ML algorithm, dividing the dataset into training data and testing data, training a model (e.g., using the selected ML algorithm), testing the model, optimizing or tuning the model, and determining metrics for the model. Some of these tasks may be optional or omitted depending on the use case and/or the implementation used. ML algorithms accept model parameters (or simply "parameters") and/or hyperparameters that can be used to control certain properties of the training process and the resulting model. Model parameters are parameters, values, characteristics, configuration variables, and/or properties that are learnt during training. Model parameters are usually required by a model when making predictions, and their values define the skill of the model on a particular problem. Hyperparameters at least in some examples are characteristics, properties, and/or parameters for an ML process that cannot be learnt during a training process. Hyperparameters are usually set before training takes place, and may be used in processes to help estimate model parameters.

ML techniques generally fall into the following main types of learning problem categories: supervised learning, unsupervised learning, and reinforcement learning. Supervised learning involves building models from a set of data that contains both the inputs and the desired outputs. Unsupervised learning is an ML task that aims to learn a function to describe a hidden structure from unlabeled data. Unsupervised learning involves building models from a set of data that contains only inputs and no desired output labels. Reinforcement learning (RL) is a goal-oriented learning technique where an RL agent aims to optimize a long-term objective by interacting with an environment. Some implementations of AI and ML use data and neural networks (NNs) in a way that mimics the working of a biological brain. An example of such an implementation is shown by FIG. 14.

FIG. 14 illustrates an example NN 1400, which may be suitable for use by one or more of the computing devices/systems (or subsystems), such as any of those discussed herein (e.g., computer node 1500, client device 1550, and/or remote system 1590 of FIG. 15), implemented in whole or in part by a hardware accelerator, and/or the like. The NN 1400 may be deep neural network (DNN) used as an artificial brain of a computer node 1500 or network of computer nodes to handle very large and complicated observation spaces. Additionally or alternatively, the NN 1400 can be arranged in any suitable topology (or combination of topologies), such as an associative NN, autoencoder, Bayesian NN (BNN), dynamic BNN (DBN), Cascade Error Projection (CEP) NN (e.g., CEP NN architecture 100 of FIG. 1), compositional pattern-producing network (CPPN), convolution NN (CNN), deep Boltzmann machines, restricted Boltzmann machine (RBM), deep belief NN, deconvolutional NN (DNN), feed forward NN (FFN), deep predictive coding network (DPCN), deep stacking NN, a dynamic neural distribution function NN (see e.g., DNDF architecture 300 and/or 400 of FIGS. 3 and 4), encoder-decoder network, energy-based generative NN, generative adversarial network (GAN), graph NN (GNN), multilayer perceptron (MLP) NN, perception NN, linear dynamical system (LDS), switching LDS (SLDS), Markov chain, multilayer kernel machines (MKM), neural Turing machine, optical NN, radial basis function, recurrent NN (RNN), long short term memory (LSTM) network, gated recurrent unit (GRU), echo state network (ESN), reinforcement learning (RL) NN, self-organizing feature map (SOFM), spiking NN, transformer NN, attention NN, self-attention NN, time delay NN, among many others including variants of any of the aforementioned topologies/algorithms. Additionally or alternatively, the NN 1400 (or multiple NNs 1400) of any combination of the aforementioned topologies can be arranged in an ML pipeline or ensemble learning configuration or arrangement. Additionally or alternatively, the NN 1400 may represent a subnet that is part of a larger supernet, or the NN 1400 may represent a supernet that comprises one or more smaller subnets. Furthermore, the NN 1400 can be trained using a suitable supervised learning technique, or can be used for unsupervised learning and/or RL.

The NN 1400 may encompass a variety of ML techniques where a collection of connected artificial neurons 1410 that (loosely) model neurons in a biological brain that transmit signals to other neurons/nodes 1410. The neurons 1410 may also be referred to as nodes 1410, processing elements (PEs) 1410, or the like. The connections 1420 (or edges 1420) between the nodes 1410 are (loosely) modeled on synapses of a biological brain and convey the signals between nodes 1410. Note that not all neurons 1410 and edges 1420 are labeled in FIG. 14 for the sake of clarity.

Each neuron 1410 has one or more inputs and produces an output, which can be sent to one or more other neurons 1410 (the inputs and outputs may be referred to as "signals"). Inputs to the neurons 1410 of the input layer $L_x$ can be feature values of a sample of external data (e.g., input variables $x_i$). The input variables $x_i$ can be set as a vector containing relevant data (e.g., observations, ML features, and the like). The inputs to hidden units 1410 of the hidden layers $L_a$, $L_b$, and $L_c$ may be based on the outputs of other neurons 1410. The outputs of the final output neurons 1410 of the output layer $L_y$ (e.g., output variables $y_j$) include predictions, inferences, and/or accomplish a desired/configured task. The output variables $y_j$ may be in the form of determinations, inferences, predictions, and/or assessments. Additionally or alternatively, the output variables y can be set as a vector containing the relevant data (e.g., determinations, inferences, predictions, assessments, and/or the like).

In the context of ML, an "ML feature" (or simply "feature") is an individual measureable property or characteristic of a phenomenon being observed. Features are usually represented using numbers/numerals (e.g., integers), strings, variables, ordinals, real-values, categories, and/or the like. Additionally or alternatively, ML features are individual variables, which may be independent variables, based on observable phenomenon that can be quantified and recorded. ML models use one or more features to make predictions or inferences. In some implementations, new features can be derived from old features.

Neurons 1410 may have a threshold such that a signal is sent only if the aggregate signal crosses that threshold. A node 1410 may include an activation function, which defines the output of that node 1410 given an input or set of inputs. Additionally or alternatively, a node 1410 may include a propagation function that computes the input to a neuron 1410 from the outputs of its predecessor neurons 1410 and their connections 1420 as a weighted sum. A bias term can also be added to the result of the propagation function.

The NN 1400 also includes connections 1420, some of which provide the output of at least one neuron 1410 as an input to at least another neuron 1410. Each connection 1420 may be assigned a weight that represents its relative importance. The weights may also be adjusted as learning proceeds. The weight increases or decreases the strength of the signal at a connection 1420.

The neurons 1410 can be aggregated or grouped into one or more layers L where different layers L may perform different transformations on their inputs. In FIG. 14, the NN 1400 comprises an input layer $L_x$, one or more hidden layers $L_a$, $L_b$, and $L_c$, and an output layer $L_y$ (where a, b, c, x, and y may be numbers), where each layer L comprises one or more neurons 1410. Signals travel from the first layer (e.g., the input layer $L_1$), to the last layer (e.g., the output layer $L_y$), possibly after traversing the hidden layers $L_a$, $L_b$, and $L_c$multiple times. In FIG. 14, the input layer $L_a$ receives data of input variables $x_i$ (where i=1, . . . , p, where p is a number). Hidden layers $L_a$, $L_b$, and $L_c$ processes the inputs $x_i$, and eventually, output layer $L_y$ provides output variables $y_j$ (where j=1, . . . , p', where p' is a number that is the same or different than p). In the example of FIG. 14, for simplicity of illustration, there are only three hidden layers $L_a$, $L_b$, and Le in the NN 1400, however, the NN 1400 may include many more (or fewer) hidden layers $L_a$, $L_b$, and $L_c$ than are shown.

In some examples, the NN 1400 can be implemented as a perceptron. A perceptron is an NN comprising a set of units (e.g., neurons 1410), where each unit can receive an input from one or more other units. Each unit takes the sum of all values received and decides whether it is going to forward a signal on to one or more other units to which it is connected according to the node's activation function. In this example, the perceptron includes a single layer of input units including one bias unit as the activation function and a single output unit, wherein any number of input units can be included. The bias unit may shift the DB away from the origin and may not depend on any input value. Additionally or alternatively, one or more of the neurons 1410 can be a perceptron, where the perceptrons use the Heaviside step function as the activation function.

3. Hardware and Software Systems, Configurations, and Arrangements

FIG. 15 illustrates an example computer node 1500 (also referred to as "platform 1500," "device 1500," "appliance 1500," "system 1500", and/or the like), and various components therein, for implementing the techniques (e.g., operations, processes, methods, and methodologies) described herein. The computer node 1500 can include any combination of the hardware or logical components referenced herein, and may include or couple with any device usable with a communication network or a combination of such networks. In particular, any combination of the components depicted by FIG. 15 can be implemented as individual ICs, discrete electronic devices, or other modules, instruction sets, programmable logic or algorithms, hardware, hardware accelerators, software, firmware, or a combination thereof adapted in the computer node 1500, or as components otherwise incorporated within a chassis of a larger system. Additionally or alternatively, any combination of the components depicted by FIG. 15 can be implemented as a system-on-chip (SoC), a single-board computer (SBC), a system-in-package (SiP), a multi-chip package (MCP), and/or the like, in which a combination of the hardware elements are formed into a single IC or a single package.

The computer node 1500 includes physical hardware devices and software components capable of providing and/or accessing content and/or services to/from the remote system 1590. The computer node 1500 and/or the remote system 1590 can be implemented as any suitable computing system or other data processing apparatus usable to access and/or provide content/services from/to one another. The computer node 1500 communicates with remote systems 1590, and vice versa, to obtain/serve content/services using any suitable communication protocol, such as any of those discussed herein. In some implementations, the remote system 1590 may have some or all of the same or similar components as the computer node 1500. As examples, the computer node 1500 and/or the remote system 1590 can be embodied as desktop computers, workstations, laptops, mobile phones (e.g., "smartphones"), tablet computers, portable media players, wearable devices, server(s), network appliances, smart appliances or smart factory machinery, network infrastructure elements, robots, drones, sensor systems and/or IoT devices, cloud computer nodes, edge computer nodes, an aggregation of computing resources (e.g., in a cloud-based environment), and/or some other computing devices capable of interfacing directly or indirectly with network 1599 or other network(s). For purposes of the present disclosure, the computer node 1500 may represent any of the computing devices discussed herein, and/or may correspond to, or include one or more of the CEP architecture 100, DNDF architecture 300, DNDF architecture 400, the NN 1400, the client device 1550, the system/servers 1590, and/or any other devices or systems, such as any of those discussed herein.

The system 1500 includes physical hardware devices and software components capable of providing and/or accessing content and/or services to/from the remote system 1555. The system 1500 and/or the remote system 1555 can be implemented as any suitable computing system or other data processing apparatus usable to access and/or provide content/services from/to one another. As examples, the system 1500 and/or the remote system 1555 may comprise desktop computers, a work stations, laptop computers, mobile cellular phones (e.g., "smartphones"), tablet computers, portable media players, wearable computing devices, server computer systems, an aggregation of computing resources (e.g., in a cloud-based environment), or some other computing devices capable of interfacing directly or indirectly with network 1550 or other network. The system 1500 communicates with remote systems 1555, and vice versa, to obtain/serve content/services using any suitable communication protocol, such as any of those discussed herein.

The computer node 1500 includes one or more processors 1501 (also referred to as "processor circuitry 1501"). The processor circuitry 1501 includes circuitry capable of sequentially and/or automatically carrying out a sequence of arithmetic or logical operations, and recording, storing, and/or transferring digital data. Additionally or alternatively, the processor circuitry 1501 includes any device capable of executing or otherwise operating computer-executable instructions, such as program code, software modules, and/or functional processes. The processor circuitry 1501 includes various hardware elements or components such as, for example, a set of processor cores and one or more of on-chip or on-die memory or registers, cache and/or scratchpad memory, low drop-out voltage regulators (LDOs), interrupt controllers, serial interfaces such as SPI, I2C or universal programmable serial interface circuit, real time clock (RTC), timer-counters including interval and watchdog timers, general purpose I/O, memory card controllers such as secure digital/multi-media card (SD/MMC) or similar, interfaces, mobile industry processor interface (MIPI) interfaces and Joint Test Access Group (JTAG) test access ports. Some of these components, such as the on-chip or on-die memory or registers, cache and/or scratchpad memory, may be implemented using the same or similar devices as the memory circuitry 1503 discussed infra. The processor circuitry 1501 is also coupled with memory circuitry 1503 and storage circuitry 1504, and is configured to execute instructions stored in the memory/storage to enable various apps, OSs, or other software elements to run on the platform 1500. In particular, the processor circuitry 1501 is configured to operate app software (e.g., instructions 1501$x$, 1503$x$, 1504$x$) to provide one or more services to a user of the computer node 1500 and/or user(s) of remote systems/devices.

The processor circuitry 1501 can be embodied as, or otherwise include one or multiple central processing units (CPUs), application processors, graphics processing units (GPUs), RISC processors, Acorn RISC Machine (ARM) processors, complex instruction set computer (CISC) processors, DSPs, FPGAs, programmable logic devices (PLDs), ASICs, baseband processors, radio-frequency integrated circuits (RFICs), microprocessors or controllers, multi-core processors, multithreaded processors, ultra-low voltage processors, embedded processors, a specialized x-processing units (xPUs) or a data processing unit (DPUs) (e.g., Infrastructure Processing Unit (IPU), network processing unit (NPU), and the like), neural compute chips/processors, probabilistic RAM ("pRAM" or "p-ram") neural processors, stochastic processors, quantum processors, and/or any other processing devices or elements, or any combination thereof. In some implementations, the processor circuitry 1501 is embodied as one or more special-purpose processor(s)/controller(s) configured (or configurable) to operate according to the various implementations and other aspects discussed herein. Additionally or alternatively, the processor circuitry 1501 includes one or more hardware accelerators (e.g., same or similar to acceleration circuitry 1508), which can include microprocessors, programmable processing devices (e.g., FPGAs, ASICs, PLDs, DSPs. and/or the like), and/or the like. As examples, the processor circuitry 1502 may include Intel® Core™ based processor(s), MCU-class processor(s), Xeon® processor(s); Advanced Micro Devices (AMD) Zen® Core Architecture processor(s), such as Ryzen® or Epyc® processor(s), Accelerated Processing Units (APUs), MxGPUs, or the like; A, S, W, and T series processor(s) from Apple® Inc., Snapdragon™ or Centriq™ processor(s) from Qualcomm® Technologies, Inc., Texas Instruments, Inc.® Open Multimedia Applications Platform (OMAP)™ processor(s); Power Architecture processor(s) provided by the OpenPOWER® Foundation and/or IBM®, MIPS Warrior M-class, Warrior I-class, and Warrior P-class processor(s) provided by MIPS Technologies, Inc.; ARM Cortex-A, Cortex-R, and Cortex-M family of processor(s) as licensed from ARM Holdings, Ltd.; the ThunderX2® provided by Cavium™, Inc.; GeForce®, Tegra®, Titan X®, Tesla®, Shield®, and/or other like GPUs provided by Nvidia®; or the like. Other examples of the processor circuitry 1502 may be mentioned elsewhere in the present disclosure.

The computer node 1500 also includes non-transitory or transitory machine-readable media 1502 (also referred to as "computer readable medium 1502" or "CRM 1502"), which may be embodied as, or otherwise include system memory 1503, storage 1504, and/or memory devices/elements of the processor 1501. Additionally or alternatively, the CRM 1502 can be embodied as any of the devices/technologies described for the memory 1503 and/or storage 1504.

The system memory 1503 (also referred to as "memory circuitry 1503") includes one or more hardware elements/devices for storing data and/or instructions 1503*x* (and/or instructions 1501*x*, 1504*x*). Any number of memory devices may be used to provide for a given amount of system memory 1503. As examples, the memory 1503 can be embodied as processor cache or scratchpad memory, volatile memory, non-volatile memory (NVM), and/or any other machine readable media for storing data. Examples of volatile memory include random access memory (RAM), static RAM (SRAM), dynamic RAM (DRAM), synchronous DRAM (SDRAM), thyristor RAM (T-RAM), content-addressable memory (CAM), and/or the like. Examples of NVM can include read-only memory (ROM) (e.g., including programmable ROM (PROM), erasable PROM (EPROM), electrically EPROM (EEPROM), flash memory (e.g., NAND flash memory, NOR flash memory, and the like), solid-state storage (SSS) or solid-state ROM, programmable metallization cell (PMC), and/or the like), non-volatile RAM (NVRAM), phase change memory (PCM) or phase change RAM (PRAM) (e.g., Intel® 3D Xpoint™ memory, chalcogenide RAM (CRAM), Interfacial Phase-Change Memory (IPCM), and the like), memistor devices, resistive memory or resistive RAM (ReRAM) (e.g., memristor devices, metal oxide-based ReRAM, quantum dot resistive memory devices, and the like), conductive bridging RAM (or PMC), magnetoresistive RAM (MRAM), electrochemical RAM (ECRAM), ferroelectric RAM (FeRAM), anti-ferroelectric RAM (AFeRAM), ferroelectric field-effect transistor (FeFET) memory, and/or the like. Additionally or alternatively, the memory circuitry 1503 can include spintronic memory devices (e.g., domain wall memory (DWM), spin transfer torque (STT) memory (e.g., STT-RAM or STT-MRAM), magnetic tunneling junction memory devices, spin-orbit transfer memory devices, Spin-Hall memory devices, nanowire memory cells, and/or the like). In some implementations, the individual memory devices 1503 may be formed into any number of different package types, such as single die package (SDP), dual die package (DDP), quad die package (Q17P), memory modules (e.g., dual inline memory modules (DIMMs), microDIMMs, and/or MiniDIMMs), and/or the like. Additionally or alternatively, the memory circuitry 1503 is or includes block addressable memory device(s), such as those based on NAND or NOR flash memory technologies (e.g., single-level cell, multi-level cell, quad-level cell, tri-level cell, or some other NAND or NOR device). Additionally or alternatively, the memory circuitry 1503 can include resistor-based and/or transistor-less memory architectures. In some examples, the memory circuitry 1503 can refer to a die, chip, and/or a packaged memory product. In some implementations, the memory 1503 can be or include the on-die memory or registers associated with the processor circuitry 1501. Additionally or alternatively, the memory 1503 can include any of the devices/components discussed infra w.r.t the storage circuitry 1504.

The storage 1504 (also referred to as "storage circuitry 1504") provides persistent storage of information, such as data, OSs, apps, instructions 1504*x*, and/or other software elements. As examples, the storage 1504 may be embodied as a magnetic disk storage device, hard disk drive (HDD), microHDD, solid-state drive (SSD), optical storage device, flash memory devices, memory card (e.g., secure digital (SD) card, extreme Digital (XD) picture card, USB flash drives, SIM cards, and/or the like), and/or any combination thereof. The storage circuitry 1504 can also include specific storage units, such as storage devices and/or storage disks that include optical disks (e.g., DVDs, CDs/CD-ROM, Blu-ray disks, and the like), flash drives, floppy disks, hard drives, and/or any number of other hardware devices in which information is stored for any duration (e.g., for extended time periods, permanently, for brief instances, for temporarily buffering, and/or caching). Additionally or alternatively, the storage circuitry 1504 can include resistor-based and/or transistor-less memory architectures. Further, any number of technologies may be used for the storage 1504 in addition to, or instead of, the previously described technologies, such as, for example, resistance change memories, phase change memories, holographic memories, chemical memories, among many others. Additionally or alternatively, the storage circuitry 1504 can include any of the devices or components discussed previously w.r.t the memory 1503.

Instructions 1501*x*, 1503*x*, 1504*x* in the form of computer programs, computational logic/modules (e.g., including the various modules/logic discussed herein), source code, middleware, firmware, object code, machine code, microcode (ucode), or hardware commands/instructions, when executed, implement or otherwise carry out various functions, processes, methods, algorithms, operations, tasks, actions, techniques, and/or other aspects of the present disclosure. The instructions 1501*x*, 1503*x*, 1504*x* may be written in any combination of one or more programming languages, including object oriented programming languages, procedural programming languages, scripting languages, markup languages, machine language, and/or some other suitable programming languages including proprietary programming languages and/or development tools, or any other suitable technologies. The instructions 1501*x*, 1503*x*, 1504*x* may execute entirely on the system 1500, partly on the system 1500, as a stand-alone software package, partly on the system 1500 and partly on a remote system 1590, or entirely on the remote system 1590. In the latter scenario, the remote system 1590 may be connected to the system 1500 through any type of network 1599. Although the instructions 1501*x*, 1503*x*, 1504*x* are shown as code blocks included in the processor 1501, memory 1504, and/or storage 1520, any of the code blocks may be replaced with hardwired circuits, for example, built into memory blocks/cells of an ASIC, FPGA, and/or some other suitable IC.

In some examples, the storage circuitry 1504 stores computational logic/modules configured to implement the techniques described herein. The computational logic 1504*x* may be employed to store working copies and/or permanent copies of programming instructions, or data to create the programming instructions, for the operation of various components of computer node 1500 (e.g., drivers, libraries, APIs, and/or the like), an OS of computer node 1500, one or more apps, and/or the like. The computational logic 1504*x* may be stored or loaded into memory circuitry 1503 as instructions 1503*x*, or data to create the instructions 1503*x*, which are then accessed for execution by the processor circuitry 1501 via the IX 1506 to carry out the various functions, processes, methods, algorithms, operations, tasks, actions, techniques, and/or other aspects described herein (see e.g., FIGS. 1-14). The various elements may be implemented by assembler instructions supported by processor circuitry 1501 or high-level languages that may be compiled into instructions 1501*x*, or data to create the instructions 1501*x*, to be executed by the processor circuitry 1501. The permanent copy of the programming instructions may be placed into persistent storage circuitry 1504 at the factory/OEM or in the field through, for example, a distribution medium (e.g., a wired connection and/or over-the-air (OTA) interface) and a communication interface (e.g., communication circuitry 1507) from a distribution server (e.g., remote system 1590) and/or the like.

Additionally or alternatively, the instructions 1501*x*, 1503*x*, 1504*x* can include one or more operating systems (OS) and/or other software to control various aspects of the computer node 1500. The OS can include drivers and/or APIs to control particular devices or components that are embedded in the computer node 1500, attached to the computer node 1500, communicatively coupled with the computer node 1500, and/or otherwise accessible by the computer node 1500. The OSs also include one or more libraries, drivers, APIs, firmware, middleware, software glue, and the like, which provide program code and/or software components for one or more apps to obtain and use the data from other apps operated by the computer node 1500, such as the various subsystems of the CEP NN architecture 100 and/or DNDF architecture 300, 400, and/or any other device or system discussed herein. For example, the OS can include a display driver to control and allow access to a display device, a touchscreen driver to control and allow access to a touchscreen interface of the system 1500, sensor drivers to obtain sensor readings of sensor circuitry 1521 and control and allow access to sensor circuitry 1521, actuator drivers to obtain actuator positions of the actuators 1522 and/or control and allow access to the actuators 1522, a camera driver to control and allow access to an embedded image capture device, audio drivers to control and allow access to one or more audio devices. The OS can be a general purpose OS or an OS specifically written for and tailored to the computing platform 1500. Example OSs include consumer-based OS (e.g., Microsoft® Windows® 10, Google® Android®, Apple® macOS®, Apple® iOS®, KaiOS™ provided by KaiOS Technologies Inc., Unix or a Unix-like OS such as Linux, Ubuntu, or the like), industry-focused OSs such as real-time OS (RTOS) (e.g., Apache® Mynewt, Windows® IoT®, Android Things®, Micrium® Micro-Controller OSs ("MicroC/OS" or "µC/OS"), VxWorks®, FreeRTOS, and/or the like), hypervisors (e.g., Xen® Hypervisor, Real-Time Systems® RTS Hypervisor, Wind River Hypervisor, VMWare® vSphere® Hypervisor, and/or the like), and/or the like. For purposes of the present disclosure, can also include hypervisors, container orchestrators and/or container engines. The OS can invoke alternate software to facilitate one or more functions and/or operations that are not native to the OS, such as particular communication protocols and/or interpreters. Additionally or alternatively, the OS instantiates various functionalities that are not native to the OS. In some examples, OSs include varying degrees of complexity and/or capabilities. In some examples, a first OS on a first computer node 1500 may be the same or different than a second OS on a second computer node 1500 (here, the first and second computer nodes 1500 can be physical machines or VMs operating on the same or different physical computer nodes). In these examples, the first OS may be an RTOS having particular performance expectations of responsivity to dynamic input conditions, and the second OS can include GUI capabilities to facilitate end-user I/O and the like.

The various components of the computing node 1500 communicate with one another over an interconnect (IX) 1506. The IX 1506 may include any number of IX (or similar) technologies including, for example, instruction set architecture (ISA), extended ISA (eISA), Inter-Integrated Circuit (I2C), serial peripheral interface (SPI), point-to-point interfaces, power management bus (PMBus), peripheral component interconnect (PCI), PCI express (PCIe), PCI extended (PCIx), Intel® Ultra Path Interconnect (UPI), Intel® Accelerator Link, Intel® QuickPath Interconnect (QPI), Intel® Omni-Path Architecture (OPA), Compute Express Link™ (CXL™) IX, RapidIO™ IX, Coherent Accelerator Processor Interface (CAPI), OpenCAPI, Advanced Microcontroller Bus Architecture (AMBA) IX, cache coherent interconnect for accelerators (CCIX), Gen-Z Consortium IXs, a HyperTransport IX, NVLink provided by NVIDIA®, ARM Advanced extensible Interface (AXI), a Time-Trigger Protocol (TTP) system, a FlexRay system, PROFIBUS, Ethernet, USB, On-Chip System Fabric (IOSF), Infinity Fabric (IF), and/or any number of other IX technologies. The IX 1506 may be a proprietary bus, for example, used in a SoC based system.

In some implementations (e.g., where the system 1500 is a server computer system), the computer node 1500 includes one or more hardware accelerators 1508 (also referred to as "acceleration circuitry 1508", "accelerator circuitry 1508", or the like). The acceleration circuitry 1508 can include various hardware elements such as, for example, one or more GPUs, FPGAs, DSPs, SoCs (including programmable SoCs and multi-processor SoCs), ASICs (including programmable ASICs), PLDs (including complex PLDs (CPLDs) and high capacity PLDs (HCPLDs), xPUs (e.g., DPUs, IPUs, and NPUs) and/or other forms of specialized circuitry designed to accomplish specialized tasks. Additionally or alternatively, the acceleration circuitry 1508 may be embodied as, or include, one or more of artificial intelligence (AI) accelerators (e.g., vision processing unit (VPU), neural compute sticks, neuromorphic hardware, deep learning processors (DLPs) or deep learning accelerators, tensor processing units (TPUs), physical neural network hardware, and/or the like), cryptographic accelerators (or secure cryptoprocessors), network processors, I/O accelerator (e.g., DMA engines and the like), and/or any other specialized hardware device/component. The offloaded tasks performed by the acceleration circuitry 1508 can include, for example, AI/ML tasks (e.g., training, feature extraction, model execution for inference/prediction, classification, and so forth), visual data processing, graphics processing, digital and/or analog signal processing, network data processing, infrastructure function management, object detection, rule analysis, and/or the like. As examples, these processor(s) 1501 and/or accelerators 1508 may be a cluster of artificial intelligence (AI) GPUs, pRAM neural processors, stochastic processors, tensor processing units (TPUs) developed by Google® Inc., Real AI Processors (RAPS™) provided by AlphaICs®, Nervana™ Neural Network Processors (NNPs) provided by Intel® Corp., Intel® Movidius™ Myriad™ X Vision Processing Unit (VPU), NVIDIA® PX™ based GPUs, the NM500 chip provided by General Vision®, Hardware 3 provided by Tesla®, Inc., an Epiphany™ based processor provided by Adapteva®, or the like. In some embodiments, the processor circuitry 1502 and/or hardware accelerator circuitry may be implemented as AI accelerating co-processor(s), such as the Hexagon 685 DSP provided by Qualcomm®, the PowerVR 2NX Neural Net Accelerator (NNA) provided by Imagination Technologies Limited®, the Neural Engine core within the Apple® A11 or A12 Bionic SoC, the Neural Processing Unit (NPU) within the HiSilicon Kirin 970 provided by Huawei®, and/or the like.

The acceleration circuitry 1508 includes any suitable hardware device or collection of hardware elements that are designed to perform one or more specific functions more efficiently in comparison to general-purpose processing elements (e.g., those provided as part of the processor circuitry 1501). For example, the acceleration circuitry 1508 can include special-purpose processing device tailored to perform one or more specific tasks or workloads of the subsystems of the CEP NN architecture 100 and/or DNDF architecture 300, 400. In some examples, the specific tasks or workloads may be offloaded from one or more processors of the processor circuitry 1502. In some implementations, the processor circuitry 1501 and/or acceleration circuitry 1508 includes hardware elements specifically tailored for executing, operating, or otherwise providing AI and/or ML functionality, such as for operating various subsystems of the system CEP NN architecture 100, DNDF architecture 300, 400, and/or any other device or system discussed previously with regard to FIGS. 1-14. In these implementations, the circuitry 1501 and/or 1508 is/are embodied as, or otherwise includes, one or more AI or ML chips that can run many different kinds of AI/ML instruction sets once loaded with the appropriate weightings, training data, AI/ML models, and/or the like. Additionally or alternatively, the processor circuitry 1501 and/or accelerator circuitry 1508 is/are embodied as, or otherwise includes, one or more custom-designed silicon cores specifically designed to operate corresponding subsystems of the system CEP NN architecture 100, DNDF architecture 300, 400, and/or any other device or system discussed herein. These cores may be designed as synthesizable cores comprising hardware description language logic (e.g., register transfer logic, verilog, Very High Speed Integrated Circuit hardware description language (VHDL), and the like); netlist cores comprising gate-level description of electronic components and connections and/or process-specific very-large-scale integration (VLSI) layout; and/or analog or digital logic in transistor-layout format. In these implementations, one or more of the subsystems of the CEP NN architecture 100, DNDF architecture 300, 400, and/or any other device or system discussed herein may be operated, at least in part, on custom-designed silicon core(s). These "hardware-ized" subsystems may be integrated into a larger chipset but may be more efficient than using general purpose processor cores.

The TEE 1509 operates as a protected area accessible to the processor circuitry 1501 and/or other components to enable secure access to data and secure execution of instructions. The TEE 1590 operates as a protected area accessible to the processor circuitry 1502 to enable secure access to data and secure execution of instructions. In some implementations, the TEE 1509 is embodied as one or more physical hardware devices that is/are separate from other components of the system 1500, such as a secure-embedded controller, a dedicated SoC, a trusted platform module (TPM), a tamper-resistant chipset or microcontroller with embedded processing devices and memory devices, and/or the like. Examples of such implementations include a Desktop and mobile Architecture Hardware (DASH) compliant Network Interface Card (NIC), Intel® Management/Manageability Engine, Intel® Converged Security Engine (CSE) or a Converged Security Management/Manageability Engine (CSME), Trusted Execution Engine (TXE) provided by Intel® each of which may operate in conjunction with Intel® Active Management Technology (AMT) and/or Intel® vPro™ Technology; AMD® Platform Security coProcessor (PSP), AMD® PRO A-Series Accelerated Processing Unit (APU) with DASH manageability, Apple® Secure Enclave coprocessor; IBM® Crypto Express3®, IBM® 4807, 4808, 4809, and/or 4765 Cryptographic Coprocessors, IBM® Baseboard Management Controller (BMC) with Intelligent Platform Management Interface (IPMI), Dell™ Remote Assistant Card II (DRAC II), integrated Dell™ Remote Assistant Card (iDRAC), and the like.

Additionally or alternatively, the TEE 1509 is embodied as secure enclaves (or "enclaves"), which is/are isolated regions of code and/or data within the processor and/or memory/storage circuitry of the computer node 1500, where only code executed within a secure enclave may access data within the same secure enclave, and the secure enclave may only be accessible using the secure app (which may be implemented by an app processor or a tamper-resistant microcontroller). In some implementations, the memory circuitry 1503 and/or storage circuitry 1504 may be divided into one or more trusted memory regions for storing apps or software modules of the secure enclave(s) 1509. Example implementations of the TEE 1590, and an accompanying secure area in the processor circuitry 1501 or the memory circuitry 1503 and/or storage circuitry 1504, include Intel® Software Guard Extensions (SGX), ARM® TrustZone® hardware security extensions, Keystone Enclaves provided by Oasis Labs™, and/or the like. Other aspects of security hardening, hardware roots-of-trust, and trusted or protected operations may be implemented in the device 1500 through the TEE 1590 and the processor circuitry 1502.

Additionally or alternatively, the TEE 1509 and/or processor circuitry 1501, acceleration circuitry 1508, memory circuitry 1503, and/or storage circuitry 1504 may be divided into, or otherwise separated into isolated user-space instances and/or virtualized environments using a suitable virtualization technology, such as, for example, virtual machines (VMs), virtualization containers (e.g., Docker® containers, Kubernetes® containers, Solaris® containers and/or zones, OpenVZ® virtual private servers, DragonFly BSD® virtual kernels and/or jails, chroot jails, and/or the like), and/or other virtualization technologies. These virtualization technologies may be managed and/or controlled by a virtual machine monitor (VMM), hypervisor container engines, orchestrators, and the like. Such virtualization technologies provide execution environments/TEEs in which one or more apps and/or other software, code, or scripts may execute while being isolated from one or more other apps, software, code, or scripts.

The communication circuitry 1507 is a hardware element, or collection of hardware elements, used to communicate over one or more networks (e.g., network 1599) and/or with other devices. The communication circuitry 1507 includes modem 1507*a* and transceiver circuitry ("TRx") 1507*b*. The modem 1507*a* includes one or more processing devices (e.g., baseband processors) to carry out various protocol and radio control functions. Modem 1507*a* may interface with app circuitry of computer node 1500 (e.g., a combination of processor circuitry 1501, memory circuitry 1503, and/or storage circuitry 1504) for generation and processing of baseband signals and for controlling operations of the TRx 1507*b*. The modem 1507*a* handles various radio control functions that enable communication with one or more radio networks via the TRx 1507*b* according to one or more wireless communication protocols. The modem 1507*a* may include circuitry such as, but not limited to, one or more single-core or multi-core processors (e.g., one or more baseband processors) or control logic to process baseband signals received from a receive signal path of the TRx 1507*b*, and to generate baseband signals to be provided to the TRx 1507*b* via a transmit signal path. In various implementations, the modem 1507*a* may implement a real-time OS (RTOS) to manage resources of the modem 1507*a*, schedule tasks, and the like.

The communication circuitry 1507 also includes TRx 1507*b* to enable communication with wireless networks using modulated electromagnetic radiation through a non-solid medium. The TRx 1507*b* may include one or more radios that are compatible with, and/or may operate according to any one or more of the radio communication technologies, radio access technologies (RATs), and/or communication protocols/standards including any combination of those discussed herein. TRx 1507*b* includes a receive signal path, which comprises circuitry to convert analog RF signals (e.g., an existing or received modulated waveform) into digital baseband signals to be provided to the modem 1507*a*. The TRx 1507*b* also includes a transmit signal path, which comprises circuitry configured to convert digital baseband signals provided by the modem 1507*a* to be converted into analog RF signals (e.g., modulated waveform) that will be amplified and transmitted via an antenna array including one or more antenna elements (not shown). The antenna array may be a plurality of microstrip antennas or printed antennas that are fabricated on the surface of one or more printed circuit boards. The antenna array may be formed in as a patch of metal foil (e.g., a patch antenna) in a variety of shapes, and may be coupled with the TRx 1507*b* using metal transmission lines or the like.

The network interface circuitry/controller (NIC) 1507*c* provides wired communication to the network 1599 and/or to other devices using a standard communication protocol such as, for example, Ethernet (e.g., [IEEE802.3]), Ethernet over GRE Tunnels, Ethernet over Multiprotocol Label Switching (MPLS), Ethernet over USB, Controller Area Network (CAN), Local Interconnect Network (LIN), DeviceNet, ControlNet, Data Highway+, PROFIBUS, or PROFINET, among many others. Network connectivity may be provided to/from the computer node 1500 via the NIC 1507*c* using a physical connection, which may be electrical (e.g., a "copper interconnect"), fiber, and/or optical. The physical connection also includes suitable input connectors (e.g., ports, receptacles, sockets, and the like) and output connectors (e.g., plugs, pins, and the like). The NIC 1507*c* may include one or more dedicated processors and/or FPGAs to communicate using one or more of the aforementioned network interface protocols. In some implementations, the NIC 1507*c* may include multiple controllers to provide connectivity to other networks using the same or different protocols. For example, the computer node 1500 may include a first NIC 1507*c* providing communications to the network 1599 over Ethernet and a second NIC 1507*c* providing communications to other devices over another type of network. As examples, the NIC 1507*c* is or includes one or more of an Ethernet controller (e.g., a Gigabit Ethernet Controller or the like), a high-speed serial interface (HSSI), a Peripheral Component Interconnect (PCI) controller, a USB controller, a SmartNIC, an Intelligent Fabric Processor (IFP), and/or other like device.

The input/output (I/O) interface circuitry 1508 (also referred to as "interface circuitry 1508") is configured to connect or communicatively coupled the computer node 1500 with one or more external (peripheral) components, devices, and/or subsystems. In some implementations, the interface circuitry 1508 may be used to transfer data between the computer node 1500 and another computer device (e.g., remote system 1590, client system 1550, and/or the like) via a wired and/or wireless connection. is used to connect additional devices or subsystems. The interface circuitry 1508, is part of, or includes circuitry that enables the exchange of information between two or more components or devices such as, for example, between the computer node 1500 and one or more external devices. The external devices include sensor circuitry 1541, actuator circuitry 1542, positioning circuitry 1543, and other I/O devices 1540, but may also include other devices or subsystems not shown by FIG. 15. Access to various such devices/components may be implementation specific, and may vary from implementation to implementation. As examples, the interface circuitry 1508 can be embodied as, or otherwise include, one or more hardware interfaces such as, for example, buses (e.g., including an expansion buses, IXs, and/or the like), input/output (I/O) interfaces, peripheral component interfaces (e.g., peripheral cards and/or the like), network interface cards, host bus adapters, and/or mezzanines, and/or the like. In some implementations, the interface circuitry 1508 includes one or more interface controllers and connectors that interconnect one or more of the processor circuitry 1501, memory circuitry 1503, storage circuitry 1504, communication circuitry 1507, and the other components of computer node 1500 and/or to one or more external (peripheral) components, devices, and/or subsystems. Additionally or alternatively, the interface circuitry 1508 includes a sensor hub or other like elements to obtain and process collected sensor data and/or actuator data before being passed to other components of the computer node 1500.

Additionally or alternatively, the interface circuitry 1508 and/or the IX 1506 can be embodied as, or otherwise include memory controllers, storage controllers (e.g., redundant array of independent disk (RAID) controllers and the like), baseboard management controllers (BMCs), input/output (I/O) controllers, host controllers, and the like. Examples of I/O controllers include integrated memory controller (IMC), memory management unit (MMU), input-output MMU (IOMMU), sensor hub, General Purpose I/O (GPIO) controller, PCIe endpoint (EP) device, direct media interface (DMI) controller, Intel® Flexible Display Interface (FDI) controller(s), VGA interface controller(s), Peripheral Component Interconnect Express (PCIe) controller(s), universal serial bus (USB) controller(s), FireWire controller(s), Thunderbolt controller(s), FPGA Mezzanine Card (FMC), extensible Host Controller Interface (xHCI) controller(s), Enhanced Host Controller Interface (EHCI) controller(s), Serial Peripheral Interface (SPI) controller(s), Direct Memory Access (DMA) controller(s), hard drive controllers (e.g., Serial AT Attachment (SATA) host bus adapters/controllers, Intel® Rapid Storage Technology (RST), and/or the like), Advanced Host Controller Interface (AHCI), a Low Pin Count (LPC) interface (bridge function), Advanced Programmable Interrupt Controller(s) (APIC), audio controller(s), SMBus host interface controller(s), UART controller(s), and/or the like. Some of these controllers may be part of, or otherwise applicable to the memory circuitry 1503, storage circuitry 1504, and/or IX 1506 as well. As examples, the connectors include electrical connectors, ports, slots, jumpers, receptacles, modular connectors, coaxial cable and/or BNC connectors, optical fiber connectors, PCB mount connectors, inline/cable connectors, chassis/panel connectors, peripheral component interfaces (e.g., non-volatile memory ports, USB ports, Ethernet ports, audio jacks, power supply interfaces, on-board diagnostic (OBD) ports, and so forth), and/or the like.

The sensor(s) 1541 (also referred to as "sensor circuitry 1541") includes devices, modules, or subsystems whose purpose is to detect events or changes in its environment and send the information (sensor data) about the detected events to some other a device, module, subsystem, and the like. Individual sensors 1541 may be exteroceptive sensors (e.g., sensors that capture and/or measure environmental phenomena and/external states), proprioceptive sensors (e.g., sensors that capture and/or measure internal states of the computer node 1500 and/or individual components of the computer node 1500), and/or exproprioceptive sensors (e.g., sensors that capture, measure, or correlate internal states and external states). Examples of such sensors 1541 include inertia measurement units ((IMU), microelectromechanical systems (MEMS) or nanoelectromechanical systems (NEMS), level sensors, flow sensors, temperature sensors (e.g., thermistors, including sensors for measuring the temperature of internal components and sensors for measuring temperature external to the computer node 1500), pressure sensors, barometric pressure sensors, gravimeters, altimeters, image capture devices (e.g., visible light cameras, thermographic camera and/or thermal imaging camera (TIC) systems, forward-looking infrared (FLIR) camera systems, radiometric thermal camera systems, active infrared (IR) camera systems, ultraviolet (UV) camera systems, and/or the like), light detection and ranging (LiDAR) sensors, proximity sensors (e.g., IR radiation detector and the like), depth sensors, ambient light sensors, optical light sensors, ultrasonic transceivers, microphones, inductive loops, force and/or load sensors, remote charge converters (RCC), rotor speed and position sensor(s), fiber optic gyro (FOG) inertial sensors, Attitude & Heading Reference Unit (AHRU), fibre Bragg grating (FBG) sensors and interrogators, tachometers, engine temperature gauges, pressure gauges, transformer sensors, airspeed-measurement meters, speed indicators, and/or the like. The IMUs, MEMS, and/or NEMS can include, for example, one or more 3-axis accelerometers, one or more 3-axis gyroscopes, one or more magnetometers, one or more compasses, one or more barometers, and/or the like. Additionally or alternatively, the sensors 1541 can include sensors of various compute components such as, for example, digital thermal sensors (DTS) of respective processors/cores, thermal sensor on-die (TSOD) of respective dual inline memory modules (DIMMs), baseboard thermal sensors, and/or any other sensor(s), such as any of those discussed herein.

The actuators 1542 allow the computer node 1500 to change its state, position, and/or orientation, or move or control a mechanism or system. The actuators 1542 comprise electrical and/or mechanical devices for moving or controlling a mechanism or system, and converts energy (e.g., electric current or moving air and/or liquid) into some kind of motion. The computer node 1500 is configured to operate one or more actuators 1542 based on one or more captured events, instructions, control signals, and/or configurations received from a service provider 1590, client device 1550, and/or other components of the computer node 1500. As examples, the actuators 1542 can be or include any number and combination of the following: soft actuators (e.g., actuators that changes its shape in response to a stimuli such as, for example, mechanical, thermal, magnetic, and/or electrical stimuli), hydraulic actuators, pneumatic actuators, mechanical actuators, electromechanical actuators (EMAs), microelectromechanical actuators, electrohydraulic actuators, linear actuators, linear motors, rotary motors, DC motors, stepper motors, servomechanisms, electromechanical switches, electromechanical relays (EMRs), power switches, valve actuators, piezoelectric actuators and/or biomorphs, thermal biomorphs, solid state actuators, solid state relays (SSRs), shape-memory alloy-based actuators, electroactive polymer-based actuators, relay driver integrated circuits (ICs), solenoids, impactive actuators/mechanisms (e.g., jaws, claws, tweezers, clamps, hooks, mechanical fingers, humaniform dexterous robotic hands, and/or other gripper mechanisms that physically grasp by direct impact upon an object), propulsion actuators/mechanisms (e.g., wheels, axles, thrusters, propellers, engines, motors (e.g., those discussed previously), clutches, and the like), projectile actuators/mechanisms (e.g., mechanisms that shoot or propel objects or elements), controllers of the computer node 1500 or components thereof (e.g., host controllers, cooling element controllers, baseboard management controller (BMC), platform controller hub (PCH), uncore components (e.g., shared last level cache (LLC) cache, caching agent (Cbo), integrated memory controller (IMC), home agent (HA), power control unit (PCU), configuration agent (Ubox), integrated I/O controller (IIO), and interconnect (IX) link interfaces and/or controllers), and/or any other components such as any of those discussed herein), audible sound generators, visual warning devices, virtual instrumentation and/or virtualized actuator devices, and/or other like components or devices. In some examples, such as when the computer node 1500 is part of a robot or drone, the actuator (s) 1542 can be embodied as or otherwise represent one or more end effector tools, conveyor motors, and/or the like.

The positioning circuitry 1543 includes circuitry to receive and decode signals transmitted/broadcasted by a positioning network of a GNSS. Examples of such navigation satellite constellations include United States' GPS, Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), and the like), or the like. The positioning circuitry 1543 comprises various hardware elements (e.g., including hardware devices such as switches, filters, amplifiers, antenna elements, and the like to facilitate OTA communications) to communicate with components of a positioning network, such as navigation satellite constellation nodes. In some implementations, the positioning circuitry 1543 may include a Micro-Technology for Positioning, Navigation, and Timing (Micro-PNT) IC that uses a master timing clock to perform position tracking/estimation without GNSS assistance. The positioning circuitry 1543 may also be part of, or interact with, the communication circuitry 1507 to communicate with the nodes and components of the positioning network. The positioning circuitry 1543 may also provide position data and/or time data to the application circuitry, which may use the data to synchronize operations with various infrastructure (e.g., radio base stations), for turn-by-turn navigation, or the like.

NFC circuitry 1546 comprises one or more hardware devices and software modules configurable or operable to read electronic tags and/or connect with another NFC-enabled device (also referred to as an "NFC touchpoint"). NFC is commonly used for contactless, short-range communications based on radio frequency identification (RFID) standards, where magnetic field induction is used to enable communication between NFC-enabled devices. The one or more hardware devices may include an NFC controller coupled with an antenna element and a processor coupled with the NFC controller. The NFC controller may be a chip providing NFC functionalities to the NFC circuitry 1546. The software modules may include NFC controller firmware and an NFC stack. The NFC stack may be executed by the processor to control the NFC controller, and the NFC controller firmware may be executed by the NFC controller to control the antenna element to emit an RF signal. The RF signal may power a passive NFC tag (e.g., a microchip embedded in a sticker or wristband) to transmit stored data to the NFC circuitry 1546, or initiate data transfer between the NFC circuitry 1546 and another active NFC device (e.g., a smartphone or an NFC-enabled point-of-sale terminal) that is proximate to the computing system 1500 (or the NFC circuitry 1546 contained therein). The NFC circuitry 1546 may include other elements, such as those discussed herein. Additionally, the NFC circuitry 1546 may interface with a secure element (e.g., TEE 1590) to obtain payment credentials and/or other sensitive/secure data to be provided to the other active NFC device. Additionally or alternatively, the NFC circuitry 1546 and/or some other element may provide Host Card Emulation (HCE), which emulates a physical secure element.

The I/O device(s) 1540 may be present within, or connected to, the computer node 1500. The I/O devices 1540 include input device circuitry and output device circuitry including one or more user interfaces designed to enable user interaction with the computer node 1500 and/or peripheral component interfaces designed to enable peripheral component interaction with the computer node 1500. The input device circuitry includes any physical or virtual means for accepting an input including, inter alia, one or more physical or virtual buttons, a physical or virtual keyboard, keypad, mouse, touchpad, touchscreen, microphones, scanner, headset, and/or the like. In implementations where the input device circuitry includes a capacitive, resistive, or other like touch-surface, a touch signal may be obtained from circuitry of the touch-surface. The touch signal may include information regarding a location of the touch (e.g., one or more sets of (x,y) coordinates describing an area, shape, and/or movement of the touch), a pressure of the touch (e.g., as measured by area of contact between a user's finger or a deformable stylus and the touch-surface, or by a pressure sensor), a duration of contact, any other suitable information, or any combination of such information. In these implementations, one or more apps operated by the processor circuitry 1501 may identify gesture(s) based on the information of the touch signal, and utilizing a gesture library that maps determined gestures with specified actions.

The output device circuitry is used to show or convey information, such as sensor readings, actuator position(s), or other like information. Data and/or graphics may be displayed on one or more user interface components of the output device circuitry. The output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED and/or OLED displays, quantum dot displays, projectors, and the like), with the output of characters, graphics, multimedia objects, and the like being generated or produced from operation of the computer node 1500. The output device circuitry may also include speakers or other audio emitting devices, printer(s), and/or the like. In some implementations, the sensor circuitry 1541 may be used as the input device circuitry (e.g., an image capture device, motion capture device, or the like) and one or more actuators 1542 may be used as the output device circuitry (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a universal serial bus (USB) port, an audio jack, a power supply interface, and the like.

A battery 1524 may be coupled to the computer node 1500 to power the computer node 1500, which may be used in implementations where the computer node 1500 is not in a fixed location, such as when the computer node 1500 is a mobile device or laptop. The battery 1524 may be a lithium ion battery, a lead-acid automotive battery, or a metal-air battery, such as a zinc-air battery, an aluminum-air battery, a lithium-air battery, a lithium polymer battery, and/or the like. In implementations where the computer node 1500 is mounted in a fixed location, such as when the system is implemented as a server computer system, the computer node 1500 may have a power supply coupled to an electrical grid. In these implementations, the computer node 1500 may include power tee circuitry to provide for electrical power drawn from a network cable to provide both power supply and data connectivity to the computer node 1500 using a single cable.

Power management integrated circuitry (PMIC) 1522 may be included in the computer node 1500 to track the state of charge (SoCh) of the battery 1524, and to control charging of the computer node 1500. The PMIC 1522 may be used to monitor other parameters of the battery 1524 to provide failure predictions, such as the state of health (SoH) and the state of function (SoF) of the battery 1524. The PMIC 1522 may include voltage regulators, surge protectors, power alarm detection circuitry. The power alarm detection circuitry may detect one or more of brown out (under-voltage) and surge (over-voltage) conditions. The PMIC 1522 may communicate the information on the battery 1524 to the processor circuitry 1501 over the IX 1506. The PMIC 1522 may also include an analog-to-digital (ADC) convertor that allows the processor circuitry 1501 to directly monitor the voltage of the battery 1524 or the current flow from the battery 1524. The battery parameters may be used to determine actions that the computer node 1500 may perform, such as transmission frequency, mesh network operation, sensing frequency, and the like.

A power block 1520, or other power supply coupled to an electrical grid, may be coupled with the PMIC 1522 to charge the battery 1524. In some examples, the power block 1520 may be replaced with a wireless power receiver to obtain the power wirelessly, for example, through a loop antenna in the computer node 1500. In these implementations, a wireless battery charging circuit may be included in the PMIC 1522. The specific charging circuits chosen depend on the size of the battery 1524 and the current required.

The computer node 1500 may include any combinations of the components shown by FIG. 15; however, some of the components shown may be omitted, additional components may be present, and different arrangement of the components shown may occur in other implementations. In one example where the computer node 1500 is or is part of a server computer system, the battery 1524, communication circuitry 1507, the sensors 1541, actuators 1542, and/or positioning circuitry 1543, and possibly some or all of the I/O devices 1540, may be omitted.

As mentioned previously, the memory circuitry 1503 and/or the storage circuitry 1504 are embodied as transitory or non-transitory computer-readable media (e.g., CRM 1502). The CRM 1502 is suitable for use to store instructions (or data that creates the instructions) that cause an apparatus (such as any of the devices/components/systems described w.r.t FIGS. 1-14), in response to execution of the instructions (e.g., instructions 1501*x*, 1503*x*, 1504*x*) by the computer node 1500 (e.g., one or more processors 1501), to practice selected aspects of the present disclosure. The CRM 1502 can include a number of programming instructions (e.g., instructions 1501*x*, 1503*x*, 1504*x*) (or data to create the programming instructions). The programming instructions are configured to enable a device (e.g., any of the devices/components/systems described w.r.t FIGS. 1-14), in response to execution of the programming instructions, to perform various programming operations associated with operating system functions, one or more apps, and/or aspects of the present disclosure (including various programming operations associated with FIGS. 1-14. The programming instructions may correspond to any of the computational logic 1504*x*, instructions 1503*x* and 1501*x* discussed previously.

Additionally or alternatively, programming instructions (or data to create the instructions) may be disposed on multiple CRM 1502. In alternate implementations, programming instructions (or data to create the instructions) may be disposed on computer-readable transitory storage media, such as signals. The programming instructions embodied by a machine-readable medium 1502 may be transmitted or received over a communications network using a transmission medium via a network interface device (e.g., communication circuitry 1507 and/or NIC 1507*c* of FIG. 15) utilizing any one of a number of communication protocols and/or data transfer protocols such as any of those discussed herein.

Any combination of one or more computer usable or CRM 1502 may be utilized as or instead of the CRM 1502. The computer-usable or computer-readable medium 1502 may be, for example, but not limited to one or more electronic, magnetic, optical, electromagnetic, infrared, or semiconductor systems, apparatuses, devices, or propagation media. For instance, the CRM 1502 may be embodied by devices described for the storage circuitry 1504 and/or memory circuitry 1503 described previously and/or as discussed elsewhere in the present disclosure. In the context of the present disclosure, a computer-usable or computer-readable medium 1502 may be any medium that can contain, store, communicate, propagate, or transport the program (or data to create the program) for use by or in connection with the instruction execution system, apparatus, or device. The computer-usable medium 1502 may include a propagated data signal with the computer-usable program code (e.g., including programming instructions) or data to create the program code embodied therewith, either in baseband or as part of a carrier wave. The computer usable program code or data to create the program may be transmitted using any appropriate medium, including but not limited to wireless, wireline, optical fiber cable, RF, and the like. Additionally or alternatively, the program code (or data to create the program code) described herein may be stored in one or more of a compressed format, an encrypted format, a fragmented format, a packaged format, and/or the like. Program code (e.g., programming instructions) or data to create the program code as described herein may require one or more of installation, modification, adaptation, updating, combining, supplementing, configuring, decryption, decompression, unpacking, distribution, reassignment, and the like in order to make them directly readable and/or executable by a computing device and/or other machine. For example, the program code or data to create the program code may be stored in multiple parts, which are individually compressed, encrypted, and stored on separate computing devices, wherein the parts when decrypted, decompressed, and combined form a set of executable instructions that implement the program code or the data to create the program code, such as those described herein. In another example, the program code or data to create the program code may be stored in a state in which they may be read by a computer, but require addition of a library (e.g., a dynamic link library), a software development kit (SDK), an API, and the like in order to execute the instructions on a particular computing device or other device. In another example, the program code or data to create the program code may need to be configured (e.g., settings stored, data input, network addresses recorded, and the like) before the program code or data to create the program code can be executed/used in whole or in part. In this example, the program code (or data to create the program code) may be unpacked, configured for proper execution, and stored in a first location with the configuration instructions located in a second location distinct from the first location. The configuration instructions can be initiated by an action, trigger, or instruction that is not co-located in storage or execution location with the instructions enabling the disclosed techniques. Accordingly, the disclosed program code or data to create the program code are intended to encompass such machine readable instructions and/or program(s) or data to create such machine readable instruction and/or programs regardless of the particular format or state of the machine readable instructions and/or program(s) when stored or otherwise at rest or in transit.

The computer program code for carrying out operations of the present disclosure, including, for example, programming instructions, computational logic 1504*x*, instructions 1503*x*, and/or instructions 1501*x*, may be written in any combination of one or more programming languages, including an object oriented programming language (e.g., Python, PyTorch, Ruby, Scala, Smalltalk, Java™, Java Servlets, Kotlin, C++, C#, and/or the like), a procedural programming language (e.g., the "C" programming language, Go (or "Golang"), and/or the like), a scripting language (e.g., ECMAScript, JavaScript, Server-Side JavaScript (SSJS), PHP, Pearl, Python, PyTorch, Ruby, Lua, Torch/Lua with Just-In Time compiler (LuaJIT), Accelerated Mobile Pages Script (AMPscript), VBScript, and/or the like), a markup language (e.g., hypertext markup language (HTML), extensible markup language (XML), wiki markup or Wikitext, User Interface Markup Language (UIML), and/or the like), a data interchange format/definition (e.g., Java Script Object Notion (JSON), Apache® MessagePack™, and/or the like), a stylesheet language (e.g., Cascading Stylesheets (CSS), extensible stylesheet language (XSL), and/or the like), an interface definition language (IDL) (e.g., Apache® Thrift, Abstract Syntax Notation One (ASN.1), Google® Protocol Buffers (protobuf), efficient XML interchange (EXI), and/or the like), a web framework (e.g., Active Server Pages Network Enabled Technologies (ASP.NET), Apache® Wicket, Asynchronous Javascript and XML (Ajax) frameworks, Django, Jakarta Server Faces (JSF; formerly JavaServer Faces), Jakarta Server Pages (JSP; formerly JavaServer Pages), Ruby on Rails, web toolkit, and/or the like), a template language (e.g., Apache® Velocity, Tea, Django template language, Mustache, Template Attribute Language (TAL), Extensible Stylesheet Language Transformations (XSLT), Thymeleaf, Facelet view, and/or the like), and/or some other suitable programming languages including proprietary programming languages and/or development tools, or any other languages or tools such as those discussed herein. It should be noted that some of the aforementioned languages, tools, and/or technologies may be classified as belonging to multiple types of languages/technologies or otherwise classified differently than described previously. The computer program code for carrying out operations of the present disclosure may also be written in any combination of the programming languages discussed herein. The program code may execute entirely on the computer node 1500, partly on the computer node 1500 as a stand-alone software package, partly on the computer node 1500 and partly on a remote computer, or entirely on the remote computer. In the latter scenario, the remote computer may be connected to the computer node 1500 through any type of network (e.g., network 1599).

The network 1599 comprises a set of computers that share resources located on or otherwise provided by a set of network nodes. The set of computers making up the network 1599 can use one or more communication protocols and/or access technologies (such as any of those discussed herein) to communicate with one another and/or with other computers outside of the network 1599 (e.g., computer node 1500, client device 1550, and/or remote system 1590), and may be connected with one another or otherwise arranged in a variety of network topologies.

As examples, the network 1599 can represent the Internet, one or more cellular networks, local area networks (LANs), wide area networks (WANs), wireless LANs (WLANs), Transfer Control Protocol (TCP)/Internet Protocol (IP)-based networks, Personal Area Networks (e.g., Bluetooth®, [IEEE802154], and/or the like), Digital Subscriber Line (DSL) and/or cable networks, data networks, cloud computing services, edge computing networks, proprietary and/or enterprise networks, and/or any combination thereof. In some implementations, the network 1599 is associated with network operator who owns or controls equipment and other elements necessary to provide network-related services, such as one or more network access nodes (NANs) (e.g., base stations, access points, and the like), one or more servers for routing digital data or telephone calls (e.g., a core network or backbone network), and the like. Other networks can be used instead of or in addition to the Internet, such as an intranet, an extranet, a virtual private network (VPN), an enterprise network, a non-TCP/IP based network, any LAN, WLAN, WAN, and/or the like. In either implementation, the network 1599 comprises computers, network connections among various computers (e.g., between the computer node 1500, client device(s) 1550, remote system 1590, and/or the like), and software routines to enable communication between the computers over respective network connections. Connections to the network 1599 (and/or computer nodes therein) may be via a wired and/or a wireless connections using the various communication protocols such as any of those discussed herein. More than one network may be involved in a communication session between the illustrated devices. Connection to the network 1599 may require that the computers execute software routines that enable, for example, the layers of the OSI model of computer networking or equivalent in a wireless (or cellular) phone network.

The remote system 1590 (also referred to as a "service provider", "application server(s)", "app server(s)", "external platform", and/or the like) comprises one or more physical and/or virtualized computing systems owned and/or operated by a company, enterprise, and/or individual that hosts, serves, and/or otherwise provides information objects to one or more users (e.g., computer node 1500). The physical and/or virtualized systems include one or more logically or physically connected servers and/or data storage devices distributed locally or across one or more geographic locations. Generally, the remote system 1590 uses IP/network resources to provide information objects such as electronic documents, webpages, forms, apps (e.g., native apps, web apps, mobile apps, and/or the like), data, services, web services, media, and/or content to different user/client devices 1550. As examples, the service provider 1590 may provide mapping and/or navigation services; cloud computing services; search engine services; social networking, microblogging, and/or message board services; content (media) streaming services; e-commerce services; blockchain services; communication services such as Voice-over-Internet Protocol (VOIP) sessions, text messaging, group communication sessions, and the like; immersive gaming experiences; and/or other like services. Additionally or alternatively, the remote system 1590 represents or is otherwise embodied as a cloud computing service that provides machine learning training and/or model deployment services according to the various example implementations discussed herein.

Additionally or alternatively, the remote system 1590 represents or is otherwise embodied as an edge computing network and/or edge computing framework comprising a set of edge computer nodes (also referred to as "edge computer nodes" or the like) that provide a distributed computing environment for application and service hosting, and also provide storage and processing resources so that data and/or content can be processed in relatively close proximity to subscribers (e.g., users of client devices 1550 and/or the computer node 1500) for faster response times The edge computer nodes also support multitenancy run-time and hosting environment(s) for applications, including virtual appliance applications that may be delivered as packaged virtual machine (VM) images, middleware application and infrastructure services, content delivery services including content caching, mobile big data analytics, and computational offloading, among others. Computational offloading involves offloading computational tasks, workloads, applications, and/or services to the edge computer nodes from the various clients and/or other remote systems, or vice versa. Additionally or alternatively, the edge computer nodes may partition resources (e.g., computation/processor, memory/storage, acceleration, interrupt controller, I/O controller, memory controller, bus controller, network connections or sessions, and/or the like) where respective partitionings may contain security and/or integrity protection capabilities. The edge computer nodes may also provide orchestration of multiple applications through isolated user-space instances such as virtualization containers, partitions, virtual environments (VEs), virtual machines (VMs), Function-as-a-Service (FaaS) engines, servlets, servers, and/or other like computation abstractions. Operation of the edge computer nodes can be coordinated based on edge provisioning functions, while the operation of various edge applications can be coordinated with orchestration functions (e.g., container engine, hypervisor, VMM, and/or the like). The orchestration functions may be used to deploy the isolated user-space instances, identify and schedule use of specific hardware, provide security related functions (e.g., key management, trust anchor management, and the like), and/or other tasks related to the provisioning and lifecycle of isolated user spaces. Any suitable standards and network implementations are applicable to the edge computing concepts discussed herein. For example, many edge computing/networking technologies may be applicable to the present disclosure in various combinations and layouts of devices located at the edge of a network. Examples of such edge computing/networking technologies include ETSI Multi-access Edge Computing (MEC) framework, Open RAN Alliance ("O-RAN") framework, 3rd Generation Partnership Project (3GPP) System Aspects Working Group 6 (SA6) Architecture for enabling Edge Applications (see e.g., 3GPP TS 23.558 v1.2.0 (2020-12-07), 3GPP TS 23.501 v17.6.0 (2022-09-22), 3GPP TS 23.548 v17.4.0 (2022 Sep. 22), the contents of each of which are hereby incorporated by reference in their entireties), Open Networking Foundation (ONF) frameworks (e.g., Central Office Re-architected as a Datacenter (CORD), Converged Multi-Access and Core (COMAC), SD-RAN™, and/or the like), a Content Delivery Network (CDN) framework (also referred to as "Content Distribution Networks" or the like); Mobility Service Provider (MSP) edge computing and/or Mobility as a Service (MaaS) provider systems (e.g., used in AECC architectures); Nebula edge-cloud systems, Fog computing systems/arrangements, cloudlet edge-cloud systems; Mobile Cloud Computing (MCC) frameworks, and/or the like. Further, the techniques disclosed herein may relate to other IoT edge network systems and configurations, and other intermediate processing entities and architectures may also be used for purposes of the present disclosure.

In various implementations, the computer node 1500 1500, client device 1550, and/or remote system 1590 may operate according to the various DNDF aspects discussed herein. As an example, these devices/systems may operate as follows:

First, the client device 1550 provides an ML configuration (config) to an ML platform. In some examples, the ML platform may be the computer node 1500 1500, one or more computer nodes of the remote system 1590, and/or any combination thereof. To interact with the ML platform, the client device 1550 operates a client application (app), which may be a suitable client such as web browser, a desktop app, mobile app, a web app, and/or other like element that is configured to operate with the ML platform via a suitable communication protocol, such as any of those discussed herein. The ML config. allows a user of the client device 1550 to define or specify a desired ML architecture to operate the DNDF (e.g., DNDF architecture 300, 400 and/or the like), or otherwise manage how the ML platform is to operate the DNDF (e.g., DNDF architecture 300, 400 and/or the like).

The "ML architecture" in this example may refer to a particular ML model (e.g., the DNDF) having a particular set of ML parameters. The set of ML parameters may include model parameters (also referred to simply as "parameters") and/or hyperparameters. Model parameters are parameters derived via training, whereas hyperparameters are parameters whose values are used to control aspects of the learning process and usually have to be set before running an ML model. Additionally, for purposes of the present disclosure, hyperparameters may be classified as architectural hyperparameters or training hyperparameters. Architectural hyperparameters are hyperparameters that are related to architectural aspects of an ML model such as, for example, the number of (hidden) layers in a DNN, specific (hidden) layer types in a DNN (e.g., convolutional layers, perceptron layers, multilayer perception (MLP) layers, NDFs 305, and/or the like), number of output channels, kernel size, and/or the like. Training hyperparameters are hyperparameters that control an ML model's training process such as, for example, number of epochs/iterations, target pattern(s) 401, learning rate, neuron/neural gain 431 (*ai*), neural/neuron gain and/or learning rate adjustment factors/parameters (e.g., used to adjust the neural gain 431 by the gain adjuster 430), neural gain and/or learning rate adjustment/update type (e.g., step size, decay rate, momentum/momentum rate, amount of time or time-based schedule, exponential function, and/or the like), error threshold(s) 421, the number of computations to complete the DNDF learning process (e.g., NP in equation (6)), any of the parameters in Table 1 (supra), and/or any other suitable ML parameters, such as any of those discussed herein. For purposes of the present disclosure, the term "ML parameter" as used herein may refer to model parameters, hyperparameters, or both model parameters and hyperparameters unless the context dictates otherwise Second, the ML platform extracts the various ML parameters from the ML config. and configures the ML architecture, accordingly. For example, the ML platform may set up a DNDF (e.g., DNDF architecture 300, 400 and/or the like) based on the ML parameters. This can include, for example, setting various parameters of a learning algorithm (e.g., CEP NN architecture 100) to learn a number of NDFs 305 specified by the ML config., setting the target pattern(s) 401, error threshold 421, gain adjustment factors and/or types to be used by gain adjuster 430 during the DNDF learning process, setting a number of epochs/iterations to be performed, and/or the like. Third, the ML platform operates the ML architecture until convergence or other like parameters, conditions, or criteria are met. In some examples, this may involve operating processes 200 and 500 as discussed previously. Fourth, an output and/or results of operating the ML architecture are provided to the client device 1550 using the same or similar communication mechanisms discussed previously.

4. EXAMPLE IMPLEMENTATIONS

Additional examples of the presently described method, system, and device embodiments include the following, non-limiting implementations. Each of the following non-limiting examples may stand on its own or may be combined in any permutation or combination with any one or more of the other examples provided below or throughout the present disclosure.

Example 0116 includes a method of operating a dynamic neural distribution function learning algorithm, comprising: operating a machine learning algorithm to learn a set of neural distribution functions (NDFs) independently of one another; and during each iteration of a learning process until convergence is reached: providing each NDF in the set of NDFs with an input pattern to obtain a set of candidate outputs, wherein each NDF is configured to generate a candidate output in the set of candidate outputs based on the input pattern; operating a competition function to select a candidate output from among the set of candidate outputs, comparing the selected candidate output with a target pattern to obtain an error value, adjusting the neural gains of corresponding NDFs in the set of NDFs when the error value is greater than a threshold value, and feeding the adjusted neural gains to the corresponding NDFs for generation of a next set of candidate outputs during a next iteration of the learning process.

Example 0117 includes the method of example 0116 and/or some other example(s) herein, wherein each NDF in the set of NDFs includes a decision boundary (DB), and each NDF is configured to classify data as belonging on one side of its DB.

Example 0118 includes the method of example 0117 and/or some other example(s) herein, wherein each NDF is configured to generate the candidate output to include its DB.

Example 0119 includes the method of example 0118 and/or some other example(s) herein, wherein each NDF is configured to generate the candidate output to include one or more classified datasets, wherein each classified dataset of the one or more classified datasets includes a predicted data class.

Example 0120 includes the method of example 0116-0119 and/or some other example(s) herein, wherein the method includes: deriving a DB for each NDF in the set of NDFs independently from other NDFs in the set of NDFs.

Example 0121 includes the method of example 0120 and/or some other example(s) herein, wherein execution of the instructions is to cause the computer node 1500 to: operating the machine learning algorithm to learn the DB of each NDF.

Example 0122 includes the method of example 0116-0121 and/or some other example(s) herein, wherein the set of NDFs are individual sub-networks that are part of a super-network.

Example 0123 includes the method of example 0122 and/or some other example(s) herein, wherein the learning process is a training phase for training the super-network, and wherein the input pattern and the target pattern are part of a training dataset.

Example 0124 includes the method of examples 0122-0123 and/or some other example(s) herein, wherein the learning process is a testing phase for testing and validating the super-network, and wherein the input pattern and the target pattern are part of a test dataset.

Example 0125 includes the method of example 0124 and/or some other example(s) herein, wherein the testing phase includes one or more of an exclusive OR (XOR) problem to test a linear separability of the super-network, an additive class learning (ACL) problem to test a sequential learning capability of the super-network, and an update learning problem to test an autonomous learning capability of the super-network.

Example 0126 includes the method of examples 0122-0125 and/or some other example(s) herein, wherein the super-network is configured to perform object recognition in image or video data by emulating retina, fovea, and lateral geniculate nucleus (LGN) of a vertebrate.

Example 0127 includes the method of examples 0116-0125 and/or some other example(s) herein, wherein the machine learning algorithm is a cascade error projection learning algorithm.

Example 0128 includes a method of operating a computer node 1500 to operate a dynamic neural distribution function architecture for training a machine learning model, wherein the computer node 1500 comprises a set of neural distribution functions (NDFs) that are independent of one another, a competition function connected to the set of NDFs, a comparator connected to the competition function, and a gain adjuster connected to the comparator and the set of NDFs, and wherein the method comprises: during each iteration of a learning process until convergence is reached, independently operating each NDF of the set of NDFs to receive an input pattern and generate a candidate output in a set of candidate outputs based on the input pattern; operating the competition function to select a candidate output from among the set of candidate outputs during each iteration; operating the comparator to compare the selected candidate output with a target pattern to obtain an error value; and operating the gain adjuster to adjust respective neural gains of corresponding NDFs in the set of NDFs when the error value is greater than a threshold, and feed the adjusted neural gains to the corresponding NDFs, wherein the adjusted neural gains are for generation of a next set of candidate outputs during a next iteration of the learning process.

Example 0129 includes the method of example 0128 and/or some other example(s) herein, wherein the set of NDFs are learned independently of one another using a cascade error projection (CEP) learning algorithm.

Example 0130 includes the method of example 0129 and/or some other example(s) herein, wherein each NDF in the set of NDFs includes a decision boundary (DB), and each NDF is configured to classify data according to its DB.

Example 0131 includes the method of example 0130 and/or some other example(s) herein, wherein each NDF is configured to generate the candidate output to include its DB and one or more classified datasets.

Example 0132 includes the method of examples 0130-0131 and/or some other example(s) herein, wherein the DB of each NDF is derived using the CEP learning algorithm.

Example 0133 includes the method of examples 0122-0132 and/or some other example(s) herein, wherein the set of NDFs are individual sub-networks that are part of a super-network, and wherein the learning process is one of: a training phase for training the super-network or a testing phase for testing and validating the super-network, wherein the input pattern and the target pattern for the training phase are part of a training dataset, and the input pattern and the target pattern for the testing phase are part of a test dataset.

Example 0134 includes the method of examples 0122-0133 and/or some other example(s) herein, wherein the super-network is a neural network (NN) including one or more of an associative NN, autoencoder, Bayesian NN (BNN), dynamic BNN (DBN), CEP NN, compositional pattern-producing network, convolution NN (CNN), deep CNN, deep Boltzmann machine, restricted Boltzmann machine, deep belief NN, deconvolutional NN, feed forward NN (FFN), deep predictive coding network, deep stacking NN, dynamic neural distribution function NN, encoder-decoder network, energy-based generative NN, generative adversarial network, graph NN, multilayer perceptron, perception NN, linear dynamical system (LDS), switching LDS, Markov chain, multilayer kernel machines, neural Turing machine, optical NN, radial basis function, recurrent NN, long short term memory network, gated recurrent unit, echo state network, reinforcement learning NN, self-organizing feature map, spiking NN, transformer NN, attention NN, self-attention NN, and time delay NN.

Example 0135 includes the method of examples 0116-0134 and/or some other example(s) herein, wherein the competition function includes one or more of a maximum function, a minimum function, a folding function, a radial function, a ridge function, softmax function, a maxout function, an arg max function, an arg min function, a ramp function, an identity function, a step function, a Gaussian function, a logistic function, a sigmoid function, and a transfer function.

Example 0136 includes one or more computer readable media comprising instructions, wherein execution of the instructions by processor circuitry is to cause the processor circuitry to perform the method of any one of examples 0116-0135 and/or some other example(s) herein.

Example 0137 includes a computer program comprising the instructions of example 0136 and/or some other example(s) herein.

Example 0138 includes an Application Programming Interface defining functions, methods, variables, data structures, and/or protocols for the computer program of example 0136 and/or some other example(s) herein.

Example 0139 includes an apparatus comprising circuitry loaded with the instructions of example 0136 and/or some other example(s) herein.

Example 0140 includes an apparatus comprising circuitry operable to run the instructions of example 0136 and/or some other example(s) herein.

Example 0141 includes an integrated circuit comprising one or more of the processor circuitry and the one or more computer readable media of example 0136 and/or some other example(s) herein.

Example 0142 includes a computing system comprising the one or more computer readable media and the processor circuitry of example 0136 and/or some other example(s) herein.

Example 0143 includes an apparatus comprising means for executing the instructions of example 0136 and/or some other example(s) herein.

Example 0144 includes a signal generated as a result of executing the instructions of example 0136 and/or some other example(s) herein.

Example 0145 includes a data unit generated as a result of executing the instructions of example 0136 and/or some other example(s) herein.

Example 0146 includes the data unit of example 0144 and/or some other example(s) herein, the data unit is a datagram, network packet, data frame, data segment, a Protocol Data Unit (PDU), a Service Data Unit (SDU), a message, or a database object.

Example 0147 includes a signal encoded with the data unit of examples 0144-0145 and/or some other example(s) herein.

Example 0148 includes an electromagnetic signal carrying the instructions of example 0136 and/or some other example(s) herein.

Example 0149 includes an apparatus comprising means for performing the method of any one of examples 0116-0135 and/or some other example(s) herein.

Terminology

As used herein, the singular forms “a,” “an” and “the” are intended to include plural forms as well, unless the context clearly indicates otherwise. It will be further understood that the terms “comprises” and/or “comprising,” when used in this specification, specific the presence of stated features, integers, steps, operations, elements, and/or components, but do not preclude the presence or addition of one or more other features, integers, steps, operation, elements, components, and/or groups thereof. The phrase “A and/or B” means (A), (B), or (A and B). For the purposes of the present disclosure, the phrase “A, B, and/or C” means (A), (B), (C), (A and B), (A and C), (B and C), or (A, B and C). The phrase “X(s)” means one or more X or a set of X. The description may use the phrases “in an embodiment,” “In some embodiments,” “in one implementation,” “In some implementations,” “in some examples”, and the like, each of which may refer to one or more of the same or different embodiments, implementations, and/or examples. Furthermore, the terms “comprising,” “including,” “having,” and the like, as used with respect to the present disclosure, are synonymous.

The terms “coupled,” “communicatively coupled,” along with derivatives thereof are used herein. The term “coupled” may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term “directly coupled” may mean that two or more elements are in direct contact with one another. The term “communicatively coupled” may mean that two or more elements may be in contact with one another by a means of communication including through a wire or other interconnect connection, through a wireless communication channel or ink, and/or the like.

The term “establish” or “establishment” at least in some examples refers to (partial or in full) acts, tasks, operations, and the like, related to bringing or the readying the bringing of something into existence either actively or passively (e.g., exposing a device identity or entity identity). Additionally or alternatively, the term “establish” or “establishment” at least in some examples refers to (partial or in full) acts, tasks, operations, and the like, related to initiating, starting, or warming communication or initiating, starting, or warming a relationship between two entities or elements (e.g., establish a session, establish a session, and the like). Additionally or alternatively, the term “establish” or “establishment” at least in some examples refers to initiating something to a state of working readiness. The term “established” at least in some examples refers to a state of being operational or ready for use (e.g., full establishment). Furthermore, any definition for the term “establish” or “establishment” defined in any specification or standard can be used for purposes of the present disclosure and such definitions are not disavowed by any of the aforementioned definitions.

The term “obtain” at least in some examples refers to (partial or in full) acts, tasks, operations, and the like, of intercepting, movement, copying, retrieval, or acquisition (e.g., from a memory, an interface, or a buffer), on the original packet stream or on a copy (e.g., a new instance) of the packet stream. Other aspects of obtaining or receiving may involving instantiating, enabling, or controlling the ability to obtain or receive a stream of packets (or the following parameters and templates or template values).

The term "receipt" at least in some examples refers to any action (or set of actions) involved with receiving or obtaining an object, data, data unit, and the like, and/or the fact of the object, data, data unit, and the like being received. The term "receipt" at least in some examples refers to an object, data, data unit, and the like, being pushed to a device, system, element, and the like (e.g., often referred to as a push model), pulled by a device, system, element, and the like (e.g., often referred to as a pull model), and/or the like.

The term "element" at least in some examples refers to a unit that is indivisible at a given level of abstraction and has a clearly defined boundary, wherein an element may be any type of entity including, for example, one or more devices, systems, controllers, network elements, modules, engines, components, and so forth, or combinations thereof. The term "entity" at least in some examples refers to a distinct element of a component, architecture, platform, device, and/or system. Additionally or alternatively, the term "entity" at least in some examples refers to information transferred as a payload.

The term "measurement" at least in some examples refers to the observation and/or quantification of attributes of an object, event, or phenomenon. Additionally or alternatively, the term "measurement" at least in some examples refers to a set of operations having the object of determining a measured value or measurement result, and/or the actual instance or execution of operations leading to a measured value. Additionally or alternatively, the term "measurement" at least in some examples refers to data recorded during testing. The term "metric" at least in some examples refers to a quantity produced in an assessment of a measured value. Additionally or alternatively, the term "metric" at least in some examples refers to data derived from a set of measurements. Additionally or alternatively, the term "metric" at least in some examples refers to set of events combined or otherwise grouped into one or more values. Additionally or alternatively, the term "metric" at least in some examples refers to a combination of measures or set of collected data points. Additionally or alternatively, the term "metric" at least in some examples refers to a standard definition of a quantity, produced in an assessment of performance and/or reliability of the network, which has an intended utility and is carefully specified to convey the exact meaning of a measured value.

Examples of measurements and/or metrics that may be used to practice various aspects of the present disclosure include those discussed in Intel® VTune™ Profiler User Guide, Intel Corp., version 2023 (16 Dec. 2022) ("[VTune]"), Naser et al., Insights into Performance Fitness and Error Metrics for Machine Learning, arXiv: 2006.00887v1 (17 May 2020) ("[Naser]"), Naser et al., Error Metrics and Performance Fitness Indicators for Artificial Intelligence and Machine Learning in Engineering and Sciences, Archit: Struct. Constr. 2021, pp. 1-19 (24 Nov. 2021) ("[Naser2]"), 3GPP TS 36.214 v16.2.0 (2021-03-31) ("[TS36214]"), 3GPP TS 38.215 v16.4.0 (2021 Jan. 8) ("[TS38215]"), 3GPP TS 38.314 v16.4.0 (2021 Sep. 30) ("[TS38314]"), and/or [IEEE80211], the contents of each of which are hereby incorporated by reference in their entireties and for all purposes.

The term "benchmark" or "benchmarking" at least in some examples refers to a measure or metric of performance using a specific indicator resulting in a metric of performance. Additionally or alternatively, the term "benchmark" or "benchmarking" at least in some embodiments refers to the act of running a computer program, a set of programs, or other operations, in order to assess the relative performance of an object, normally by running a number of standard tests and trials against it.

The term "signal" at least in some examples refers to an observable change in a quality and/or quantity. Additionally or alternatively, the term "signal" at least in some examples refers to a function that conveys information about of an object, event, or phenomenon. Additionally or alternatively, the term "signal" at least in some examples refers to any time varying voltage, current, or electromagnetic wave that may or may not carry information. The term "digital signal" at least in some examples refers to a signal that is constructed from a discrete set of waveforms of a physical quantity so as to represent a sequence of discrete values.

The terms "ego" (as in, e.g., "ego device") and "subject" (as in, e.g., "data subject") at least in some examples refers to an entity, element, device, system, and the like, that is under consideration or being considered. The terms "neighbor" and "proximate" (as in, e.g., "proximate device") at least in some examples refers to an entity, element, device, system, and the like, other than an ego device or subject device.

The term "circuitry" at least in some examples refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an application-specific integrated circuit (ASIC), field-programmable gate array (FPGA), programmable logic controller (PLC), single-board computer (SBC), system on chip (SoC), system in package (SiP), multi-chip package (MCP), digital signal processor (DSP), and the like, that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

The term "device" at least in some examples refers to a physical entity embedded inside, or attached to, another physical entity in its vicinity, with capabilities to convey digital information from or to that physical entity. The term "controller" at least in some examples refers to an element or entity that has the capability to affect a physical entity, such as by changing its state or causing the physical entity to move. The term "scheduler" at least in some examples refers to an entity or element that assigns resources (e.g., processor time, network links, memory space, and/or the like) to perform tasks. The term "network scheduler" at least in some examples refers to a node, element, or entity that manages network packets in transmit and/or receive queues of one or more protocol stacks of network access circuitry (e.g., a network interface controller (NIC), baseband processor, and the like).

The term "computer node 1500" or "compute device" at least in some examples refers to an identifiable entity implementing an aspect of computing operations, whether part of a larger system, distributed collection of systems, or a standalone apparatus. In some examples, a computer node 1500 may be referred to as a "computing device", "computing system", or the like, whether in operation as a client, server, or intermediate entity. Specific implementations of a computer node 1500 may be incorporated into a server, base station, gateway, road side unit, on-premise unit, user equipment, end consuming device, appliance, or the like. For purposes of the present disclosure, the term "node" at least in some examples refers to and/or is interchangeable with the terms "device", "component", "sub-system", and/or the like.

The term "computer system" at least in some examples refers to any type interconnected electronic devices, computer devices, or components thereof. Additionally, the terms "computer system" and/or "system" at least in some examples refer to various components of a computer that are communicatively coupled with one another. Furthermore, the term "computer system" and/or "system" at least in some examples refer to multiple computer devices and/or multiple computing systems that are communicatively coupled with one another and configured to share computing and/or networking resources.

The term "server" at least in some examples refers to a computing device or system, including processing hardware and/or process space(s), an associated storage medium such as a memory device or database, and, in some instances, suitable application(s) as is known in the art. The terms "server system" and "server" may be used interchangeably herein, and these terms at least in some examples refers to one or more computing system(s) that provide access to a pool of physical and/or virtual resources. The various servers discussed herein include computer devices with rack computing architecture component(s), tower computing architecture component(s), blade computing architecture component(s), and/or the like. The servers may represent a cluster of servers, a server farm, a cloud computing service, or other grouping or pool of servers, which may be located in one or more datacenters. The servers may also be connected to, or otherwise associated with, one or more data storage devices (not shown). Moreover, the servers may include an operating system (OS) that provides executable program instructions for the general administration and operation of the individual server computer devices, and may include a computer-readable medium storing instructions that, when executed by a processor of the servers, may allow the servers to perform their intended functions. Suitable implementations for the OS and general functionality of servers are known or commercially available, and are readily implemented by persons having ordinary skill in the art.

The term "platform" at least in some examples refers to an environment in which instructions, program code, software elements, and the like can be executed or otherwise operate, and examples of such an environment include an architecture (e.g., a motherboard, a computing system, and/or the like), one or more hardware elements (e.g., embedded systems, and the like), a cluster of computer nodes, a set of distributed computer nodes or network, an operating system, a virtual machine (VM), a virtualization container, a software framework, a client application (e.g., web browser or the like) and associated application programming interfaces, a cloud computing service (e.g., platform as a service (PaaS)), or other underlying software executed with instructions, program code, software elements, and the like.

The term "architecture" at least in some examples refers to a computer architecture or a network architecture. The term "computer architecture" at least in some examples refers to a physical and logical design or arrangement of software and/or hardware elements in a computing system or platform including technology standards for interacts therebetween. The term "network architecture" at least in some examples refers to a physical and logical design or arrangement of software and/or hardware elements in a network including communication protocols, interfaces, and media transmission.

The term "user equipment" or "UE" at least in some examples refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, station, mobile station, mobile user, subscriber, user, remote station, access agent, user agent, receiver, radio equipment, reconfigurable radio equipment, reconfigurable mobile device, and the like. Furthermore, the term "user equipment" or "UE", may include any type of wireless/wired device or any computing device including a wireless communications interface. Examples of UEs, client devices, and the like, include desktop computers, workstations, laptop computers, mobile data terminals, smartphones, tablet computers, wearable devices, machine-to-machine (M2M) devices, machine-type communication (MTC) devices, Internet of Things (IoT) devices, embedded systems, sensors, autonomous vehicles, drones, robots, in-vehicle infotainment systems, instrument clusters, onboard diagnostic devices, dashtop mobile equipment, electronic engine management systems, electronic/engine control units/modules, microcontrollers, control module, server devices, network appliances, head-up display (HUD) devices, helmet-mounted display devices, augmented reality (AR) devices, virtual reality (VR) devices, mixed reality (MR) devices, and/or other like systems or devices.

The term "network element" at least in some examples refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, network access node (NAN), base station, access point (AP), RAN device, RAN node, gateway, server, network appliance, network function (NF), virtualized NF (VNF), and/or the like.

The term "network access node" or "NAN" at least in some examples refers to a network element in a radio access network (RAN) responsible for the transmission and reception of radio signals in one or more cells or coverage areas to or from a UE or station. A "network access node" or "NAN" can have an integrated antenna or may be connected to an antenna array by feeder cables. Additionally or alternatively, a "network access node" or "NAN" may include specialized digital signal processing, network function hardware, and/or compute hardware to operate as a computer node 1500. In some examples, a "network access node" or "NAN" may be split into multiple functional blocks operating in software for flexibility, cost, and performance. In some examples, a "network access node" or "NAN" may be a base station (e.g., an evolved Node B (eNB) or a next generation Node B (gNB)), an access point and/or wireless network access point, router, switch, hub, radio unit or remote radio head, Transmission Reception Point (TRxP), a gateway device (e.g., Residential Gateway, Wireline 5G Access Network, Wireline 5G Cable Access Network, Wireline BBF Access Network, and the like), network appliance, and/or some other network access hardware.

The term "edge computing" at least in some examples refers to an implementation or arrangement of distributed computing elements that move processing activities and resources (e.g., compute, storage, acceleration, and/or network resources) towards the "edge" of the network in an effort to reduce latency and increase throughput for endpoint users (client devices, user equipment, and the like). Additionally or alternatively, term "edge computing" at least in some examples refers to a set of services hosted relatively close to a client/UE's access point of attachment to a network to achieve relatively efficient service delivery through reduced end-to-end latency and/or load on the transport network. In some examples, edge computing implementations involve the offering of services and/or resources in a cloud-like systems, functions, applications, and subsystems, from one or multiple locations accessible via wireless networks.

The term "edge computer node 1500" or "edge compute device" at least in some examples refers to an identifiable entity implementing an aspect of edge computing operations, whether part of a larger system, distributed collection of systems, or a standalone apparatus. In some examples, a computer node 1500 may be referred to as a "edge node", "edge device", "edge system", whether in operation as a client, server, or intermediate entity. Additionally or alternatively, the term "edge computer node 1500" at least in some examples refers to a real-world, logical, or virtualized implementation of a compute-capable element in the form of a device, gateway, bridge, system or subsystem, component, whether operating in a server, client, endpoint, or peer mode, and whether located at an "edge" of an network or at a connected location further within the network, however, references to an "edge computing system" generally refer to a distributed architecture, organization, or collection of multiple nodes and devices, and which is organized to accomplish or offer some aspect of services or resources in an edge computing setting. The term "edge computing platform" or "edge platform" at least in some examples refers to a collection of functionality that is used to instantiate, execute, or run edge applications on a specific edge computer node 1500 (e.g., virtualisation infrastructure and/or the like), enable such edge applications to provide and/or consume edge services, and/or otherwise provide one or more edge services. The term "edge application" or "edge app" at least in some examples refers to an application that can be instantiated on, or executed by, an edge computer node 1500 within an edge computing network, system, or framework, and can potentially provide and/or consume edge computing services. The term "edge service" at least in some examples refers to a service provided via an edge computer node 1500 and/or edge platform, either by the edge platform itself and/or by an edge application.

The term "cloud computing" or "cloud" at least in some examples refers to a paradigm for enabling network access to a scalable and elastic pool of shareable computing resources with self-service provisioning and administration on-demand and without active management by users. In some examples, "cloud computing" involves providing cloud computing services (or "cloud services"), which are one or more capabilities offered via cloud computing that are invoked using a defined interface (e.g., an API or the like). In some examples, the term "cloud computing" refers to computing resources and services offered by a cloud service provider. The term "cloud service provider" or "CSP" at least in some examples refers to an organization that operates or otherwise provides cloud resources including, for example, centralized, regional, and edge data centers The term "cluster" at least in some examples refers to a set or grouping of entities as part of a cloud computing service and/or an edge computing system (or systems), in the form of physical entities (e.g., different computing systems, network elements, networks and/or network groups), logical entities (e.g., applications, functions, security constructs, virtual machines, virtualization containers, and the like), and the like. In some examples, a "cluster" is also referred to as a "group" or a "domain". The membership of cluster may be modified or affected based on conditions, parameters, criteria, configurations, functions, and/or other aspects including from dynamic or property-based membership, from network or system management scenarios, and/or the like.

The term "virtualization container", "execution container", or "container" at least in some examples refers to a partition of a computer node 1500 that provides an isolated virtualized computation environment. The term "OS container" at least in some examples refers to a virtualization container utilizing a shared Operating System (OS) kernel of its host, where the host providing the shared OS kernel can be a physical computer node 1500 or another virtualization container. Additionally or alternatively, the term "container" at least in some examples refers to a standard unit of software (or a package) including code and its relevant dependencies, and/or an abstraction at the application layer that packages code and dependencies together. Additionally or alternatively, the term "container" or "container image" at least in some examples refers to a lightweight, standalone, executable software package that includes everything needed to run an application such as, for example, code, runtime environment, system tools, system libraries, and settings.

The term "virtual machine" or "VM" at least in some examples refers to a virtualized computation environment that behaves in a same or similar manner as a physical computer and/or a server. The term "hypervisor" at least in some examples refers to a software element that partitions the underlying physical resources of a computer node 1500, creates VMs, manages resources for VMs, and isolates individual VMs from each other.

The term "software framework" at least in some examples refers to an abstraction in which software, providing generic functionality, can be selectively changed by other application-specific code and/or software element(s). Additionally or alternatively, the term "software framework" at least in some examples refers to a standard, universal, and/or reusable software environment that provides particular functionality as part of a larger software platform to facilitate the development of software applications, products, solutions, and/or services. In some examples, software frameworks include support programs, compilers, code libraries, toolsets, APIs, one or more components, and/or other elements/entities that can be used to develop a system, subsystem, engine, components, applications, and/or other elements/entities. The term "software component" at least in some examples refers to a software package, web service, web resource, module, application, algorithm, and/or another collection of elements, or combination(s) therefore, that encapsulates a set of related functions (or data).

The term "software engine" at least in some examples refers to a component of a software system, subsystem, component, functional unit, module or other collection of software elements, functions, and the like. In some examples, the term "software engine" can be used interchangeably with the terms "software core engine" or simply "engine". The term "access technology" at least in some examples refers to the technology used for the underlying physical connection to a communication network. The term "radio technology" at least in some examples refers to technology for wireless transmission and/or reception of electromagnetic radiation for information transfer. The term "radio access technology" or "RAT" at least in some examples refers to the technology used for the underlying physical connection to a radio based communication network. Examples of access technologies include wireless access technologies/RATs, wireline, wireline-cable, wireline broadband forum (wireline-BBF), Ethernet (see e.g., IEEE Standard for Ethernet, IEEE Std 802.3-2018 (31 Sep. 2018) ("[IEEE802.3]")) and variants thereof, fiber optics networks (e.g., ITU-T G.651, ITU-T G.652, Optical Transport Network (OTN), Synchronous optical networking (SONET) and synchronous digital hierarchy (SDH), and the like), digital subscriber line (DSL) and variants thereof, Data Over Cable Service Interface Specification (DOCSIS) technologies, hybrid fiber-coaxial (HFC) technologies, and/or the like. Examples of RATs (or RAT types) and/or communications protocols include Advanced Mobile Phone System (AMPS) technologies (e.g., Digital AMPS (D-AMPS), Total Access Communication System (TACS) and variants thereof, such as Extended TACS (ETACS), and the like); Global System for Mobile Communications (GSM) technologies (e.g., Circuit Switched Data (CSD), High-Speed CSD (HSCSD), General Packet Radio Service (GPRS), and Enhanced Data Rates for GSM Evolution (EDGE)); Third Generation Partnership Project (3GPP) technologies (e.g., Universal Mobile Telecommunications System (UMTS) and variants thereof (e.g., UMTS Terrestrial Radio Access (UTRA), Wideband Code Division Multiple Access (W-CDMA), Freedom of Multimedia Access (FOMA), Time Division-Code Division Multiple Access (TD-CDMA), Time Division-Synchronous Code Division Multiple Access (TD-SCDMA), and the like), Generic Access Network (GAN)/Unlicensed Mobile Access (UMA), High Speed Packet Access (HSPA) and variants thereof (e.g., HSPA Plus (HSPA+)), Long Term Evolution (LTE) and variants thereof (e.g., LTE-Advanced (LTE-A), Evolved UTRA (E-UTRA), LTE Extra, LTE-A Pro, LTE LAA, MuLTEfire, and the like), Fifth Generation (5G) or New Radio (NR), narrowband IoT (NB-IoT), 3GPP Proximity Services (ProSe), and/or the like); ETSI RATs (e.g., High Performance Radio Metropolitan Area Network (HiperMAN), Intelligent Transport Systems (ITS) (e.g., ITS-G5, ITS-G5B, ITS-G5C, and the like), and the like); Institute of Electrical and Electronics Engineers (IEEE) technologies and/or WiFi (e.g., IEEE Standard for Local and Metropolitan Area Networks: Overview and Architecture, IEEE Std 802-2014, pp. 1-74 (30 Jun. 2014) ("[IEEE802]"), IEEE Standard for Information Technology—Telecommunications and Information Exchange between Systems-Local and Metropolitan Area Networks—Specific Requirements-Part 11: Wireless LAN Medium Access Control (MAC) and Physical Layer (PHY) Specifications, IEEE Std 802.11-2020, pp. 1-4379 (26 Feb. 2021) ("[IEEE80211]"), IEEE 802.15 technologies (e.g., IEEE Standard for Low-Rate Wireless Networks, IEEE Std 802.15.4-2020, pp. 1-800 (23 Jul. 2020) ("[IEEE802154]") and variants thereof (e.g., ZigBee, WirelessHART, MiWi, ISA100.11a, Thread, IPv6 over Low power WPAN (6LoWPAN), and the like), IEEE Standard for Local and metropolitan area networks-Part 15.6: Wireless Body Area Networks, IEEE Std 802.15.6-2012, pp. 1-271 (29 Feb. 2012), and the like), WLAN V2X RATs (e.g., IEEE Standard for Information technology—Local and metropolitan area networks—Specific requirements—Part 11: Wireless LAN Medium Access Control (MAC) and Physical Layer (PHY) Specifications Amendment 6: Wireless Access in Vehicular Environments, IEEE Std 802.11p-2010, pp. 1-51 (15 Jul. 2010) ("[IEEE80211p]") (which is now part of [IEEE80211]), IEEE Guide for Wireless Access in Vehicular Environments (WAVE) Architecture, IEEE Standards Association, IEEE 1609.0-2019 (10 Apr. 2019) ("[IEEE16090]"), IEEE 802.11bd, Dedicated Short Range Communications (DSRC), and/or the like), Worldwide Interoperability for Microwave Access (WiMAX) (e.g., IEEE Standard for Air Interface for Broadband Wireless Access Systems, IEEE Std 802.16-2017, pp. 1-2726 (2 Mar. 2018) ("[WiMAX]")), Mobile Broadband Wireless Access (MBWA)/iBurst (e.g., IEEE 802.20 and variants thereof), Wireless Gigabit Alliance (WiGig) standards (e.g., IEEE 802.11ad, IEEE 802.11ay, and the like), and so forth); Integrated Digital Enhanced Network (iDEN) and variants thereof (e.g., Wideband Integrated Digital Enhanced Network (WiDEN)); millimeter wave (mmWave) technologies/standards (e.g., wireless systems operating at 10-300 GHz and above 3GPP 5G); short-range and/or wireless personal area network (WPAN) technologies/standards (e.g., IEEE 802.15 technologies (e.g., as mentioned previously); Bluetooth and variants thereof (e.g., Bluetooth 5.3, Bluetooth Low Energy (BLE), and the like), WiFi-direct, Miracast, ANT/ANT+, Z-Wave, Universal Plug and Play (UPnP), low power Wide Area Networks (LPWANs), Long Range Wide Area Network (LoRA or LoRaWAN™), and the like); optical and/or visible light communication (VLC) technologies/standards (e.g., IEEE Standard for Local and metropolitan area networks—Part 15.7: Short-Range Optical Wireless Communications, IEEE Std 802.15.7-2018, pp. 1-407 (23 Apr. 2019), and the like); Sigfox; Mobitex; 3GPP2 technologies (e.g., cdmaOne (2G), Code Division Multiple Access 2000 (CDMA 2000), and Evolution-Data Optimized or Evolution-Data Only (EV-DO); Push-to-talk (PTT), Mobile Telephone System (MTS) and variants thereof (e.g., Improved MTS (IMTS), Advanced MTS (AMTS), and the like); Personal Digital Cellular (PDC); Personal Handy-phone System (PHS), Cellular Digital Packet Data (CDPD); Cellular Digital Packet Data (CDPD); DataTAC; Digital Enhanced Cordless Telecommunications (DECT) and variants thereof (e.g., DECT Ultra Low Energy (DECT ULE), DECT-2020, DECT-5G, and the like); Ultra High Frequency (UHF) communication; Very High Frequency (VHF) communication; and/or any other suitable RAT or protocol. In addition to the aforementioned RATs/standards, any number of satellite uplink technologies may be used for purposes of the present disclosure including, for example, radios compliant with standards issued by the International Telecommunication Union (ITU), or the ETSI, among others. The examples provided herein are thus understood as being applicable to various other communication technologies, both existing and not yet formulated.

The term "protocol" at least in some examples refers to a predefined procedure or method of performing one or more operations. Additionally or alternatively, the term "protocol" at least in some examples refers to a common means for unrelated objects to communicate with each other (sometimes also called interfaces). The term "communication protocol" at least in some examples refers to a set of standardized rules or instructions implemented by a communication device and/or system to communicate with other devices and/or systems, including instructions for packetizing/depacketizing data, modulating/demodulating signals, implementation of protocols stacks, and/or the like. In various implementations, a "protocol" and/or a "communication protocol" may be represented using a protocol stack, a finite state machine (FSM), and/or any other suitable data structure.

The term "application layer" at least in some examples refers to an abstraction layer that specifies shared communications protocols and interfaces used by hosts in a communications network. Additionally or alternatively, the term "application layer" at least in some examples refers to an abstraction layer that interacts with software applications that implement a communicating component, and may include identifying communication partners, determining resource availability, and synchronizing communication. Examples of application layer protocols include Hypertext Transfer Protocol (HTTP), HTTP secure (HTTPs), Andrew File System (AFS), File Transfer Protocol (FTP), Dynamic Host Configuration Protocol (DHCP), Internet Message Access Protocol (IMAP), Lightweight Directory Access Protocol (LDAP), MQTT (MQ Telemetry Transport), Remote Authentication Dial-In User Service (RADIUS), Diameter protocol, Extensible Authentication Protocol (EAP), RDMA over Converged Ethernet version 2 (RoCEv2), Real-time Transport Protocol (RTP), RTP Control Protocol (RTCP), Real Time Streaming Protocol (RTSP), Secure RTP (SRTP), SBMV Protocol, Skinny Client Control Protocol (SCCP), Session Initiation Protocol (SIP), Session Description Protocol (SDP), Simple Mail Transfer Protocol (SMTP), Simple Network Management Protocol (SNMP), Simple Service Discovery Protocol (SSDP), Small Computer System Interface (SCSI), Internet SCSI (iSCSI), iSCSI Extensions for RDMA (iSER), Transport Layer Security (TLS), voice over IP (VOIP), Virtual Private Network (VPN), Wireless Application Protocol (WAP), WebSockets, Web-based secure shell (SSH), Extensible Messaging and Presence Protocol (XMPP), and/or the like.

The term "session layer" at least in some examples refers to an abstraction layer that controls dialogues and/or connections between entities or elements, and may include establishing, managing and terminating the connections between the entities or elements. The term "transport layer" at least in some examples refers to a protocol layer that provides end-to-end (e2e) communication services such as, for example, connection-oriented communication, reliability, flow control, and multiplexing. Examples of transport layer protocols include datagram congestion control protocol (DCCP), fibre channel protocol (FBC), Generic Routing Encapsulation (GRE), GPRS Tunneling (GTP), Micro Transport Protocol (μTP), Multipath TCP (MPTCP), MultiPath QUIC (MPQUIC), Multipath UDP (MPUDP), Quick UDP Internet Connections (QUIC), Remote Direct Memory Access (RDMA), Resource Reservation Protocol (RSVP), Stream Control Transmission Protocol (SCTP), transmission control protocol (TCP), user datagram protocol (UDP), and/or the like.

The term "network layer" at least in some examples refers to a protocol layer that includes means for transferring network packets from a source to a destination via one or more networks. Additionally or alternatively, the term "network layer" at least in some examples refers to a protocol layer that is responsible for packet forwarding and/or routing through intermediary nodes. Additionally or alternatively, the term "network layer" or "internet layer" at least in some examples refers to a protocol layer that includes interworking methods, protocols, and specifications that are used to transport network packets across a network. As examples, the network layer protocols include internet protocol (IP), IP security (IPsec), Internet Control Message Protocol (ICMP), Internet Group Management Protocol (IGMP), Open Shortest Path First protocol (OSPF), Routing Information Protocol (RIP), RDMA over Converged Ethernet version 2 (RoCEv2), Subnetwork Access Protocol (SNAP), and/or some other internet or network protocol layer.

The term "link layer" or "data link layer" at least in some examples refers to a protocol layer that transfers data between nodes on a network segment across a physical layer. Examples of link layer protocols include logical link control (LLC), medium access control (MAC), Ethernet, RDMA over Converged Ethernet version 1 (RoCEv1), and/or the like. The term "medium access control protocol", "MAC protocol", or "MAC" at least in some examples refers to a protocol that governs access to the transmission medium in a network, to enable the exchange of data between stations in a network. Additionally or alternatively, the term "medium access control layer", "MAC layer", or "MAC" at least in some examples refers to a protocol layer or sublayer that performs functions to provide frame-based, connectionless-mode (e.g., datagram style) data transfer between stations or devices. (see e.g., [IEEE802], 3GPP TS 38.321 v17.2.0 (2022-10-01) and 3GPP TS 36.321 v17.2.0 (2022 Oct. 3)). The term "physical layer", "PHY layer", or "PHY" at least in some examples refers to a protocol layer or sublayer that includes capabilities to transmit and receive modulated signals for communicating in a communications network (see e.g., [IEEE802], 3GPP TS 38.201 v17.0.0 (2022-01-05) and 3GPP TS 36.201 v17.0.0 (2022 Mar. 31)).

The term "channel" at least in some examples refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" at least in some examples refers to a connection between two devices through a RAT for the purpose of transmitting and receiving information.

The term "local area network" or "LAN" at least in some examples refers to a network of devices, whether indoors or outdoors, covering a limited area or a relatively small geographic area (e.g., within a building or a campus). The term "wireless local area network", "wireless LAN", or "WLAN" at least in some examples refers to a LAN that involves wireless communications. The term "wide area network" or "WAN" at least in some examples refers to a network of devices that extends over a relatively large geographic area (e.g., a telecommunications network). Additionally or alternatively, the term "wide area network" or "WAN" at least in some examples refers to a computer network spanning regions, countries, or even an entire planet The term "compute resource" or simply "resource" at least in some examples refers to any physical or virtual component, or usage of such components, of limited availability within a computer system or network. Examples of computing resources include usage/access to, for a period of time, servers, processor(s), storage equipment, memory devices, memory areas, networks, electrical power, input/output (peripheral) devices, mechanical devices, network connections (e.g., channels/links, ports, network sockets, and/or the like), operating systems, virtual machines (VMs), software/applications, computer files, and/or the like. A "hardware resource" at least in some examples refers to compute, storage, and/or network resources provided by physical hardware element(s). A "virtualized resource" at least in some examples refers to compute, storage, and/or network resources provided by virtualization infrastructure to an application, device, system, and/or the like The term "network resource" or "communication resource" at least in some examples refers to resources that are accessible by computer devices/systems via a communications network. The term "system resources" at least in some examples refers to any kind of shared entities to provide services, and may include computing and/or network resources. System resources may be considered as a set of coherent functions, network data objects or services, accessible through a server where such system resources reside on a single host or multiple hosts and are clearly identifiable.

The term "service" at least in some examples refers to the provision of a discrete function within a system and/or environment. Additionally or alternatively, the term "service" at least in some examples refers to a functionality or a set of functionalities that can be reused. The term "microservice" at least in some examples refers to one or more processes that communicate over a network to fulfil a goal using technology-agnostic protocols (e.g., HTTP or the like). Additionally or alternatively, the term "microservice" at least in some examples refers to services that are relatively small in size, messaging-enabled, bounded by contexts, autonomously developed, independently deployable, decentralized, and/or built and released with automated processes. Additionally or alternatively, the term "microservice" at least in some examples refers to a self-contained piece of functionality with clear interfaces, and may implement a layered architecture through its own internal components. Additionally or alternatively, the term "microservice architecture" at least in some examples refers to a variant of the service-oriented architecture (SOA) structural style wherein applications are arranged as a collection of loosely-coupled services (e.g., fine-grained services) and may use lightweight protocols.

The term "session" at least in some examples refers to a temporary and interactive information interchange between two or more communicating devices, two or more application instances, between a computer and user, and/or between any two or more entities or elements. Additionally or alternatively, the term "session" at least in some examples refers to a connectivity service or other service that provides or enables the exchange of data between two entities or elements. The term "network session" at least in some examples refers to a session between two or more communicating devices over a network. The term "web session" at least in some examples refers to session between two or more communicating devices over the Internet or some other network. The term "session identifier," "session ID," or "session token" at least in some examples refers to a piece of data that is used in network communications to identify a session and/or a series of message exchanges.

The term "identifier" at least in some examples refers to a value, or a set of values, that uniquely identify an identity in a certain scope. Additionally or alternatively, the term "identifier" at least in some examples refers to a sequence of characters that identifies or otherwise indicates the identity of a unique object, element, or entity, or a unique class of objects, elements, or entities. Additionally or alternatively, the term "identifier" at least in some examples refers to a sequence of characters used to identify or refer to an application, program, session, object, element, entity, variable, set of data, and/or the like. The "sequence of characters" mentioned previously at least in some examples refers to one or more names, labels, words, numbers, letters, symbols, and/or any combination thereof. Additionally or alternatively, the term "identifier" at least in some examples refers to a name, address, label, distinguishing index, and/or attribute. Additionally or alternatively, the term "identifier" at least in some examples refers to an instance of identification. The term "persistent identifier" at least in some examples refers to an identifier that is reused by a device or by another device associated with the same person or group of persons for an indefinite period. The term "application identifier", "application ID", or "app ID" at least in some examples refers to an identifier that can be mapped to a specific application, application instance, or application instance. In the context of 3GPP 5G/NR, an "application identifier" at least in some examples refers to an identifier that can be mapped to a specific application traffic detection rule. The term "endpoint address" at least in some examples refers to an address used to determine the host/authority part of a target URI, where the target URI is used to access an NF service (e.g., to invoke service operations) of an NF service producer or for notifications to an NF service consumer.

The term "network address" at least in some examples refers to an identifier for a node or host in a computer network, and may be a unique identifier across a network and/or may be unique to a locally administered portion of the network. The term "port" in the context of computer networks, at least in some examples refers to a communication endpoint, a virtual data connection between two or more entities, and/or a virtual point where network connections start and end. Additionally or alternatively, a "port" at least in some examples is associated with a specific process or service. Examples of identifiers and/or network addresses can include am application identifier, Bluetooth hardware device address (BD_ADDR), a cellular network address (e.g., Access Point Name (APN), AMF identifier (ID), AF-Service-Identifier, Edge Application Server (EAS) ID, Data Network Access Identifier (DNAI), Data Network Name (DNN), EPS Bearer Identity (EBI), Equipment Identity Register (EIR) and/or 5G-EIR, Extended Unique Identifier (EUI), Group ID for Network Selection (GIN), Generic Public Subscription Identifier (GPSI), Globally Unique AMF Identifier (GUAMI), Globally Unique Temporary Identifier (GUTI) and/or 5G-GUTI, Radio Network Temporary Identifier (RNTI) and variants thereof (see e.g., clause 8.1 of 3GPP TS 38.300 v17.2.0 (2022 Sep. 29) ("[TS38300] ")), International Mobile Equipment Identity (IMEI), IMEI Type Allocation Code (IMEA/TAC), International Mobile Subscriber Identity (IMSI), IMSI software version (IMSISV), permanent equipment identifier (PEI), Local Area Data Network (LADN) DNN, Mobile Subscriber Identification Number (MSIN), Mobile Subscriber/Station ISDN Number (MSISDN), Network identifier (NID), Network Slice Instance (NSI) ID, Permanent Equipment Identifier (PEI), Public Land Mobile Network (PLMN) ID, QoS Flow ID (QFI) and/or 5G QoS Identifier (5Q1), RAN ID, Routing Indicator, SMS Function (SMSF) ID, Stand-alone Non-Public Network (SNPN) ID, Subscription Concealed Identifier (SUCI), Subscription Permanent Identifier (SUPI), Temporary Mobile Subscriber Identity (TMSI) and variants thereof, UE Access Category and Identity, and/or other cellular network related identifiers), Closed Access Group Identifier (CAG-ID), driver's license number, Global Trade Item Number (GTIN) (e.g., Australian Product Number (APN), EPC, European Article Number (EAN), Universal Product Code (UPC), and the like), email address, Enterprise Application Server (EAS) ID, an endpoint address, an Electronic Product Code (EPC) as defined by the EPCglobal Tag Data Standard, Fully Qualified Domain Name (FQDN), flow ID, flow hash, hash value, blockchain hash value, index, internet protocol (IP) address in an IP network (e.g., IP version 4 (IPv4), IP version 6 (IPv6), and the like), an internet packet exchange (IPX) address, LAN ID, a MAC address, personal area network (PAN) ID, port number (e.g., TCP port number, UDP port number, and the like), price lookup code (PLC), product key, QUIC connection ID, RFID tag, sequence number, service set identifier (SSID) and variants thereof, screen name, serial number, stock keeping unit (SKU), socket address, social security number (SSN), telephone number (e.g., in a public switched telephone network (PTSN)), unique identifier (UID) (e.g., including globally UID (GUID), universally unique identifier (UUID) (e.g., as specified in ISO/IEC 11578:1996), and the like), a Universal Resource Locator (URL) and/or Universal Resource Identifier (URI), user name (e.g., ID for logging into a service provider platform, such as a social network and/or some other service), vehicle identification number (VIN), Virtual LAN (VLAN) ID, X.21 address, an X.25 address, Zigbee® ID, Zigbee® Device Network ID, and/or any other suitable network address and components thereof.

The term "application" at least in some examples refers to a computer program designed to carry out a specific task other than one relating to the operation of the computer itself. Additionally or alternatively, term "application" at least in some examples refers to a complete and deployable package, environment to achieve a certain function in an operational environment. The term "process" at least in some examples refers to an instance of a computer program that is being executed by one or more threads. In some implementations, a process may be made up of multiple threads of execution that execute instructions concurrently. The term "algorithm" at least in some examples refers to an unambiguous specification of how to solve a problem or a class of problems by performing calculations, input/output operations, data processing, automated reasoning tasks, and/or the like.

The term "application programming interface" or "API" at least in some examples refers to a set of subroutine definitions, communication protocols, and tools for building software. Additionally or alternatively, the term "application programming interface" or "API" at least in some examples refers to a set of clearly defined methods of communication among various components. In some examples, an API may be defined or otherwise used for a web-based system, operating system, database system, computer hardware, software library, and/or the like.

The term "data processing" or "processing" at least in some examples refers to any operation or set of operations which is performed on data or on sets of data, whether or not by automated means, such as collection, recording, writing, organization, structuring, storing, adaptation, alteration, retrieval, consultation, use, disclosure by transmission, dissemination or otherwise making available, alignment or combination, restriction, erasure and/or destruction.

The term "data preprocessing" or "data pre-processing" at least in some examples refers to any operation or set of operations performed prior to data processing including, for example, data manipulation, dropping of data items/points, and/or the like. The term "data pipeline" or "pipeline" at least in some examples refers to a set of data processing elements (or data processors) connected in series and/or in parallel, where the output of one data processing element is the input of one or more other data processing elements in the pipeline; the elements of a pipeline may be executed in parallel or in time-sliced fashion and/or some amount of buffer storage can be inserted between elements.

The term "software engine" at least in some examples refers to a component of a software system, subsystem, component, functional unit, module or other collection of software elements, functions, and the like. In some examples, the term "software engine" can be used interchangeably with the terms "software core engine" or simply "engine". The term "software framework" at least in some examples refers to an abstraction in which software, providing generic functionality, can be selectively changed by other application-specific code and/or software element(s). Additionally or alternatively, the term "software framework" at least in some examples refers to a standard, universal, and/or reusable software environment that provides particular functionality as part of a larger software platform to facilitate the development of software applications, products, solutions, and/or services. In some examples, software frameworks include support programs, compilers, code libraries, toolsets, APIs, one or more components, and/or other elements/entities that can be used to develop a system, subsystem, engine, components, applications, and/or other elements/entities. The term "software component" at least in some examples refers to a software package, web service, web resource, module, application, algorithm, and/or another collection of elements, or combination(s) therefore, that encapsulates a set of related functions (or data).

The term "filter" at least in some examples refers to computer program, subroutine, or other software element capable of processing a stream, data flow, or other collection of data, and producing another stream. In some implementations, multiple filters can be strung together or otherwise connected to form a pipeline.

The terms "instantiate," "instantiation," and the like at least in some examples refers to the creation of an instance. An "instance" also at least in some examples refers to a concrete occurrence of an object, which may occur, for example, during execution of program code.

The term "operating system" or "OS" at least in some examples refers to system software that manages hardware resources, software resources, and provides common services for computer programs. The term "kernel" at least in some examples refers to a portion of OS code that is resident in memory and facilitates interactions between hardware and software components.

The term "packet processor" at least in some examples refers to software and/or hardware element(s) that transform a stream of input packets into output packets (or transforms a stream of input data into output data); examples of the transformations include adding, removing, and modifying fields in a packet header, trailer, and/or payload.

The term "software agent" at least in some examples refers to a computer program that acts for a user or other program in a relationship of agency.

The term "use case" at least in some examples refers to a description of a system from a user's perspective. Use cases sometimes treat a system as a black box, and the interactions with the system, including system responses, are perceived as from outside the system. Use cases typically avoid technical jargon, preferring instead the language of the end user or domain expert. The term "user" at least in some examples refers to an abstract representation of any entity issuing commands, requests, and/or data to a computer node 1500 or system, and/or otherwise consumes or uses services.

The terms "configuration", "policy", "ruleset", and/or "operational parameters", at least in some examples refer to a machine-readable information object that contains instructions, conditions, parameters, and/or criteria that are relevant to a device, system, or other element/entity. The term "data set" or "dataset" at least in some examples refers to a collection of data; a "data set" or "dataset" may be formed or arranged in any type of data structure. In some examples, one or more characteristics can define or influence the structure and/or properties of a dataset such as the number and types of attributes and/or variables, and various statistical measures (e.g., standard deviation, kurtosis, and/or the like). The term "data structure" at least in some examples refers to a data organization, management, and/or storage format. Additionally or alternatively, the term "data structure" at least in some examples refers to a collection of data values, the relationships among those data values, and/or the functions, operations, tasks, and the like, that can be applied to the data. Examples of data structures include primitives (e.g., Boolean, character, floating-point numbers, fixed-point numbers, integers, reference or pointers, enumerated type, and/or the like), composites (e.g., arrays, records, strings, union, tagged union, and/or the like), abstract data types (e.g., data container, list, tuple, associative array, map, dictionary, set (or dataset), multiset or bag, stack, queue, graph (e.g., tree, heap, and the like), and/or the like), routing table, symbol table, quad-edge, blockchain, purely-functional data structures (e.g., stack, queue, (multi) set, random access list, hash consing, zipper data structure, and/or the like).

The term "accuracy" at least in some examples refers to the closeness of one or more measurements to a specific value.

The term "activation function" at least in some examples refers to a function of a node in a neural network that defines the output of that node given an input or set of inputs. Examples of activation functions that can be used to practice aspects of the present disclosure include folding (fold) functions (e.g., mean, maximum, minimum, reduce, accumulate, aggregate, compress, injection, and/or the like), radial functions (e.g., Gaussian, multiquadratics, inverse multiquadratics, polyharmonic splines, and/or the like), ridge functions (e.g., multivariate functions acting on a linear combination of the input variables, such as linear activation, Heaviside activation (also referred to as "Heaviside step function"), logistic activation, sigmoid activation, soft step, rectified linear units (ReLU) and variants thereof (e.g., leaky ReLU, parametric ReLU (PRELU), exponential linear unit (ELU), scaled ELU (SELU), Gaussian error linear unit (GELU), sigmoid linear unit (SiLU), metallic mean function, mish, softplus), and/or the like), identity function, binary step function, non-linear activation, hyperbolic tangent, maxout, softmax, transfer functions (e.g., linear time-invariant systems, imaging-based transfer functions, activation-based attention transfer functions, gradient-based attention transfer functions, and/or the like), and/or any other suitable activation functions, or combination(s) thereof.

The term "artificial intelligence" or "AI" at least in some examples refers to any intelligence demonstrated by machines, in contrast to the natural intelligence displayed by humans and other animals. Additionally or alternatively, the term "artificial intelligence" or "AI" at least in some examples refers to the study of "intelligent agents" and/or any device that perceives its environment and takes actions that maximize its chance of successfully achieving a goal.

The terms "artificial neural network", "neural network", or "NN" refer to an ML technique comprising a collection of connected artificial neurons or nodes that (loosely) model neurons in a biological brain that can transmit signals to other arterial neurons or nodes, where connections (or edges) between the artificial neurons or nodes are (loosely) modeled on synapses of a biological brain. The artificial neurons and edges typically have a weight that adjusts as learning proceeds. The weight increases or decreases the strength of the signal at a connection. Neurons may have a threshold such that a signal is sent only if the aggregate signal crosses that threshold. The artificial neurons can be aggregated or grouped into one or more layers where different layers may perform different transformations on their inputs. Signals travel from the first layer (the input layer), to the last layer (the output layer), possibly after traversing the layers multiple times. NNs are usually used for supervised learning, but can be used for unsupervised learning as well. Examples of NNs include deep NN (DNN), feed forward NN (FFN), deep FNN (DFF), convolutional NN (CNN), deep CNN (DCN), deconvolutional NN (DNN), a deep belief NN, a perception NN, recurrent NN (RNN) (e.g., including Long Short Term Memory (LSTM) algorithm, gated recurrent unit (GRU), echo state network (ESN), and the like), spiking NN (SNN), deep stacking network (DSN), Markov chain, perception NN, generative adversarial network (GAN), transformers, stochastic NNs (e.g., Bayesian Network (BN), Bayesian belief network (BBN), a Bayesian NN (BNN), Deep BNN (DBNN), Dynamic BN (DBN), probabilistic graphical model (PGM), Boltzmann machine, restricted Boltzmann machine (RBM), Hopfield network or Hopfield NN, convolutional deep belief network (CDBN), and the like), Linear Dynamical System (LDS), Switching LDS (SLDS), Optical NNs (ONNs), an NN for reinforcement learning (RL) and/or deep RL (DRL), and/or the like.

The term "attention" in the context of machine learning and/or neural networks, at least in some examples refers to a technique that mimics cognitive attention, which enhances important parts of a dataset where the important parts of the dataset may be determined using training data by gradient descent. The term "dot-product attention" at least in some examples refers to an attention technique that uses the dot product between vectors to determine attention. The term "multi-head attention" at least in some examples refers to an attention technique that combines several different attention mechanisms to direct the overall attention of a network or subnetwork. The term "attention model" or "attention mechanism" at least in some examples refers to input processing techniques for neural networks that allow the neural network to focus on specific aspects of a complex input, one at a time until the entire dataset is categorized. The goal is to break down complicated tasks into smaller areas of attention that are processed sequentially. Similar to how the human mind solves a new problem by dividing it into simpler tasks and solving them one by one. The term "attention network" at least in some examples refers to an artificial neural networks used for attention in machine learning. The term "self-attention" at least in some examples refers to an attention mechanism relating different positions of a single sequence in order to compute a representation of the sequence. Additionally or alternatively, the term "self-attention" at least in some examples refers to an attention mechanism applied to a single context instead of across multiple contexts wherein queries, keys, and values are extracted from the same context.

The term "backpropagation" at least in some examples refers to a method used in NNs to calculate a gradient that is needed in the calculation of weights to be used in the NN; "backpropagation" is shorthand for "the backward propagation of errors." Additionally or alternatively, the term "backpropagation" at least in some examples refers to a method of calculating the gradient of neural network parameters. Additionally or alternatively, the term "backpropagation" or "back pass" at least in some examples refers to a method of traversing a neural network in reverse order, from the output to the input layer.

The term "Bayesian optimization" at least in some examples refers to a sequential design strategy for global optimization of black-box functions that does not assume any functional forms. Additionally or alternatively, the term "Bayesian optimization" at least in some examples refers to an optimization technique based upon the minimization of an expected deviation from an extremum. At least in some examples, Bayesian optimization minimizes an objective function by building a probability model based on past evaluation results of the objective.

The term "binary classifier" at least in some examples refers to a function which can decide whether or not an input, represented by a vector of numbers, belongs to some specific class. The term "classification" at least in some examples refers to an ML technique for determining the classes to which various data points belong. Additionally or alternatively, the term "classification" at least in some examples refers to a process that categorizes data into distinct classes. The term "class" or "classes" at least—in some examples refers to categories, and are sometimes called "targets" or "labels." In some examples, classification is used when the outputs are restricted to a limited set of quantifiable properties. In some examples, classification algorithms describe an individual (data) instance whose category is to be predicted using a feature vector. As an example, when the instance includes a collection (corpus) of text, each feature in a feature vector may be the frequency that specific words appear in the corpus of text. In ML classification, labels are assigned to instances, and models are trained to correctly predict the pre-assigned labels of from the training examples. ML algorithms for classification may be referred to as a "classifier." Examples of classifiers include linear classifiers, k-nearest neighbor (kNN), decision trees, random forests, support vector machines (SVMs), Bayesian classifiers, convolutional neural networks (CNNs), among many others (note that some of these algorithms can be used for other ML tasks as well).

The term "computational graph" at least in some examples refers to a data structure that describes how an output is produced from one or more inputs!

The term "converge" or "convergence" at least in some examples refers to the stable point found at the end of a sequence of solutions via an iterative optimization algorithm. Additionally or alternatively, the term "converge" or "convergence" at least in some examples refers to the output of a function or algorithm getting closer to a specific value over multiple iterations of the function or algorithm.

The term "convolution" at least in some examples refers to a convolutional operation or a convolutional layer of a CNN. The term "convolutional filter" at least in some examples refers to a matrix having the same rank as an input matrix, but a smaller shape. In machine learning, a convolutional filter is mixed with an input matrix in order to train weights. The term "convolutional layer" at least in some examples refers to a layer of a DNN in which a convolutional filter passes along an input matrix (e.g., a CNN). Additionally or alternatively, the term "convolutional layer" at least in some examples refers to a layer that includes a series of convolutional operations, each acting on a different slice of an input matrix. The term "convolutional neural network" or "CNN" at least in some examples refers to a neural network including at least one convolutional layer. Additionally or alternatively, the term "convolutional neural network" or "CNN" at least in some examples refers to a DNN designed to process structured arrays of data such as images. The term "convolutional operation" at least in some examples refers to a mathematical operation on two functions (e.g., $f$ and g) that produces a third function ($f$*g) that expresses how the shape of one is modified by the other where the term "convolution" may refer to both the result function and to the process of computing it. Additionally or alternatively, term "convolutional" at least in some examples refers to the integral of the product of the two functions after one is reversed and shifted, where the integral is evaluated for all values of shift, producing the convolution function. Additionally or alternatively, term "convolutional" at least in some examples refers to a two-step mathematical operation includes element-wise multiplication of the convolutional filter and a slice of an input matrix (the slice of the input matrix has the same rank and size as the convolutional filter); and (2) summation of all the values in the resulting product matrix.

The term "covariance" at least in some examples refers to a measure of the joint variability of two random variables, wherein the covariance is positive if the greater values of one variable mainly correspond with the greater values of the other variable (and the same holds for the lesser values such that the variables tend to show similar behavior), and the covariance is negative when the greater values of one variable mainly correspond to the lesser values of the other.

The term "energy-based model" or "EBM" at least in some examples refers to a generative model (GM) that learns the characteristics of a target dataset and generates a similar but larger dataset. Additionally or alternatively, term "energy-based model" or "EBM" at least in some examples refers to a generative model (GM) that detects the latent variables of a dataset and generates new datasets with a similar distribution. Additionally or alternatively, term "energy-based model" or "EBM" at least in some examples refers to an ML model that discovers data dependencies by applying a measure of compatibility (e.g., a scalar energy) to each configuration of variables, wherein for a model to make a prediction or decision (inference) it needs to set the value of observed variables to 1 and finding values of the remaining variables that minimize that "energy" level. Example applications for EBMs include natural language processing (NLP), robotics, and computer vision. The term "energy function" at least in some examples refers to a function that assigns low energies to the correct values of the remaining variables, and higher energies to the incorrect values. In some examples, a cost function or loss function, which is minimized during training, is used to measure the quality of an energy function. The term "energy-based generative neural network" or "EBGNN" at least in some examples refers to a class of generative models, which aim to learn explicit probability distributions of data in the form of EBMs whose energy functions are parameterized by deep neural networks (DNNs). In some examples, EBGNNs is trained in a generative manner using Markov chain Monte Carlo (MCMC)-based maximum likelihood estimation, and the learning process follows an analysis-by-synthesis scheme wherein, within each learning iteration, the algorithm samples the synthesized examples from the current model by a gradient-based MCMC method (e.g., Langevin dynamics) and then updates the model parameters based on the difference between the training examples and the synthesized ones.

The term "ensemble averaging" at least in some examples refers to the process of creating multiple models and combining them to produce a desired output, as opposed to creating just one model. The term "ensemble learning" or "ensemble method" at least in some examples refers to using multiple learning algorithms to obtain better predictive performance than could be obtained from any of the constituent learning algorithms alone.

The term "epoch" at least in some examples refers to one cycle through a full training dataset. Additionally or alternatively, the term "epoch" at least in some examples refers to a full training pass over an entire training dataset such that each training example has been seen once; here, an epoch represents N/batch size training iterations, where N is the total number of examples.

The term "event", in probability theory, at least in some examples refers to a set of outcomes of an experiment (e.g., a subset of a sample space) to which a probability is assigned. Additionally or alternatively, the term "event" at least in some examples refers to a software message indicating that something has happened. Additionally or alternatively, the term "event" at least in some examples refers to an object in time, or an instantiation of a property in an object. Additionally or alternatively, the term "event" at least in some examples refers to a point in space at an instant in time (e.g., a location in space-time). Additionally or alternatively, the term "event" at least in some examples refers to a notable occurrence at a particular point in time.

The term "experiment" in probability theory, at least in some examples refers to any procedure that can be repeated and has a well-defined set of outcomes, known as a sample space.

The term "F score" or "F measure" at least in some examples refers to a measure of a test's accuracy that may be calculated from the precision and recall of a test or model. The term "F1 score" at least in some examples refers to the harmonic mean of the precision and recall, and the term "FB score" at least in some examples refers to an F-score having additional weights that emphasize or value one of precision or recall more than the other.

The term "feature" at least in some examples refers to an individual measureable property, quantifiable property, or characteristic of a phenomenon being observed. Additionally or alternatively, the term "feature" at least in some examples refers to an input variable used in making predictions. In some examples, features may be represented using numbers/numerals (e.g., integers, float-point values, and the like), characters, strings, variables, ordinals, real-values, categories, vectors, tensors, and/or any other suitable data structure or representation of data. The term "feature engineering" at least in some examples refers to a process of determining which features might be useful in training an ML model, and then converting raw data into the determined features. Feature engineering is sometimes referred to as "feature extraction." The term "feature extraction" at least in some examples refers to a process of dimensionality reduction by which an initial set of raw data is reduced to more manageable groups for processing. Additionally or alternatively, the term "feature extraction" at least in some examples refers to retrieving intermediate feature representations calculated by an unsupervised model or a pre-trained model for use in another model as an input. Feature extraction is sometimes used as a synonym of "feature engineering." The term "feature map" at least in some examples refers to a function that takes feature vectors (or feature tensors) in one space and transforms them into feature vectors (or feature tensors) in another space. Additionally or alternatively, the term "feature map" at least in some examples refers to a function that maps a data vector (or tensor) to feature space. Additionally or alternatively, the term "feature map" at least in some examples refers to a function that applies the output of one filter applied to a previous layer. In some embodiments, the term "feature map" may also be referred to as an "activation map". The term "feature vector" at least in some examples, in the context of ML, refers to a set of features and/or a list of feature values representing an example passed into a model. Additionally or alternatively, the term "feature vector" at least in some examples, in the context of ML, refers to a vector that includes a tuple of one or more features.

The term "forward propagation" or "forward pass" at least in some examples, in the context of ML, refers to the calculation and storage of intermediate variables (including outputs) for a neural network in order from the input layer to the output layer.

The term "generative model" or "GM" at least in some examples refers to an ML model or ML algorithm that learns an underlying data distribution by analyzing a sample dataset, and once trained, a GM can produce other datasets that also match the data distribution.

The term "hidden layer" at least in some examples refers to an internal layer of neurons in a neural network that is not dedicated to input or output. The term "hidden unit" refers to a neuron in a hidden layer in a neural network.

The term "hyperparameter" at least in some examples refers to characteristics, properties, and/or parameters for an ML process that cannot be learnt during a training process. Hyperparameter are usually set before training takes place, and may be used in processes to help estimate model parameters. Examples of hyperparameters include model size (e.g., in terms of memory space, bytes, number of layers, and the like); training data shuffling (e.g., whether to do so and by how much); number of evaluation instances, iterations, epochs (e.g., a number of iterations or passes over the training data), or episodes; number of passes over training data; regularization; learning rate (e.g., the speed at which the algorithm reaches (converges to) optimal weights); learning rate decay (or weight decay); momentum; number of hidden layers; size of individual hidden layers; weight initialization scheme; dropout and gradient clipping thresholds; the C value and sigma value for SVMs; the k in k-nearest neighbors; number of branches in a decision tree; number of clusters in a clustering algorithm; vector size; word vector size for NLP and NLU; and/or the like.

The term "decision boundary" or "DB" at least in some examples refers to a graphical representation of a solution to a classification problem and/or a boundary or partition between classifications where objects belonging to one class reside on one side of the decision boundary and objects belonging to another class reside on another side of the decision boundary. Additionally or alternatively, the term "decision boundary" at least in some examples refers to a line or boundary that separates one class from another class. In some examples where there are more than two features, the decision boundary is a hyperplane in the dimension of the feature space that separates individual classes from one another.

The term "hyperplane" at least in some examples refers to a subspace whose dimension is one less than that of its ambient space. Additionally or alternatively, the term "hyperplane" at least in some examples refers to a Euclidean space that has exactly two unit normal vectors. Additionally or alternatively, the term "hyperplane" at least in some examples refers to a higher dimensional analogue of a plane in three dimensions that can be represented by a line equation. See e.g., Richard P. Standley, An Introduction to Hyperplane Arrangements, IAS/Park City Mathematics Series, vol. 00, 0000 (26 Feb. 2006), the contents of which is hereby incorporated by reference in its entirety.

The term "inference engine" at least in some examples refers to a component of a computing system that applies logical rules to a knowledge base to deduce new information. The term "intelligent agent" at least in some examples refers to an a software agent or other autonomous entity which acts, directing its activity towards achieving goals upon an environment using observation through sensors and consequent actuators (i.e. it is intelligent). Intelligent agents may also learn or use knowledge to achieve their goals.

The terms "instance-based learning" or "memory-based learning" in the context of ML at least in some examples refers to a family of learning algorithms that, instead of performing explicit generalization, compares new problem instances with instances seen in training, which have been stored in memory. Examples of instance-based algorithms include k-nearest neighbor, and the like), decision tree Algorithms (e.g., Classification And Regression Tree (CART), Iterative Dichotomiser 3 (ID3), C4.5, chi-square automatic interaction detection (CHAID), and the like), Fuzzy Decision Tree (FDT), and the like), Support Vector Machines (SVM), Bayesian Algorithms (e.g., Bayesian network (BN), a dynamic BN (DBN), Naive Bayes, and the like), and ensemble algorithms (e.g., Extreme Gradient Boosting, voting ensemble, bootstrap aggregating ("bagging"), Random Forest and the like.

The term "iteration" at least in some examples refers to the repetition of a process in order to generate a sequence of outcomes, wherein each repetition of the process is a single iteration, and the outcome of each iteration is the starting point of the next iteration. Additionally or alternatively, the term "iteration" at least in some examples refers to a single update of a model's weights during training.

The term "Kullback-Leibler divergence" at least in some examples refers to a measure of how one probability distribution is different from a reference probability distribution. The "Kullback-Leibler divergence" may be a useful distance measure for continuous distributions and is often useful when performing direct regression over the space of (discretely sampled) continuous output distributions. The term "Kullback-Leibler divergence" may also be referred to as "relative entropy".

The term "learning rate" at least in some examples refers to a tuning parameter or hyperparameter that controls how much to change the model in response to the estimated error each time the model weights are updated. Additionally or alternatively, the term "learning rate" at least in some examples refers to a tuning parameter or hyperparameter that defines or controls the amount that weights are updated during a machine learning training phase. Additionally or alternatively, the term "learning rate" at least in some examples refers to a tuning parameter or hyperparameter in an optimization algorithm that determines or defines a step size, a decay rate, momentum, an amount of time (e.g., time-based schedule), and/or an exponential function of individual iterations/epochs as a learning process moves toward a minimum (or convergence) of an optimization function, cost function, loss function, and/or the like. In some example, the term "learning rate" may also be referred to a "neural gain" or "gain".

The term "linear classifier" at least in some examples refers to a classification algorithm that makes predictions based on a linear predictor function combining a set of weights with a feature vector. Additionally or alternatively, the term "linear classifier" at least in some examples refers to a classifier that makes classification decisions based on the value of a linear combination of an object's characteristics and/or feature values of a feature vector. The term "linear separability" at least in some examples refers to a decision boundary of a classifier that is a linear function of input features.

The term "logit" at least in some examples refers to a set of raw predictions (e.g., non-normalized predictions) that a classification model generates, which is ordinarily then passed to a normalization function such as a softmax function for models solving a multi-class classification problem. Additionally or alternatively, the term "logit" at least in some examples refers to a logarithm of a probability. Additionally or alternatively, the term "logit" at least in some examples refers to the output of a logit function. Additionally or alternatively, the term "logit" or "logit function" at least in some examples refers to a quantile function associated with a standard logistic distribution. Additionally or alternatively, the term "logit" at least in some examples refers to the inverse of a standard logistic function. Additionally or alternatively, the term "logit" at least in some examples refers to the element-wise inverse of the sigmoid function. Additionally or alternatively, the term "logit" or "logit function" at least in some examples refers to a function that represents probability values from 0 to 1, and negative infinity to infinity. Additionally or alternatively, the term "logit" or "logit function" at least in some examples refers to a function that takes a probability and produces a real number between negative and positive infinity.

The term "loss function" or "cost function" at least in some examples refers to an event or values of one or more variables onto a real number that represents some "cost" associated with the event. A value calculated by a loss function may be referred to as a "loss" or "error". Additionally or alternatively, the term "loss function" or "cost function" at least in some examples refers to a function used to determine the error or loss between the output of an algorithm and a target value. Additionally or alternatively, the term "loss function" or "cost function" at least in some examples refers to a function are used in optimization problems with the goal of minimizing a loss or error.

The term "mathematical model" at least in some examples refer to a system of postulates, data, and inferences presented as a mathematical description of an entity or state of affairs including governing equations, assumptions, and constraints. The term "statistical model" at least in some examples refers to a mathematical model that embodies a set of statistical assumptions concerning the generation of sample data and/or similar data from a population; in some examples, a "statistical model" represents a data-generating process.

The term "machine learning" or "ML" at least in some examples refers to the use of computer systems to optimize a performance criterion using example (training) data and/or past experience. ML involves using algorithms to perform specific task(s) without using explicit instructions to perform the specific task(s), and/or relying on patterns, predictions, and/or inferences. ML uses statistics to build ML model(s) (also referred to as "models") in order to make predictions or decisions based on sample data (e.g., training data). The term "machine learning model" or "ML model" at least in some examples refers to an application, program, process, algorithm, and/or function that is capable of making predictions, inferences, or decisions based on an input data set and/or is capable of detecting patterns based on an input data set. In some examples, a "machine learning model" or "ML model" is trained on a training data to detect patterns and/or make predictions, inferences, and/or decisions. In some examples, a "machine learning model" or "ML model" is based on a mathematical and/or statistical model. For purposes of the present disclosure, the terms "ML model", "AI model", "AI/ML model", and the like may be used interchangeably. The term "machine learning algorithm" or "ML algorithm" at least in some examples refers to an application, program, process, algorithm, and/or function that builds or estimates an ML model based on sample data or training data. Additionally or alternatively, the term "machine learning algorithm" or "ML algorithm" at least in some examples refers to a program, process, algorithm, and/or function that learns from experience w.r.t some task(s) and some performance measure(s)/metric(s), and an ML model is an object or data structure created after an ML algorithm is trained with training data. For purposes of the present disclosure, the terms "ML algorithm", "AI algorithm", "AI/ML algorithm", and the like may be used interchangeably. Additionally, although the term "ML algorithm" may refer to different concepts than the term "ML model," these terms may be used interchangeably for the purposes of the present disclosure. The term "machine learning application" or "ML application" at least in some examples refers to an application, program, process, algorithm, and/or function that contains some AI/ML model(s) and application-level descriptions. Additionally or alternatively, the term "machine learning application" or "ML application" at least in some examples refers to a complete and deployable application and/or package that includes at least one ML model and/or other data capable of achieving a certain function and/or performing a set of actions or tasks in an operational environment. For purposes of the present disclosure, the terms "ML application", "AI application", "AI/ML application", and the like may be used interchangeably.

The term "matrix" at least in some examples refers to a rectangular array of numbers, symbols, or expressions, arranged in rows and columns, which may be used to represent an object or a property of such an object.

The terms "model parameter" and/or "parameter" in the context of ML, at least in some examples refer to values, characteristics, and/or properties that are learnt during training. Additionally or alternatively, "model parameter" and/or "parameter" in the context of ML, at least in some examples refer to a configuration variable that is internal to the model and whose value can be estimated from the given data. Model parameters are usually required by a model when making predictions, and their values define the skill of the model on a particular problem. Examples of such model parameters/parameters include weights (e.g., in an ANN); constraints; support vectors in a support vector machine (SVM); coefficients in a linear regression and/or logistic regression; word frequency, sentence length, noun or verb distribution per sentence, the number of specific character n-grams per word, lexical diversity, and the like, for natural language processing (NLP) and/or natural language understanding (NLU); and/or the like.

The term "momentum" at least in some examples refers to an aggregate of gradients in gradient descent. Additionally or alternatively, the term "momentum" at least in some examples refers to a variant of the stochastic gradient descent algorithm where a current gradient is replaced with m (momentum), which is an aggregate of gradients.

The term "objective function" at least in some examples refers to a function to be maximized or minimized for a specific optimization problem. In some cases, an objective function is defined by its decision variables and an objective. The objective is the value, target, or goal to be optimized, such as maximizing profit or minimizing usage of a particular resource. The specific objective function chosen depends on the specific problem to be solved and the objectives to be optimized. Constraints may also be defined to restrict the values the decision variables can assume thereby influencing the objective value (output) that can be achieved. During an optimization process, an objective function's decision variables are often changed or manipulated within the bounds of the constraints to improve the objective function's values. In general, the difficulty in solving an objective function increases as the number of decision variables included in that objective function increases. The term "decision variable" refers to a variable that represents a decision to be made.

The term "optimization" at least in some examples refers to an act, process, or methodology of making something (e.g., a design, system, or decision) as fully perfect, functional, or effective as possible. Optimization usually includes mathematical procedures such as finding the maximum or minimum of a function. The term "optimal" at least in some examples refers to a most desirable or satisfactory end, outcome, or output. The term "optimum" at least in some examples refers to an amount or degree of something that is most favorable to some end. The term "optima" at least in some examples refers to a condition, degree, amount, or compromise that produces a best possible result. Additionally or alternatively, the term "optima" at least in some examples refers to a most favorable or advantageous outcome or result.

The term "perceptron" at least in some examples refers to an algorithm for supervised learning of binary classifiers. Additionally or alternatively, the term "perceptron" at least in some examples refers to an algorithm for learning a threshold function a function that maps its input to an output value that may be a single binary value.

The term "probability" at least in some examples refers to a numerical description of how likely an event is to occur and/or how likely it is that a proposition is true. The term "distribution" at least in some examples refers to a generalized function used to formulate solutions of partial differential equations. The term "probability distribution" at least in some examples refers to a mathematical function that gives the probabilities of occurrence of different possible outcomes for an experiment or event. Additionally or alternatively, the term "probability distribution" at least in some examples refers to a function that gives the probabilities of occurrence of different possible outcomes for an experiment or event. Additionally or alternatively, the term "probability distribution" at least in some examples refers to a statistical function that describes all possible values and likelihoods that a random variable can take within a given range (e.g., a bound between minimum and maximum possible values). A probability distribution may have one or more factors or attributes such as, for example, a mean or average, mode, support, tail, head, median, variance, standard deviation, quantile, symmetry, skewness, kurtosis, and the like. A probability distribution may be a description of a random phenomenon in terms of a sample space and the probabilities of events (subsets of the sample space). Example probability distributions include discrete distributions (e.g., Bernoulli distribution, discrete uniform, binomial, Dirac measure, Gauss-Kuzmin distribution, geometric, hypergeometric, negative binomial, negative hypergeometric, Poisson, Poisson binomial, Rademacher distribution, Yule-Simon distribution, zeta distribution, Zipf distribution, and the like), continuous distributions (e.g., Bates distribution, beta, continuous uniform, normal distribution, Gaussian distribution, bell curve, joint normal, gamma, chi-squared, non-central chi-squared, exponential, Cauchy, lognormal, logit-normal, F distribution, t distribution, Dirac delta function, Pareto distribution, Lomax distribution, Wishart distribution, Weibull distribution, Gumbel distribution, Irwin-Hall distribution, Gompertz distribution, inverse Gaussian distribution (or Wald distribution), Chernoff's distribution, Laplace distribution, Pólya-Gamma distribution, and the like), and/or joint distributions (e.g., Dirichlet distribution, Ewens's sampling formula, multinomial distribution, multivariate normal distribution, multivariate t-distribution, Wishart distribution, matrix normal distribution, matrix t distribution, and the like). The term "probability distribution function" at least in some examples refers to an integral of the probability density function.

The term "probability density function" or "PDF" at least in some examples refers to a function whose value at any given sample (or point) in a sample space can be interpreted as providing a relative likelihood that the value of the random variable would be close to that sample. Additionally or alternatively, the term "probability density function" or "PDF" at least in some examples refers to a probability of a random variable falling within a particular range of values. Additionally or alternatively, the term "probability density function" or "PDF" at least in some examples refers to a value at two different samples can be used to infer, in any particular draw of the random variable, how much more likely it is that the random variable would be close to one sample compared to the other sample.

The term "precision" at least in some examples refers to the closeness of the two or more measurements to each other. The term "precision" may also be referred to as "positive predictive value".

The term "quantile" at least in some examples refers to a cut point(s) dividing a range of a probability distribution into continuous intervals with equal probabilities, or dividing the observations in a sample in the same way. The term "quantile function" at least in some examples refers to a function that is associated with a probability distribution of a random variable, and the specifies the value of the random variable such that the probability of the variable being less than or equal to that value equals the given probability. The term "quantile function" may also be referred to as a percentile function, percent-point function, or inverse cumulative distribution function.

The term "recall" at least in some examples refers to the fraction of relevant instances that were retrieved, or the number of true positive predictions or inferences divided by the number of true positives plus false negative predictions or inferences. The term "recall" may also be referred to as "sensitivity".

The terms "regression algorithm" and/or "regression analysis" in the context of ML at least in some examples refers to a set of statistical processes for estimating the relationships between a dependent variable (often referred to as the "outcome variable") and one or more independent variables (often referred to as "predictors", "covariates", or "features"). Examples of regression algorithms/models include logistic regression, linear regression, gradient descent (GD), stochastic GD (SGD), and the like.

The term "reinforcement learning" or "RL" at least in some examples refers to a goal-oriented learning technique based on interaction with an environment. In RL, an agent aims to optimize a long-term objective by interacting with the environment based on a trial and error process. Examples of RL algorithms include Markov decision process, Markov chain, Q-learning, multi-armed bandit learning, temporal difference learning, and deep RL. The term "multi-armed bandit problem", "K-armed bandit problem", "N-armed bandit problem", or "contextual bandit" at least in some examples refers to a problem in which a fixed limited set of resources must be allocated between competing (alternative) choices in a way that maximizes their expected gain, when each choice's properties are only partially known at the time of allocation, and may become better understood as time passes or by allocating resources to the choice. The term "contextual multi-armed bandit problem" or "contextual bandit" at least in some examples refers to a version of multi-armed bandit where, in each iteration, an agent has to choose between arms; before making the choice, the agent sees a d-dimensional feature vector (context vector) associated with a current iteration, the learner uses these context vectors along with the rewards of the arms played in the past to make the choice of the arm to play in the current iteration, and over time the learner's aim is to collect enough information about how the context vectors and rewards relate to each other, so that it can predict the next best arm to play by looking at the feature vectors.

The term "reward function", in the context of RL, at least in some examples refers to a function that outputs a reward value based on one or more reward variables; the reward value provides feedback for an RL policy so that an RL agent can learn a desirable behavior. The term "reward shaping", in the context of RL, at least in some examples refers to a adjusting or altering a reward function to output a positive reward for desirable behavior and a negative reward for undesirable behavior.

The term "sample space" in probability theory (also referred to as a "sample description space" or "possibility space") of an experiment or random trial at least in some examples refers to a set of all possible outcomes or results of that experiment.

The term "search space", in the context of optimization, at least in some examples refers to an a domain of a function to be optimized. Additionally or alternatively, the term "search space", in the context of search algorithms, at least in some examples refers to a feasible region defining a set of all possible solutions. Additionally or alternatively, the term "search space" at least in some examples refers to a subset of all hypotheses that are consistent with the observed training examples. Additionally or alternatively, the term "search space" at least in some examples refers to a version space, which may be developed via machine learning.

The term "softmax" or "softmax function" at least in some examples refers to a generalization of the logistic function to multiple dimensions; the "softmax function" is used in multinomial logistic regression and is often used as the last activation function of a neural network to normalize the output of a network to a probability distribution over predicted output classes.

The term "supervised learning" at least in some examples refers to an ML technique that aims to learn a function or generate an ML model that produces an output given a labeled data set. Supervised learning algorithms build models from a set of data that contains both the inputs and the desired outputs. For example, supervised learning involves learning a function or model that maps an input to an output based on example input-output pairs or some other form of labeled training data including a set of training examples. Each input-output pair includes an input object (e.g., a vector) and a desired output object or value (referred to as a "supervisory signal"). Supervised learning can be grouped into classification algorithms, regression algorithms, and instance-based algorithms.

The term "support vector machine" or "SVM" at least in some examples refers to a supervised learning models with associated learning algorithms that analyze data for classification and/or regression analysis. In some examples, a "support vector machine" may also be referred to as a "support vector network" or "SVN".

The term "standard deviation" at least in some examples refers to a measure of the amount of variation or dispersion of a set of values. Additionally or alternatively, the term "standard deviation" at least in some examples refers to the square root of a variance of a random variable, a sample, a statistical population, a dataset, or a probability distribution.

The term "stochastic" at least in some examples refers to a property of being described by a random probability distribution. Although the terms "stochasticity" and "randomness" are distinct in that the former refers to a modeling approach and the latter refers to phenomena themselves, for purposes of the present disclosure these two terms may be used synonymously unless the context indicates otherwise.

The term "tensor" at least in some examples refers to an object or other data structure represented by an array of components that describe functions relevant to coordinates of a space. Additionally or alternatively, the term "tensor" at least in some examples refers to a generalization of vectors and matrices and/or may be understood to be a multidimensional array. Additionally or alternatively, the term "tensor" at least in some examples refers to an array of numbers arranged on a regular grid with a variable number of axes. At least in some examples, a tensor can be defined as a single point, a collection of isolated points, or a continuum of points in which elements of the tensor are functions of position, and the tensor forms a "tensor field". At least in some examples, a vector may be considered as a one dimensional (1D) or first order tensor, and a matrix may be considered as a two dimensional (2D) or second order tensor. Tensor notation may be the same or similar as matrix notation with a capital letter representing the tensor and lowercase letters with subscript integers representing scalar values within the tensor.

The term "unsupervised learning" at least in some examples refers to an ML technique that aims to learn a function to describe a hidden structure from unlabeled data. Unsupervised learning algorithms build models from a set of data that contains only inputs and no desired output labels. Unsupervised learning algorithms are used to find structure in the data, like grouping or clustering of data points. Examples of unsupervised learning are K-means clustering, principal component analysis (PCA), and topic modeling, among many others. The term "semi-supervised learning at least in some examples refers to ML algorithms that develop ML models from incomplete training data, where a portion of the sample input does not include labels.

The term "vector" at least in some examples refers to a one-dimensional array data structure. Additionally or alternatively, the term "vector" at least in some examples refers to a tuple of one or more values called scalars.

Aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other: aspects not specifically described herein will be apparent to those of skill in the art upon reviewing the above description.

The invention claimed is:

1. One or more non-transitory computer-readable media (NTCRM) comprising instructions for a dynamic neural distribution function learning algorithm, wherein execution of the instructions by one or more processors of a compute node is to cause the compute node to: operate a machine learning algorithm to learn a set of neural distribution functions (NDFs) independently of one another; and during each iteration of a learning process until convergence is reached, provide each NDF in the set of NDFs with an input pattern to obtain a set of candidate outputs, wherein each NDF is configured to generate a candidate output in the set of candidate outputs based on the input pattern; operate a competition function to select a candidate output from among the set of candidate outputs; compare the selected candidate output with a target pattern to obtain an error value; adjust the neural gains of corresponding NDFs in the set of NDFs when the error value is greater than a threshold value; and feed the adjusted neural gains to the corresponding NDFs for generation of a next set of candidate outputs during a next iteration of the learning process.

2. The NTCRM of claim 1, wherein each NDF in the set of NDFs includes a decision boundary (DB), and each NDF is configured to classify data as belonging on one side of its DB.

3. The NTCRM of claim 2, wherein each NDF is configured to generate the candidate output to include its DB.

4. The NTCRM of claim 3, wherein each NDF is configured to generate the candidate output to include one or more classified datasets, wherein each classified dataset of the one or more classified datasets includes a predicted data class.

5. The NTCRM of claim 1, wherein execution of the instructions is to cause the compute node to: derive a DB for each NDF in the set of NDFs independently from other NDFs in the set of NDFs.

6. The NTCRM of claim 5, wherein execution of the instructions is to cause the compute node to: operate the machine learning algorithm to learn the DB of each NDF.

7. The NTCRM of claim 1, wherein the set of NDFs are individual sub-networks that are part of a super-network.

8. The NTCRM of claim 7, wherein the learning process is a training phase for training the supernetwork, and wherein the input pattern and the target pattern are part of a training dataset.

9. The NTCRM of claim 7, wherein the learning process is a testing phase for testing and validating the super-network, and wherein the input pattern and the target pattern are part of a test dataset.

10. The NTCRM of claim 9, wherein the testing phase includes one or more of: an exclusive OR (XOR) problem to test a linear separability of the super-network; an additive class learning (ACL) problem to test a sequential learning capability of the super-network; and an update learning problem to test an autonomous learning capability of the super-network.

11. The NTCRM of claim 7, wherein the super-network is configured to perform object recognition in image or video data by emulating retina, fovea, and lateral geniculate nucleus (LGN) of a vertebrate.

12. The NTCRM of claim 1, wherein the machine learning algorithm is a cascade error projection learning algorithm.

* * * * *